United States Patent
Lyu et al.

(10) Patent No.: US 10,921,561 B2
(45) Date of Patent: Feb. 16, 2021

(54) OPTICAL IMAGING LENS ASSEMBLY

(71) Applicant: Zhejiang Sunny Optical Co., Ltd, Ningbo (CN)

(72) Inventors: Saifeng Lyu, Ningbo (CN); Ming Li, Ningbo (CN)

(73) Assignee: ZHEJIANG SUNNY OPTICAL CO., LTD, Ningbo (CN)

( * ) Notice: Subject to any disclaimer, the term of this patent is extended or adjusted under 35 U.S.C. 154(b) by 189 days.

(21) Appl. No.: 16/229,598

(22) Filed: Dec. 21, 2018

(65) Prior Publication Data

US 2019/0146188 A1    May 16, 2019

Related U.S. Application Data

(63) Continuation of application No. PCT/CN2018/086746, filed on May 14, 2018.

(30) Foreign Application Priority Data

Sep. 21, 2017  (CN) .......................... 2017 1 0857503
Sep. 21, 2017  (CN) .................... 2017 2 1213009 U

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC .............................. G02B 13/0045; G02B 9/64
USPC .......................................................... 359/708
See application file for complete search history.

(56) References Cited

U.S. PATENT DOCUMENTS

| 2013/0242362 | A1 | 9/2013 | Nakayama et al. |
| 2016/0033742 | A1* | 2/2016 | Huang ............... G02B 13/0015 359/708 |
| 2016/0033743 | A1 | 2/2016 | Chen |
| 2016/0139372 | A1 | 5/2016 | Tanaka |
| 2016/0154214 | A1 | 6/2016 | Ishizaka |
| 2017/0219798 | A1 | 8/2017 | Park |
| 2017/0227744 | A1 | 8/2017 | Sakata |

FOREIGN PATENT DOCUMENTS

| CN | 107462977 | 12/2017 |
| CN | 107479172 | 12/2017 |
| CN | 207301462 | 5/2018 |
| JP | 2015-72402 | 4/2015 |
| TW | 201606345 | 2/2016 |

* cited by examiner

*Primary Examiner* — James R Greece
(74) *Attorney, Agent, or Firm* — Hauptman Ham, LLP

(57) ABSTRACT

The present disclosure discloses an optical imaging lens assembly. The optical imaging lens assembly includes, sequentially along an optical axis from an object side to an image side, a first lens, a second lens, a third lens, a fourth lens, a fifth lens, a sixth lens and a seventh lens. The first lens has a positive refractive power. An image-side surface of the second lens and an image-side surface of the seventh lens are convex surfaces. A total effective focal length f of the optical imaging lens assembly and an entrance pupil diameter EPD of the optical imaging lens assembly satisfy: f/EPD≤1.90.

17 Claims, 23 Drawing Sheets

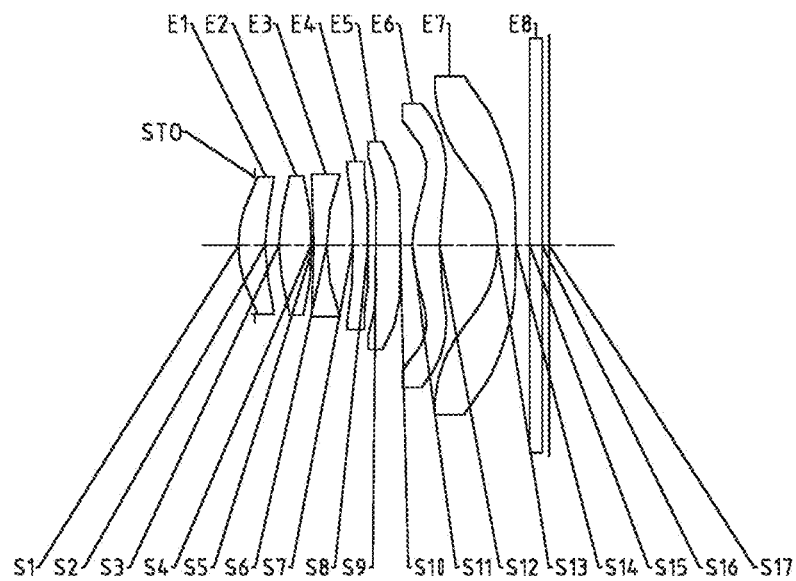
Fig. 1
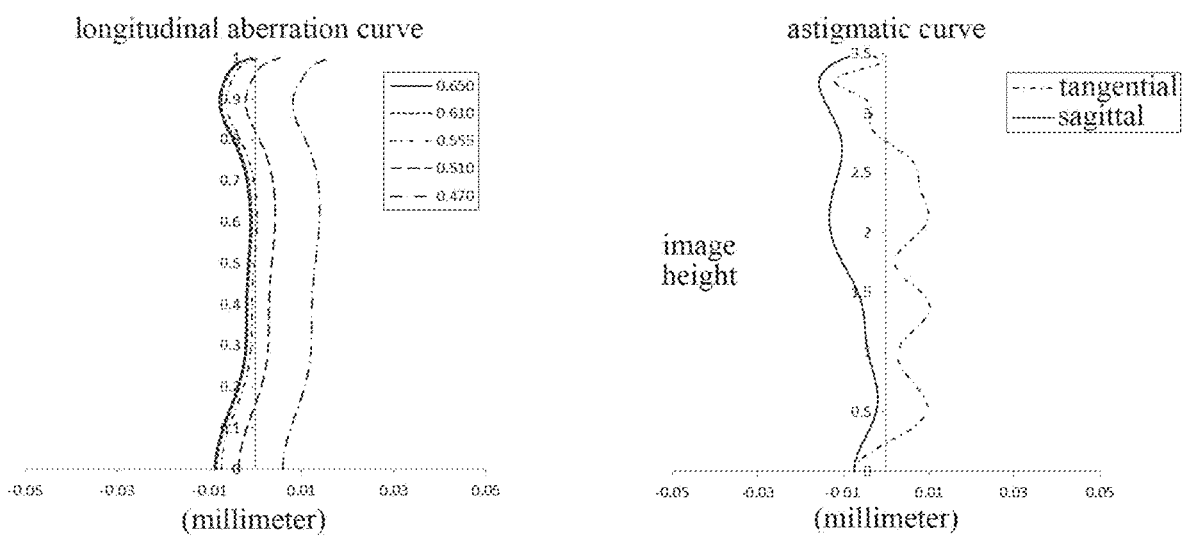
Fig. 2A
Fig. 2B

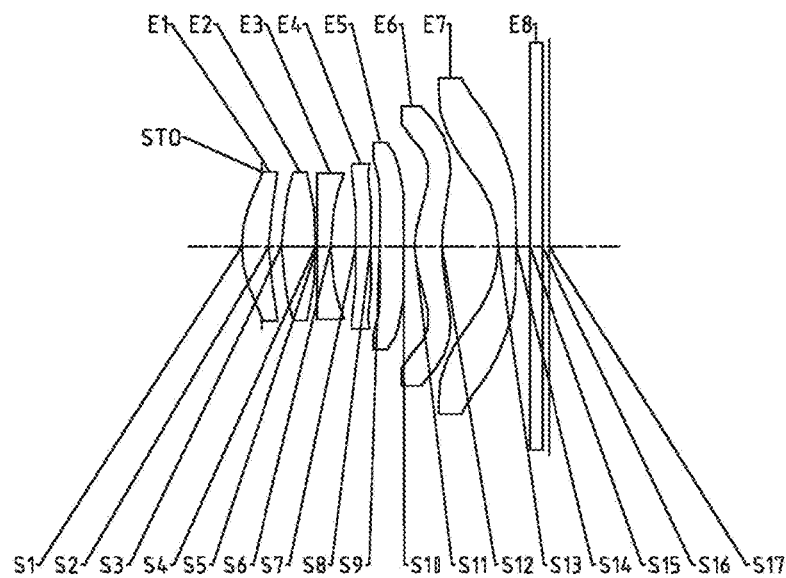
Fig. 13
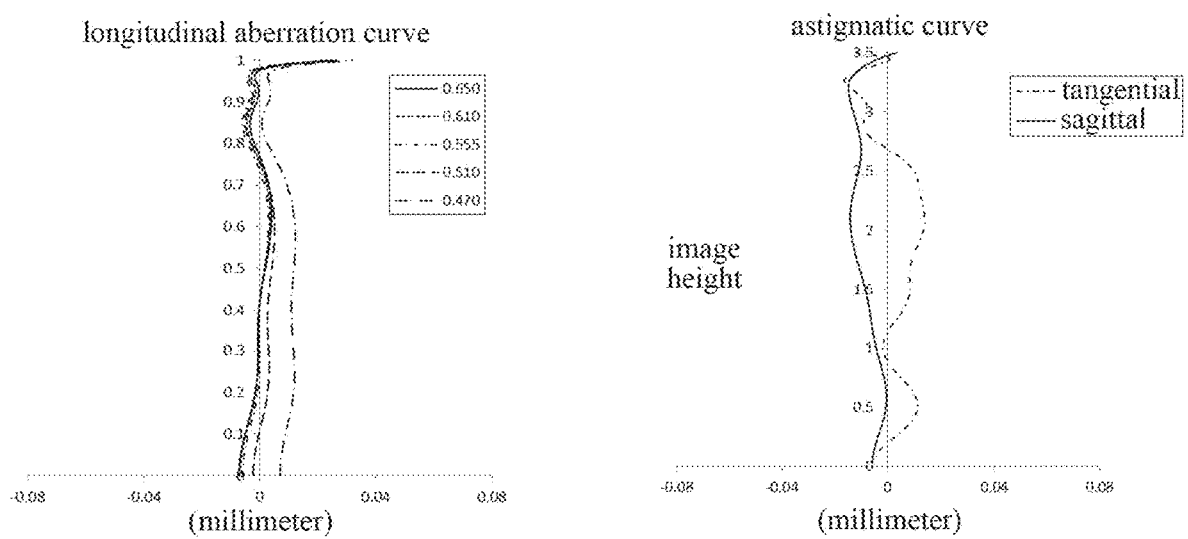
Fig. 14A
Fig. 14B

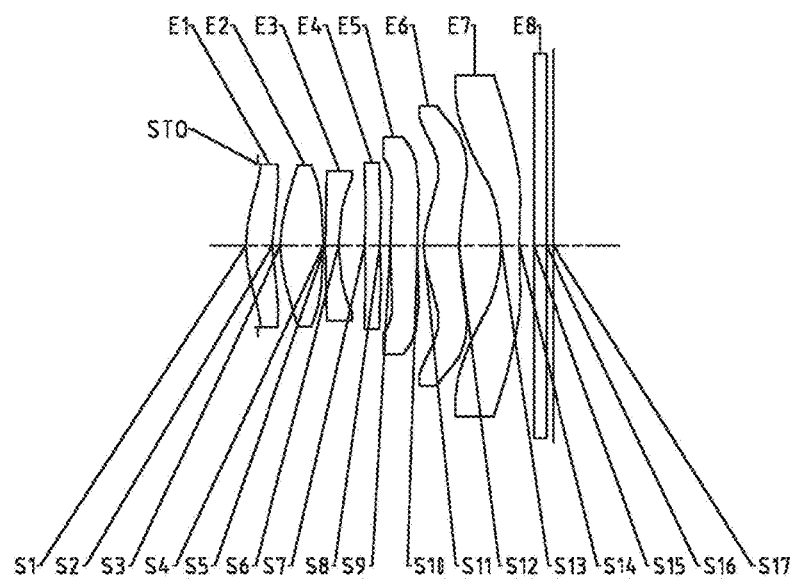
Fig. 17
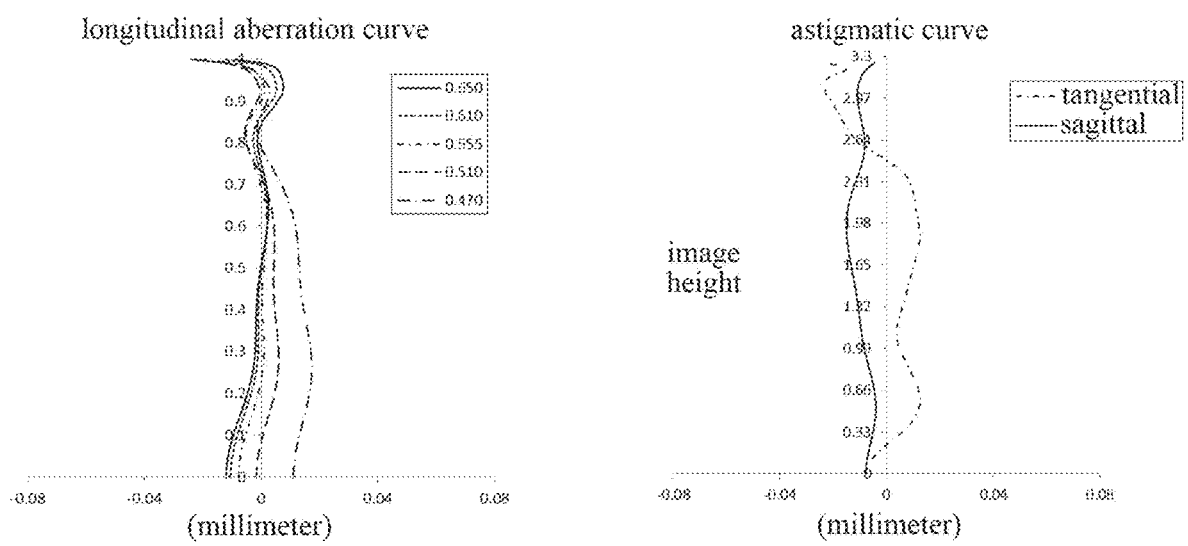
Fig. 18A
Fig. 18B

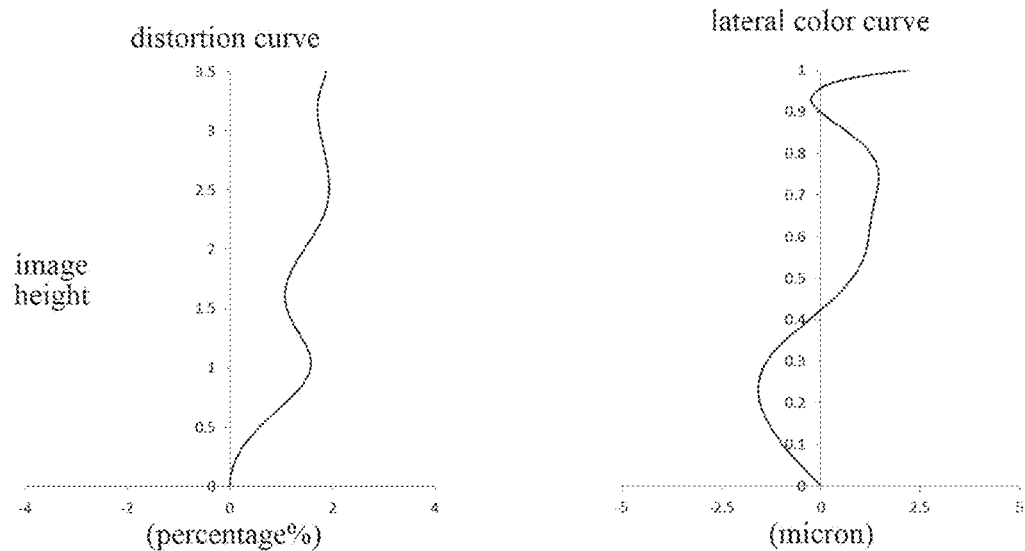
Fig. 22C
Fig. 22D
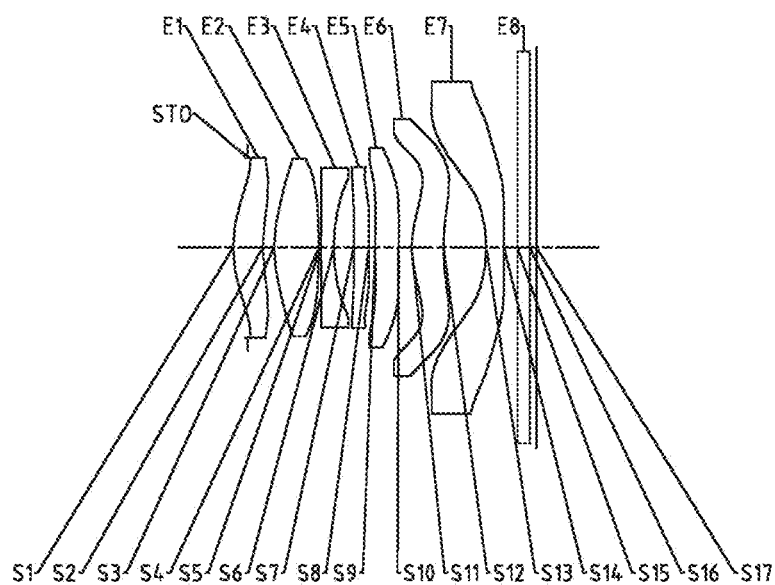
Fig. 23

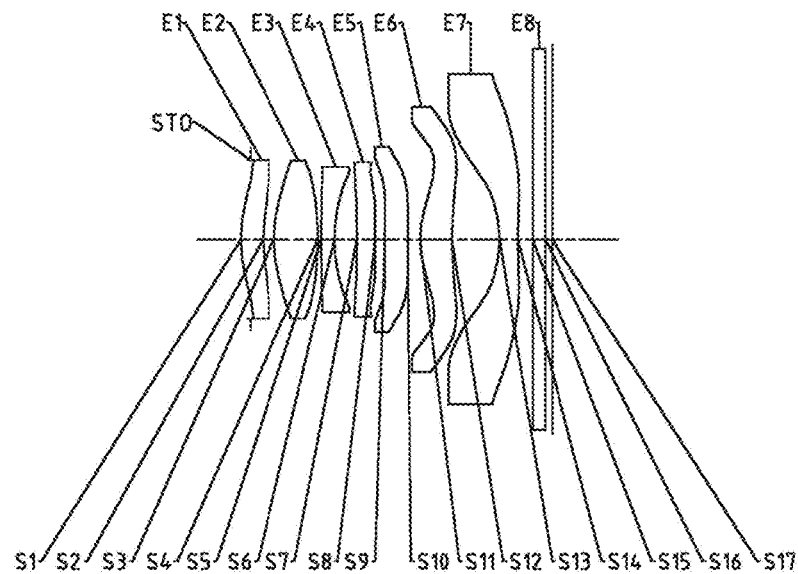
Fig. 25
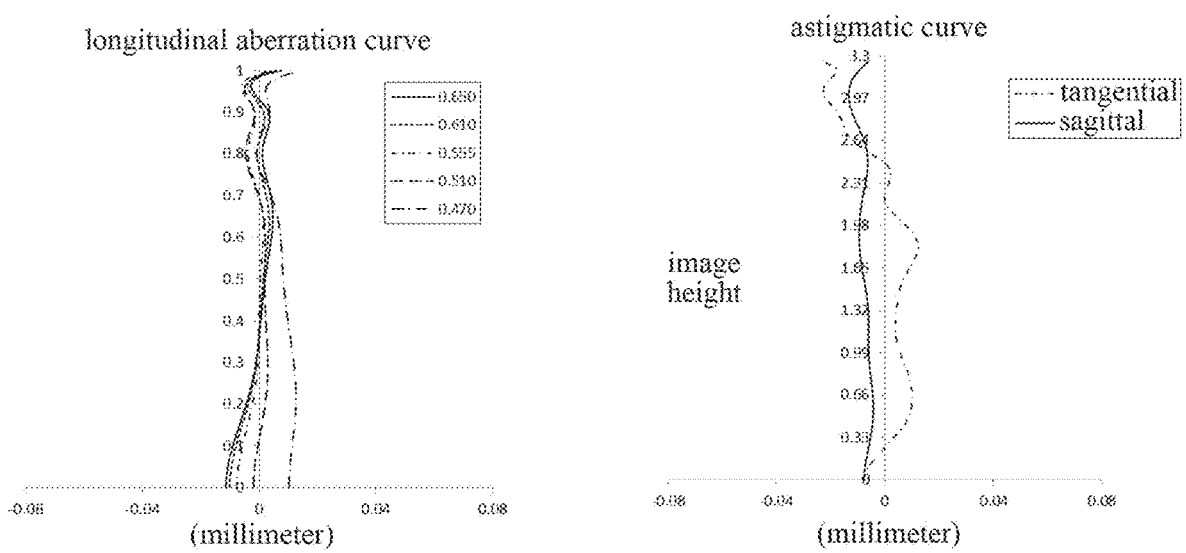
Fig. 26A
Fig. 26B

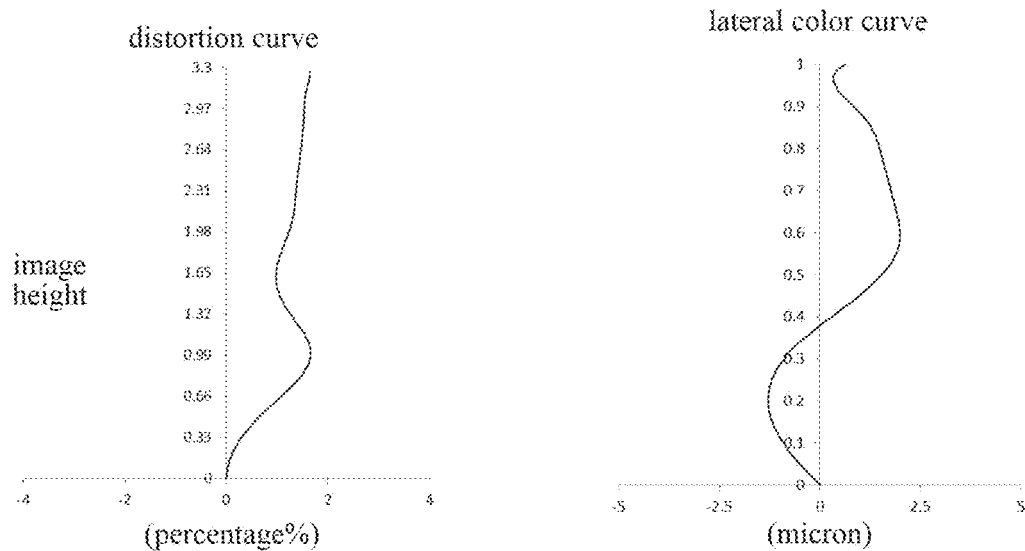
Fig. 26C
Fig. 26D
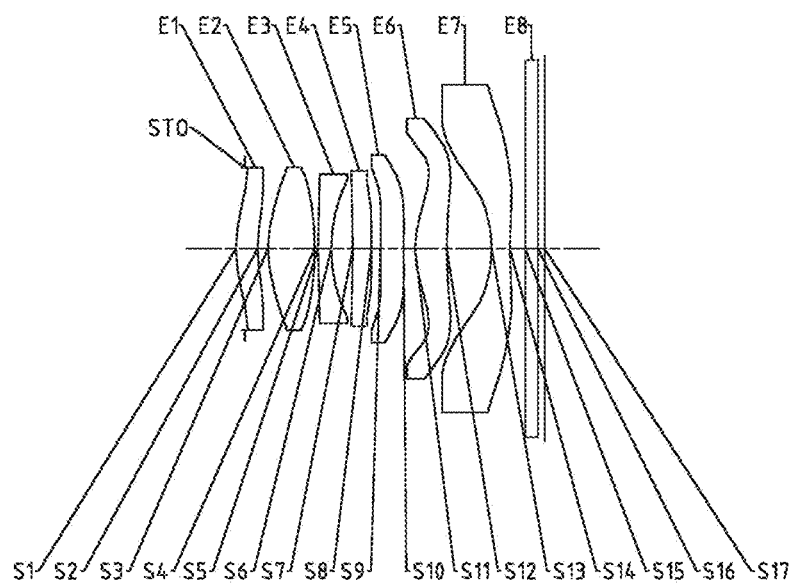
Fig. 27

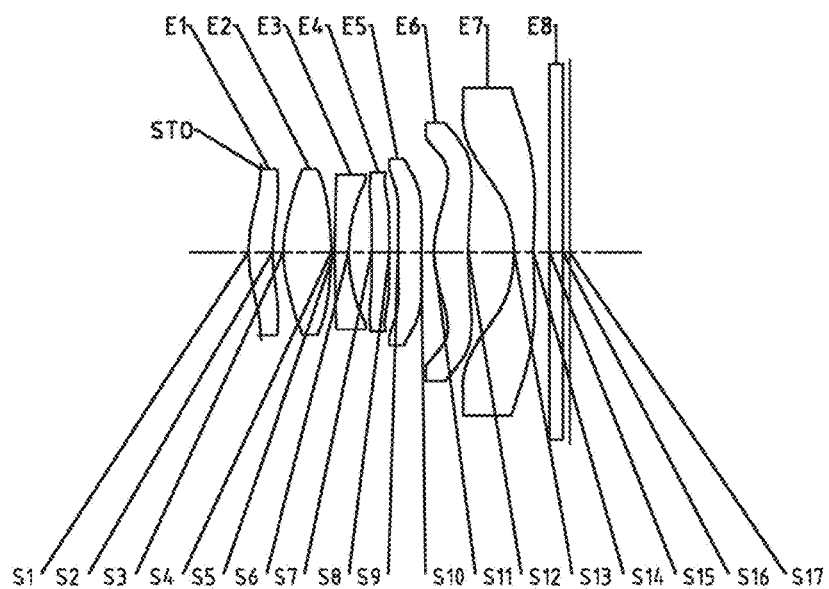
Fig. 29
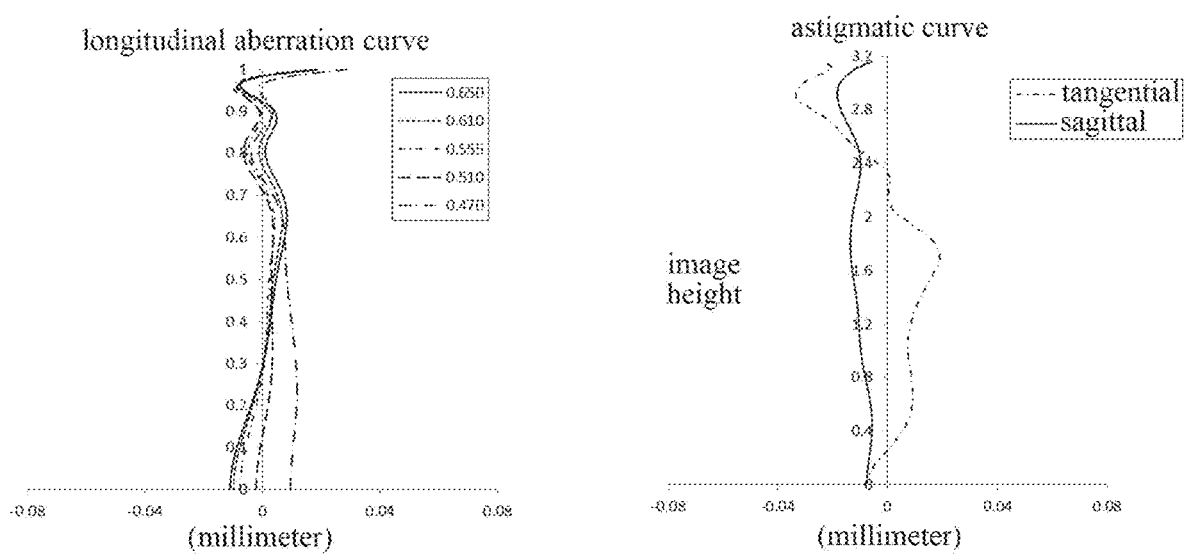
Fig. 30A
Fig. 30B

OPTICAL IMAGING LENS ASSEMBLY

CROSS-REFERENCE TO RELATED APPLICATIONS

This is a continuation of International Application PCT/CN2018/086746, with an international filing date of May 14, 2018, which claims priorities and rights to Chinese Patent Application No. 201710857503.4 and Chinese Patent Application No. 201721213009.6, filed with the China National Intellectual Property Administration (CNIPA) on Sep. 21, 2017, the disclosures of which are hereby incorporated by reference in their entirety.

TECHNICAL FIELD

The present disclosure relates to an optical imaging lens assembly, and more specifically to a large-aperture optical imaging lens assembly including seven lenses.

BACKGROUND

In recent years, with the rapid updating and upgrading of portable electronic products such as mobile phones and tablet computers, the market demand for product-side imaging lens assemblies has become more diversified. At this stage, in addition to requiring the imaging lens assembly to have high pixel, high resolution, high relative brightness and other characteristics, higher requirements have been put forward on the large aperture, wide field-of-view and other aspects of the lens assembly to meet the imaging needs of various fields.

SUMMARY

The present disclosure provides an optical imaging lens assembly that may be applied to portable electronic products and may at least solve or partially solve at least one of the above mentioned disadvantages in the existing technology, such as a large-aperture imaging lens assembly.

According to an aspect, the present disclosure provides an optical imaging lens assembly. The lens assembly includes, sequentially along an optical axis from an object side to an image side, a first lens, a second lens, a third lens, a fourth lens, a fifth lens, a sixth lens and a seventh lens having refractive powers. The first lens may have a positive refractive power. An image-side surface of the second lens and an image-side surface of the seventh lens may be convex surfaces. A total effective focal length f of the optical imaging lens assembly and an entrance pupil diameter EPD of the optical imaging lens assembly may satisfy: $f/EPD \leq 1.90$.

In an implementation, an object-side surface of the seventh lens may be a concave surface, a radius of curvature R13 of the object-side surface of the seventh lens and the total effective focal length f of the optical imaging lens assembly may satisfy: $-35 \leq f/R13 \leq -1.5$.

In an implementation, a radius of curvature R1 of an object-side surface of the first lens and a radius of curvature R2 of an image-side surface of the first lens may satisfy: $-120 \leq (R1+R2)/(R1-R2) \leq 0$.

In an implementation, the radius of curvature R1 of the object-side surface of the first lens and a radius of curvature R6 of an image-side surface of the third lens may satisfy: $-11 \leq (R1+R6)/(R1-R6) \leq -2.5$.

In an implementation, a radius of curvature R9 of an object-side surface of the fifth lens and a radius of curvature R10 of an image-side surface of the fifth lens may satisfy: $|R9+R1|/|R9-R10| \leq 3$.

In an implementation, a radius of curvature R11 of an object-side surface of the sixth lens and a radius of curvature R12 of an image-side surface of the sixth lens may satisfy: $1 \leq |R11+R12|/|R11-R12| \leq 2.5$.

In an implementation, the fifth lens may have a negative refractive power, and an effective focal length f5 of the fifth lens and an effective focal length f1 of the first lens may satisfy: $-2 \leq f5/f1 \leq 0$.

In an implementation, an effective focal length f3 of the third lens and an effective focal length f6 of the sixth lens may satisfy: $-2 \leq f3/f6 \leq -1$.

In an implementation, the total effective focal length f of the optical imaging lens assembly and a combined focal length f67 of the sixth lens and the seventh lens may satisfy: $f/f67 \leq 0.7$.

In an implementation, the combined focal length f67 of the sixth lens and the seventh lens and a combined focal length f123 of the first lens, the second lens and the third lens may satisfy: $1 \leq f67/f123 \leq 5$.

In an implementation, a spacing distance T34 between the third lens and the fourth lens on the optical axis and a spacing distance T12 between the first lens and the second lens on the optical axis may satisfy: $1.5 \leq T34/T12 \leq 4$.

In an implementation, a spacing distance T67 between the sixth lens and the seventh lens on the optical axis and a spacing distance T56 between the fifth lens and the sixth lens on the optical axis may satisfy: $3 \leq T67/T56 \leq 7$.

In an implementation, an abbe number V2 of the second lens and an abbe number V3 of the third lens may satisfy: $|V2-V3| \leq 50$.

According to another aspect, the present disclosure further provides an optical imaging lens assembly. The lens assembly includes, sequentially along an optical axis from an object side to an image side, a first lens, a second lens, a third lens, a fourth lens, a fifth lens, a sixth lens and a seventh lens having refractive powers. The fourth lens may have a negative refractive power. An image-side surface of the second lens may be a convex surface. An image-side surface of the fifth lens and an image-side surface of the sixth lens may be concave surfaces. A total effective focal length f of the optical imaging lens assembly and an entrance pupil diameter EPD of the optical imaging lens assembly may satisfy: $f/EPD \leq 1.70$.

In an implementation, the total effective focal length f of the optical imaging lens assembly and the entrance pupil diameter EPD of the optical imaging lens assembly may satisfy: $f/EPD \leq 1.5$.

In an implementation, the first lens may have a positive refractive power.

In an implementation, a radius of curvature R1 of an object-side surface of the first lens and a radius of curvature R2 of an image-side surface of the first lens may satisfy: $-120 \leq (R1+R2)/(R1-R2) \leq 0$.

In an implementation, the fifth lens may have a negative refractive power, and an effective focal length f5 of the fifth lens and an effective focal length f1 of the first lens may satisfy: $-2 \leq f5/f1 \leq 0$.

In an implementation, the third lens may have a negative refractive power, and the sixth lens may have a positive refractive power.

In an implementation, an effective focal length f3 of the third lens and an effective focal length f6 of the sixth lens may satisfy: $-2 \leq f3/f6 \leq -1$."

In an implementation, a radius of curvature R1 of an object-side surface of the first lens and a radius of curvature R6 of an image-side surface of the third lens may satisfy: $-11 \leq (R1+R6)/(R1-R6) \leq -2.5$.

In an implementation, a radius of curvature R11 of an object-side surface of the sixth lens and a radius of curvature R12 of the image-side surface of the sixth lens may satisfy: $1 \leq |R11+R12|/|R11-R12| \leq 2.5$.

In an implementation, a radius of curvature R9 of an object-side surface of the fifth lens and a radius of curvature R10 of the image-side surface of the fifth lens may satisfy: $|R9+R10|/|R9-R10| \leq 3$.

In an implementation, a combined refractive power of the sixth lens and the seventh lens is a positive refractive power, and the total effective focal length f of the optical imaging lens assembly and a combined focal length f67 of the sixth lens and the seventh lens may satisfy: $f/f67 \leq 0.7$.

In an implementation, the combined focal length f67 of the sixth lens and the seventh lens and a combined focal length f123 of the first lens, the second lens and the third lens may satisfy: $1 \leq f67/f123 \leq 5$.

In an implementation, a spacing distance T34 between the third lens and the fourth lens on the optical axis and a spacing distance T12 between the first lens and the second lens on the optical axis may satisfy: $1.5 \leq T34/T12 \leq 4$.

In an implementation, a spacing distance T67 between the sixth lens and the seventh lens on the optical axis and a spacing distance T56 between the fifth lens and the sixth lens on the optical axis may satisfy: $3 \leq T67/T56 \leq 7$.

In an implementation, an abbe number V2 of the second lens and an abbe number V3 of the third lens may satisfy: $|V2-V3| \leq 50$.

In an implementation, an object-side surface of the seventh lens may be a concave surface, a radius of curvature R13 of the object-side surface of the seventh lens and the total effective focal length f of the optical imaging lens assembly may satisfy: $-3 \leq f/R13 \leq -1.5$.

According to another aspect, the present disclosure further provides an optical imaging lens assembly. The lens assembly includes, sequentially along an optical axis from an object side to an image side, a first lens, a second lens, a third lens, a fourth lens, a fifth lens, a sixth lens and a seventh lens having refractive powers. The fourth lens may have a negative refractive power. An image-side surface of the second lens may be a convex surface. An object-side surface of the fifth lens may be a concave surface. An image-side surface of the sixth lens may be a concave surface. A total effective focal length f of the optical imaging lens assembly and an entrance pupil diameter EPD of the optical imaging lens assembly may satisfy: $f/EPD \leq 1.50$.

According to another aspect, the present disclosure further provides an optical imaging lens assembly. The lens assembly includes, sequentially along an optical axis from an object side to an image side, a first lens, a second lens, a third lens, a fourth lens, a fifth lens, a sixth lens and a seventh lens having refractive powers. The first lens may have a positive refractive power. An image-side surface of the second lens may be a convex surface. An object-side surface of the seventh lens may be a concave surface, a radius of curvature R13 of the object-side surface of the seventh lens and a total effective focal length f of the optical imaging lens assembly may satisfy: $-3 \leq f/R13 \leq -1.5$.

According to another aspect, the present disclosure further provides an optical imaging lens assembly. The lens assembly includes, sequentially along an optical axis from an object side to an image side, a first lens, a second lens, a third lens, a fourth lens, a fifth lens, a sixth lens and a seventh lens having refractive powers. The first lens may have a positive refractive power. An image-side surface of the second lens may be a convex surface. A radius of curvature R11 of an object-side surface of the sixth lens and a radius of curvature R12 of an image-side surface of the sixth lens may satisfy: $1 \leq |R11+R12|/|R11-R12| \leq 2.5$.

According to another aspect, the present disclosure further provides an optical imaging lens assembly. The lens assembly includes, sequentially along an optical axis from an object side to an image side, a first lens, a second lens, a third lens, a fourth lens, a fifth lens, a sixth lens and a seventh lens having refractive powers. The first lens may have a positive refractive power. An image-side surface of the second lens may be a convex surface. A total effective focal length f of the optical imaging lens assembly and a combined focal length f67 of the sixth lens and the seventh lens may satisfy: $f/f67 \leq 0.7$.

According to another aspect, the present disclosure further provides an optical imaging lens assembly. The lens assembly includes, sequentially along an optical axis from an object side to an image side, a first lens, a second lens, a third lens, a fourth lens, a fifth lens, a sixth lens and a seventh lens having refractive powers. The first lens may have a positive refractive power. An image-side surface of the second lens may be a convex surface. A combined focal length f67 of the sixth lens and the seventh lens and a combined focal length f123 of the first lens, the second lens and the third lens may satisfy: $1 \leq f67/f123 \leq 5$.

In the present disclosure, multiple lenses (e.g., seven lenses) are used. By reasonably distributing the refractive powers and the surface types of the lenses and the spacing distances between the lenses, the optical imaging system has a large aperture advantage, enhances the illumination of the image plane, and improves the imaging effect under insufficient light conditions. At the same time, the optical imaging lens assembly with the above configuration may have at least one advantageous effect such as ultra-thinness, miniaturization, large aperture, low sensitivity, good processability, and high imaging quality.

BRIEF DESCRIPTION OF THE DRAWINGS

After reading detailed descriptions of non-limiting implementations with reference to the accompanying drawings, other features, objectives and advantages of the present disclosure will become more apparent. In the accompanying drawings:

FIG. 1 is a schematic structural diagram illustrating an optical imaging lens assembly according to Embodiment 1 of the present disclosure;

FIGS. 2A-2D respectively illustrate a longitudinal aberration curve, an astigmatic curve, a distortion curve and a lateral color curve of the optical imaging lens assembly according to Embodiment 1;

FIG. 13 is a schematic structural diagram illustrating an optical imaging lens assembly according to Embodiment 7 of the present disclosure;

FIGS. 14A-14D respectively illustrate a longitudinal aberration curve, an astigmatic curve, a distortion curve and a lateral color curve of the optical imaging lens assembly according to Embodiment 7;

FIG. 17 is a schematic structural diagram illustrating an optical imaging lens assembly according to Embodiment 9 of the present disclosure;

FIGS. 18A-18D respectively illustrate a longitudinal aberration curve, an astigmatic curve, a distortion curve and a lateral color curve of the optical imaging lens assembly according to Embodiment 9;

FIGS. 22A-22D respectively illustrate a longitudinal aberration curve, an astigmatic curve, a distortion curve and a lateral color curve of the optical imaging lens assembly according to Embodiment 11;

FIG. 23 is a schematic structural diagram illustrating an optical imaging lens assembly according to Embodiment 12 of the present disclosure;

FIG. 25 is a schematic structural diagram illustrating an optical imaging lens assembly according to Embodiment 13 of the present disclosure;

FIGS. 26A-26D respectively illustrate a longitudinal aberration curve, an astigmatic curve, a distortion curve and a lateral color curve of the optical imaging lens assembly according to Embodiment 13;

FIG. 27 is a schematic structural diagram illustrating an optical imaging lens assembly according to Embodiment 14 of the present disclosure;

FIG. 29 is a schematic structural diagram illustrating an optical imaging lens assembly according to Embodiment 15 of the present disclosure; and FIGS. 30A-30D respectively illustrate a longitudinal aberration curve, an astigmatic curve, a distortion curve and a lateral color curve of the optical imaging lens assembly according to Embodiment 15.

DETAILED DESCRIPTION OF EMBODIMENTS

Figures 2C, 2D:
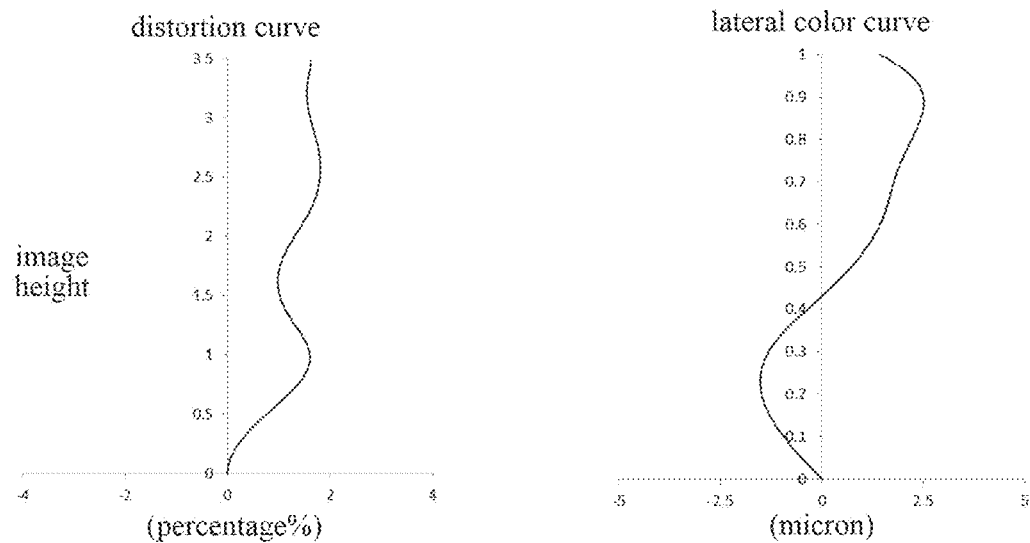

For a better understanding of the present disclosure, various aspects of the present disclosure will be described in more detail with reference to the accompanying drawings. It should be understood that the detailed description is merely an illustration of the exemplary implementations of the present disclosure rather than a limitation on the scope of the present disclosure in any way. Throughout the specification, the same reference numerals designate the same elements. The expression "and/or" includes any and all combinations of one or more of the associated listed items.

It should be noted that in the specification, the expressions, such as "first," "second" and "third" are only used to distinguish one feature from another, rather than represent any limitations to the features. Thus, the first lens discussed below may also be referred to as the second lens or the third lens without departing from the teachings of the present disclosure.

In the accompanying drawings, the thicknesses, sizes and shapes of the lenses have been slightly exaggerated for the convenience of explanation. Specifically, shapes of spherical surfaces or aspheric surfaces shown in the accompanying drawings are shown by examples. That is, the shapes of the spherical surfaces or the aspheric surfaces are not limited to the shapes of the spherical surfaces or the aspheric surfaces shown in the accompanying drawings. The accompanying drawings are merely illustrative and not strictly drawn to scale.

As used herein, the paraxial area refers to an area near the optical axis. If the surface of the lens is a convex surface and the position of the convex surface is not defined, it indicates that the surface of the lens is convex at least in the paraxial area; if the surface of the lens is a concave surface and the position of the concave surface is not defined, it indicates that the surface of the lens is concave at least in the paraxial area. The surface closest to the object in each lens is referred to as the object-side surface, and the surface closest to the image plane in each lens is referred to as the image-side surface.

It should be further understood that the terms "comprising," "including," "having" and variants thereof, when used in the specification, specify the presence of stated features, elements and/or components, but do not exclude the presence or addition of one or more other features, elements, components and/or combinations thereof. In addition, expressions, such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that the embodiments in the present disclosure and the features in the embodiments may be combined with each other on a non-conflict basis. The present disclosure will be described below in detail with reference to the accompanying drawings and in combination with the embodiments.

Characteristics, principles and other aspects of the present disclosure will be described below in detail.

The optical imaging lens assembly according to exemplary implementations of the present disclosure has, for example, seven lenses having refractive powers, i.e., a first lens, a second lens, a third lens, a fourth lens, a fifth lens, a sixth lens and a seventh lens. The seven lenses are arranged in sequence from an object side to an image side along an optical axis.

In the following, by properly configuring the parameters such as refractive powers and surface types of the lenses, and the spacing distance on the axis between the lenses in the imaging lens assembly, the lens assembly may have beneficial effects such as ultra-thin, large aperture, and high imaging quality.

An effective focal length f5 of the fifth lens and an effective focal length f1 of the first lens may satisfy: $-2 \leq f5/f1 \leq 0$, and more specifically, f5 and f1 may further satisfy: $-1.71 \leq f5/f1 \leq -0.14$. Properly arranging the refractive powers of the first lens and the fifth lens may effectively reduce the aberration of the entire optical system and reduce the sensitivity of the optical system. In an exemplary implementation, the first lens may have a positive refractive power and the fifth lens may have a negative refractive power.

An effective focal length f3 of the third lens and an effective focal length f6 of the sixth lens may satisfy: $-2 \leq f3/f6 \leq -1$, and more specifically, f3 and f6 may further satisfy: $-1.93 \leq f3/f6 \leq -1.19$. Properly arranging the refractive powers of the first lens and the fifth lens is beneficial to correcting the chromatic aberration of the system. At the same time, it is also beneficial to ensuring lens processability and assembly processability. In an exemplary implementation, the third lens may have a negative refractive power and the sixth lens may have a positive refractive power.

A total effective focal length f of the optical imaging lens assembly and a combined focal length f67 of the sixth lens and the seventh lens may satisfy: $f/f67 \leq 0.7$, and more specifically, f and f67 may further satisfy: $0.17 \leq f/f67 \leq 0.64$. By controlling the combined focal length f67 of the sixth lens and the seventh lens within a proper range, the astigmatism contribution of the sixth lens and the seventh lens may be within a proper range, thereby effectively balancing the contribution of the system, thereby enabling the system to have a good imaging quality. In an exemplary implementation, the combined refractive power of the sixth lens and the seventh lens may be a positive refractive power. Alternatively, the sixth lens may have a positive refractive power and the seventh lens may have a negative refractive power.

The combined focal length f67 of the sixth lens and the seventh lens and a combined focal length f123 of the first lens, the second lens and the third lens may satisfy: $1 \leq f67/f123 \leq 5$, and more specifically, f67 and f123 may further satisfy: $1.22 \leq f67/f123 \leq 4.66$. Properly arranging f67 and f123 may be beneficial to shortening the total track length of the lens assembly to achieve miniaturization characteristic of the imaging system, enlarging the field-of-view of the lens assembly to achieve wide-angle characteristic of the imaging system, correcting various types of aberrations to enhance imaging quality and clarity of the imaging system, and reducing sensitivity of the lens assembly. In an exemplary implementation, the combined refractive power of the sixth lens and the seventh lens and the combined refractive power of the first lens, the second lens, and the third lens may be positive refractive powers. Alternatively, the first lens may have a positive refractive power, the second lens may have a positive refractive power, the third lens may have a negative refractive power, the sixth lens may have a positive refractive power, and the seventh lens may have a negative refractive power.

In an implementation, the first lens may have a positive refractive power, the second lens may have a positive refractive power, the third lens may have a negative refractive power, the fourth lens may have a positive refractive power, the fifth lens may have a negative refractive power, the sixth lens may have a positive refractive power, and the seventh lens may have a negative refractive power.

In an implementation, the first lens may have a positive refractive power, the second lens may have a positive refractive power, the third lens may have a negative refractive power, the fourth lens may have a negative refractive power, the fifth lens may have a negative refractive power, the sixth lens may have a positive refractive power, and the seventh lens may have a negative refractive power.

A radius of curvature R1 of an object-side surface of the first lens and a radius of curvature R2 of an image-side surface of the first lens may satisfy: $-120 \leq (R1+R2)/(R1-R2) \leq 0$, and more specifically, R1 and R2 may further satisfy: $-115.10 \leq (R1+R2)/(R1-R2) \leq -4.37$. By controlling the radii of curvature of the object-side surface and the image-side surface of the first lens within a proper range, the processing characteristic of the first lens may be ensured, and the system spherical aberration may be effectively corrected. Alternatively, the object-side surface of the first lens may be a convex surface, and the image-side surface may be a concave surface.

In an implementation, the second lens may be arranged as a biconvex lens having positive refractive powers, both of the object-side surface and the image-side surface may be convex surfaces.

The radius of curvature R1 of the object-side surface of the first lens and a radius of curvature R6 of an image-side surface of the third lens may satisfy: $-11 \leq (R1+R6)/(R1-R6) \leq -2.5$, and more specifically, R1 and R6 may further satisfy: $-10.37 \leq (R1+R6)/(R1-R6) \leq -3.11$. Properly arranging the radius of curvature R1 of the object-side surface of the first lens and the radius of curvature R6 of the image-side surface of the third lens may effectively balance the high-order spherical aberration of the system and reduce the field-of-view sensitivity in the central area of the system.

Alternatively, the object-side surface of the first lens may be a convex surface, and the image-side surface of the third lens may be a concave surface.

A radius of curvature R9 of an object-side surface of the fifth lens and a radius of curvature R10 of the image-side surface of the fifth lens may satisfy: |R9+R10|/|R9−R10|≤3, and more specifically, R9 and R10 may further satisfy: 0.06≤|R9+R10|/|R9−R10|≤2.58. Properly arranging the radii of curvature of the object-side surface and the image-side surface of the fifth lens may effectively correct the off-axis coma aberration and the astigmatism, reduce the light deflection angle, and enhance the relative brightness of the image plane. Alternatively, at least one of the object-side surface or the image-side surface of the fifth lens may be a concave surface. For example, the object-side surface of the fifth lens may be a convex surface, the image-side surface may be a concave surface, and, for example, the object-side surface and the image-side surface of the fifth lens may both be concave surfaces.

A radius of curvature R11 of an object-side surface of the sixth lens and a radius of curvature R12 of the image-side surface of the sixth lens may satisfy: 1≤|R11+R12|/|R11−R12|≤2.5, and more specifically, R11 and R12 may further satisfy: 1.12≤|R11+R12|/|R11−R12|≤2.22. Properly arranging the radii of curvature of the object-side surface and the image-side surface of the sixth lens may facilitate the correction of the system astigmatism, and also facilitate matching the chief ray incident angle CRA of the chip. Alternatively, the object-side surface of the sixth lens may be a convex surface, and the image-side surface may be a concave surface.

A radius of curvature R13 of an object-side surface of the seventh lens and the total effective focal length f of the optical imaging lens assembly may satisfy: −3≤f/R13≤−1.5, and more specifically, f and R13 may further satisfy: −2.73≤f/R13≤−1.77. Properly controlling the radius of curvature R13 of the object-side surface of the seventh lens may improve the trend of the light on the seventh lens and improve the relative illumination of the lens assembly. At the same time, properly arranging the object-side surface of the seventh lens may further effectively correct the astigmatism of the imaging system. In an exemplary implementation, the object-side surface of the seventh lens may be a concave surface.

An abbe number V2 of the second lens and an abbe number V3 of the third lens may satisfy: |V2−V3|≤50, and further, V2 and V3 may satisfy: 20≤|V2−V3|≤40, and further, V2 and V3 may satisfy: 30≤|V2−V3|≤40, for example, V2 and V3 may satisfy: |V2−V3|=35.70. Properly distributing the abbe numbers of the second lens and the third lens is advantageous for correcting the chromatic aberration of the system and balancing the system aberrations, thereby improving the imaging quality of the lens assembly.

A spacing distance T34 between the third lens and the fourth lens on the optical axis and a spacing distance T12 between the first lens and the second lens on the optical axis may satisfy: 1.5≤T34/T12≤4, and more specifically, T34 and T12 may further satisfy: 1.67≤T34/T12−≤3.77. Properly arranging the spacing distance between the first lens and the second lens and the spacing distance between the third lens and the fourth lens on the optical axis may reduce the light deflection angle and reduce the sensitivity of the imaging system under the premise of ensuring the imaging quality.

A spacing distance T67 between the sixth lens and the seventh lens on the optical axis and a spacing distance T56 between the fifth lens and the sixth lens on the optical axis may satisfy: 3≤T67/T56≤7, and more specifically, T67 and T56 may further satisfy: 3.32≤T67/T56≤6.70. Properly arranging the spacing distance between the fifth lens, the sixth lens and the seventh lens on the optical axis may effectively compress the longitudinal dimension of the system, thereby realizing the ultra-thin characteristic of the lens assembly, so that the optical imaging lens assembly may be better applied to size-limited portable electronic devices.

The total effective focal length f of the optical imaging lens assembly and an entrance pupil diameter EPD of the optical imaging lens assembly may satisfy: f/EPD≤1.90, and further, f and EPD may further satisfy: f/EPD≤1.70 and/or f/EPD≤1.50, for example, f and EPD may satisfy: 1.34≤f/EPD≤1.86. The smaller the aperture number Fno (i.e., the total effective focal length f of the lens assembly/the entrance pupil diameter EPD of the lens entrance) of the optical imaging lens assembly, the larger the aperture of the lens assembly, and the greater the amount of light admitted in a given time unit. The reduction of the aperture number Fno may effectively enhance the brightness of the image plane, so that the lens assembly can better satisfy the shooting requirements when the light is insufficient, such as cloudy days or at dusk. Configuring the lens assembly to satisfy the conditional expression: f/EPD≤1.90 makes the lens assembly to have a large aperture advantage in the process of increasing the amount of light admitted, which enhance the illumination of the image plane, thereby improving the imaging effect of the lens assembly in a dark environment.

The optical imaging lens assembly may also include a diaphragm for improving the imaging quality. Alternatively, the optical imaging lens assembly may include an aperture disposed between the object-side and the first lens, for example, an aperture stop.

Alternatively, the optical imaging lens assembly may further include an optical filter for correcting the color deviation and/or a cover glass for protecting the photosensitive element on the image plane.

The optical imaging lens assembly according to the above implementations of the present disclosure may use multiple lenses, for example, seven lenses as described above. By reasonably distributing the refractive power and the surface type of each lens, the center thickness of each lens, the spacing distances on the axis between the lenses, etc., it is possible to provide an optical imaging lens assembly having advantages such as ultra-thin, large-aperture, high imaging quality and low sensitivity that may be suitable for portable electronic products.

In the implementations of the present disclosure, at least one of the surfaces of the each lens is an aspheric surface. The aspheric lens is characterized in that its curvature continuously changes from the center of the lens to the periphery. In contrast to a spherical lens having a constant curvature from the center of the lens to the periphery, the aspheric lens has a better radius-of-curvature characteristic, and has advantages of improving a distortion aberration and an astigmatic aberration. The use of the aspheric lens can eliminate as much as possible the aberrations that occur during the imaging, thereby improving the imaging quality.

However, it should be understood by those skilled in the art that the various results and advantages described in the present specification may be obtained by changing the number of the lenses constituting the optical imaging lens assembly without departing from the technical solution claimed by the present disclosure. For example, although seven lenses are described as an example in the implementations, the optical imaging lens assembly is not limited to include seven lenses. If desired, the optical imaging lens assembly may also include other numbers of lenses.

Specific embodiments of the optical imaging lens assembly that may be applied to the above implementations are further described below with reference to the accompanying drawings.

Embodiment 1

An optical imaging lens assembly according to Embodiment 1 of the present disclosure is described below with reference to FIGS. 1-2D. FIG. 1 is a schematic structural diagram illustrating an optical imaging lens assembly according to Embodiment 1 of the present disclosure.

As shown in FIG. 1, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a concave surface, an image-side surface S6 of the third lens is a concave surface, and the object-side surface S5 and the image-side surface S6 of the third lens E3 are both aspheric surfaces.

The fourth lens E4 has a negative refractive power, an object-side surface S7 of the fourth lens is a concave surface, an image-side surface S8 of the fourth lens is a convex surface, and the object-side surface S7 and the image-side surface S8 of the fourth lens E4 are both aspheric surfaces.

The fifth lens E5 has a negative refractive power, an object-side surface S9 of the fifth lens is a concave surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a convex surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include an diaphragm STO disposed between the object side and the first lens E1, for improving the imaging quality of the lens assembly.

Table 1 shows the surface type, the radius of curvature, the thickness, the material and the conic coefficient of each lens of the optical imaging lens assembly in Embodiment 1. The radius of curvature and the thickness are shown in millimeters (mm).

TABLE 1

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.2691 | | | |
| S1 | aspheric | 1.8966 | 0.4409 | 1.54 | 55.7 | −2.3882 |
| S2 | aspheric | 2.8227 | 0.2279 | | | −9.0973 |
| S3 | aspheric | 2.7605 | 0.5365 | 1.55 | 56.1 | −14.2515 |
| S4 | aspheric | −9.2694 | 0.0367 | | | −65.4469 |
| S5 | aspheric | −497.8584 | 0.2200 | 1.67 | 20.4 | −101.2443 |
| S6 | aspheric | 3.6857 | 0.4286 | | | −0.5897 |
| S7 | aspheric | −107.6670 | 0.2512 | 1.67 | 20.4 | 0.0000 |
| S8 | aspheric | −148.5791 | 0.1319 | | | −8.0448 |
| S9 | aspheric | −40.9435 | 0.4024 | 1.67 | 20.4 | −14.7073 |
| S10 | aspheric | 8.8726 | 0.1998 | | | 15.5971 |
| S11 | aspheric | 1.5837 | 0.4615 | 1.55 | 56.1 | −7.6720 |
| S12 | aspheric | 5.4538 | 0.9597 | | | 0.0000 |
| S13 | aspheric | −1.5902 | 0.3000 | 1.54 | 55.7 | −0.7902 |
| S14 | aspheric | −8.4982 | 0.2289 | | | 0.0000 |
| S15 | spherical | infinite | 0.2081 | 1.52 | 64.2 | |
| S16 | spherical | infinite | 0.1130 | | | |
| S17 | spherical | infinite | | | | |

As can be seen from Table 1, the radius of curvature R1 of the object-side surface S1 of the first lens E1 and the radius of curvature R2 of the image-side surface S2 of the first lens E1 satisfy: (R1+R2)/(R1−R2)=−5.10. The radius of curvature R1 of the object-side surface S1 of the first lens E1 and the radius of curvature R6 of the image-side surface S6 of the third lens E3 satisfy: (R1+R6)/(R1−R6)=−3.12. The radius of curvature R9 of the object-side surface S9 of the fifth lens E5 and the radius of curvature R10 of the image-side surface S10 of the fifth lens E5 satisfy: |R9+R10|/|R9−R10|=0.64. The radius of curvature R11 of the object-side surface S11 of the sixth lens E6 and the radius of curvature R12 of the image-side surface S12 of the sixth lens E6 satisfy: |R11+R12|/|R11−R12|=1.82. The spacing distance T34 between the third lens E3 and the fourth lens E4 on the optical axis and the spacing distance T12 between the first lens E1 and the second lens E2 on the optical axis satisfy: T34/T12=1.88. The spacing distance T67 between the sixth lens E6 and the seventh lens E7 on the optical axis and the spacing distance T56 between the fifth lens E5 and the sixth lens E6 on the optical axis satisfy: T67/T56=4.80. The abbe number V2 of the second lens E2 and the abbe number V3 of the third lens E3 satisfy: |V2−V3|=35.70.

In this embodiment, each lens may be an aspheric lens, and the surface type x of each aspheric surface is defined by the following formula:

$$x = \frac{ch^2}{1+\sqrt{1-(k+1)c^2h^2}} + \sum A_i h^i \qquad (1)$$

Here, x is the sag—the axis-component of the displacement of the surface from the aspheric vertex, when the surface is at height h from the optical axis; c is the paraxial curvature of the aspheric surface, and c=1/R (i.e., the paraxial curvature c is the reciprocal of the radius of curvature R in Table 1 above); k is the conic coefficient (given in the above Table 1); and Ai is the $i^{th}$ order correction coefficient of the aspheric surface. Table 2 below shows the high-order coefficients $A_4$, $A_6$, $A_8$, $A_{10}$, $A_{12}$, $A_{14}$, $A_{16}$, $A_{18}$ and $A_{20}$ applicable to the surfaces S1-S14 in Embodoment 1.

TABLE 2

| surface number | A4 | A6 | A8 | A10 | A12 |
|---|---|---|---|---|---|
| S1 | 2.5972E−02 | −8.0753E−03 | 2.7260E−03 | −2.8982E−02 | 6.3894E−02 |
| S2 | 5.6390E−03 | −4.6467E−02 | 1.1725E−01 | −3.5723E−01 | 6.9989E−01 |
| S3 | 3.3995E−02 | −6.8515E−02 | 3.2601E−02 | 5.7953E−02 | −1.7212E−01 |
| S4 | −2.2098E−02 | −1.9298E−01 | 6.4919E−01 | −1.4119E+00 | 2.1070E+00 |
| S5 | 4.3040E−02 | −2.3904E−01 | 6.9281E−01 | −1.4927E+00 | 2.2302E+00 |
| S6 | 5.2024E−02 | −1.2516E−01 | 3.2868E−01 | −7.3821E−01 | 1.1260E+00 |
| S7 | −3.0016E−02 | −3.4909E−02 | −2.4316E−01 | 1.0040E+00 | −1.8029E+00 |
| S8 | 5.3739E−02 | −1.3483E−01 | −3.3676E−01 | 1.2208E+00 | −1.8034E+00 |
| S9 | 1.0254E−01 | −1.5798E−01 | 1.5362E−03 | 2.0670E−01 | −3.3454E−01 |
| S10 | −1.3746E−01 | 7.2725E−02 | 2.0299E−02 | −9.3877E−02 | 8.6951E−02 |
| S11 | 8.1115E−02 | −1.7867E−01 | 1.4400E−01 | −7.7858E−02 | 3.0502E−02 |
| S12 | 1.0374E−01 | −1.7007E−01 | 8.9959E−02 | −1.9136E−02 | −1.9298E−03 |
| S13 | 1.8414E−01 | −3.5799E−01 | 2.9280E−01 | −1.2737E−01 | 3.3650E−02 |
| S14 | 1.6736E−01 | −2.6622E−01 | 1.7253E−01 | −6.2432E−02 | 1.3886E−02 |

| surface number | A14 | A16 | A18 | A20 |
|---|---|---|---|---|
| S1 | −8.4020E−02 | 6.4279E−02 | −2.7086E−02 | 4.8515E−03 |
| S2 | −8.3899E−01 | 6.0455E−01 | −2.4098E−01 | 4.0829E−02 |
| S3 | 2.6049E−01 | −2.1817E−01 | 9.4616E−02 | −1.6724E−02 |
| S4 | −2.0496E+00 | 1.2217E+00 | −4.0221E−01 | 5.5806E−02 |
| S5 | −2.1963E+00 | 1.3307E+00 | −4.4298E−01 | 6.1653E−02 |
| S6 | −1.1175E+00 | 6.9112E−01 | −2.4037E−01 | 3.6113E−02 |
| S7 | 1.8792E+00 | −1.1448E+00 | 3.7694E−01 | −5.2149E−02 |
| S8 | 1.5333E+00 | −7.5202E−01 | 1.9575E−01 | −2.0912E−02 |
| S9 | 2.8807E−01 | −1.3945E−01 | 3.5541E−02 | −3.7331E−03 |
| S10 | −4.2102E−02 | 1.1824E−02 | −1.8452E−03 | 1.2463E−04 |
| S11 | −8.9876E−03 | 1.8222E−03 | −2.1241E−04 | 1.0379E−05 |
| S12 | 1.9738E−03 | −4.4224E−04 | 4.4872E−05 | −1.7808E−06 |
| S13 | −5.6081E−03 | 5.7864E−04 | −3.3839E−05 | 8.5856E−07 |
| S14 | −1.9483E−03 | 1.6809E−04 | −8.1187E−06 | 1.6723E−07 |

Table 3 below shows the effective focal lengths f1-f7 of the lenses in Embodiment 1, the total effective focal length f, the total track length TTL (i.e., the distance on the optical axis from the center of the object-side surface S1 of the first lens E1 to the image plane S17), and the half of the diagonal length ImgH of the effective pixel area on the image plane S17 of the optical imaging lens assembly.

TABLE 3

| parameter | | | | |
|---|---|---|---|---|
| f1 (mm) | f2 (mm) | f3 (mm) | f4 (mm) | f5 (mm) |
| value 9.24 | 3.96 | −5.49 | −588.79 | −10.92 |

| parameter | | | | |
|---|---|---|---|---|
| f6 (mm) | f7 (mm) | f (mm) | TTL (mm) | ImgH (mm) |
| value 3.92 | −3.70 | 4.22 | 5.15 | 3.48 |

It can be seen from Table 1 and Table 3 that the effective focal length f5 of the fifth lens E5 and the effective focal length f1 of the first lens E1 satisfy: f5/f1=−1.18. The effective focal length f3 of the third lens E3 and the effective focal length f6 of the sixth lens E6 satisfy: f3/f6=−1.40. The total effective focal length f of the optical imaging lens assembly and the radius of curvature R13 of the object-side surface S13 of the seventh lens E7 satisfy: f/R13=−2.65.

The total effective focal length f of the optical imaging lens assembly and the entrance pupil diameter EPD of the optical imaging lens assembly satisfy: f/EPD=1.86. The total effective focal length f of the optical imaging lens assembly and the combined focal length f67 of the sixth lens E6 and the seventh lens E7 satisfy: f/f67=0.32. The combined focal length f67 of the sixth lens E6 and the seventh lens E7 and the combined focal length f123 of the first lens E1, the second lens E2, and the third lens E3 satisfy: f67/f123=2.61.

FIG. 2A illustrates the longitudinal aberration curve of the optical imaging lens assembly according to Embodiment 1, representing deviations of focal points of light of different wavelengths converged after passing through the lens assembly. FIG. 2B illustrates the astigmatic curve of the optical imaging lens assembly according to Embodiment 1, representing a curvature of the tangential image plane and a curvature of the sagittal image plane. FIG. 2C illustrates the distortion curve of the optical imaging lens assembly according to Embodiment 1, representing amounts of distortion at different viewing angles. FIG. 2D illustrates the lateral color curve of the optical imaging lens assembly according to Embodiment 1, representing deviations of different image heights on the image plane after light passes through the lens assembly. It can be seen from FIGS. 2A-2D that the optical imaging lens assembly according to Embodiment 1 can achieve a good imaging quality.

Embodiment 2

Figure 3:
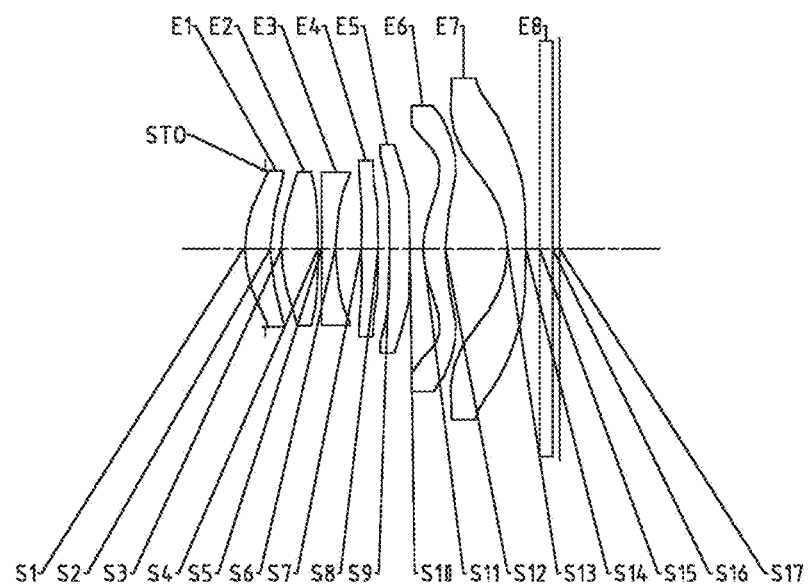
FIG. 3 is a schematic structural diagram illustrating an optical imaging lens assembly according to Embodiment 2 of the present disclosure.

An optical imaging lens assembly according to Embodiment 2 of the present disclosure is described below with reference to FIGS. 3-4D. For the purpose of brevity, the description of parts similar to those in Embodiment 1 will be omitted. FIG. 3 is a schematic structural diagram illustrating the optical imaging lens assembly according to Embodiment 2 of the present disclosure.

As shown in FIG. 3, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a convex surface, an image-side surface S36 of the third lens is a concave surface, and the object-side surface S5 and the image-side surface 36 of the third lens E3 are both aspheric surfaces.

The fourth lens E4 has a positive refractive power, an object-side surface S7 of the fourth lens is a convex surface, an image-side surface S8 of the fourth lens is a convex surface, and the object-side surface S7 and the image-side surface S8 of the fourth lens E4 are both aspheric surfaces.

The fifth lens E5 has a negative refractive power, an object-side surface S9 of the fifth lens is a concave surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a convex surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include a diaphragm STO disposed between the object side and the first lens E1, for improving the imaging quality of the lens assembly.

Table 4 shows the surface type, the radius of curvature, the thickness, the material and the conic coefficient of each lens of the optical imaging lens assembly in Embodiment 2. The radius of curvature and the thickness are shown in millimeters (mm). Table 5 shows the high-order coefficients of the aspheric surfaces in Embodiment 2. Here, the surface types of the aspheric surfaces may be defined by the formula (1) given in the above Embodiment 1. Table 6 shows the effective focal lengths f1-f7 of the lenses in Embodiment 2, the total effective focal length f, the total track length TTL and the half of the diagonal length ImgH of the effective pixel area on the image plane S17 of the optical imaging lens assembly.

TABLE 4

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.3355 | | | |
| S1 | aspheric | 1.9364 | 0.4116 | 1.54 | 55.7 | −2.3696 |
| S2 | aspheric | 2.3674 | 0.1864 | | | −7.7880 |
| S3 | aspheric | 2.3992 | 0.5987 | 1.55 | 56.1 | −10.4132 |
| S4 | aspheric | −25.0003 | 0.0613 | | | −75.0414 |
| S5 | aspheric | 21.6221 | 0.2200 | 1.67 | 20.4 | 46.4938 |
| S6 | aspheric | 3.4586 | 0.4274 | | | −2.6201 |
| S7 | aspheric | 32.8310 | 0.2775 | 1.55 | 56.1 | 0.0000 |
| S8 | aspheric | −9.9397 | 0.1860 | | | −8.0448 |
| S9 | aspheric | −11.8961 | 0.3310 | 1.67 | 20.4 | −7.6845 |
| S10 | aspheric | 10.4429 | 0.2151 | | | 30.2751 |
| S11 | aspheric | 1.4706 | 0.3644 | 1.55 | 56.1 | −6.5649 |
| S12 | aspheric | 3.8770 | 1.0205 | | | 0.0000 |
| S13 | aspheric | −1.5439 | 0.3000 | 1.54 | 55.7 | −0.8008 |
| S14 | aspheric | −7.1608 | 0.2260 | | | 0.0000 |
| S15 | spherical | infinite | 0.2110 | 1.52 | 64.2 | |
| S16 | spherical | infinite | 0.1130 | | | |
| S17 | spherical | infinite | | | | |

TABLE 5

| surface number | A4 | A6 | A8 | A10 | A12 |
|---|---|---|---|---|---|
| S1 | 2.1155E−02 | −2.7388E−02 | 7.3883E−02 | −1.7283E−01 | 2.5289E−01 |
| S2 | 1.3575E−02 | −6.2913E−02 | 8.4195E−02 | −1.4347E−01 | 2.1693E−01 |
| S3 | 4.8922E−02 | −8.8806E−02 | 6.8220E−02 | −2.9795E−02 | −5.0883E−03 |
| S4 | −2.6034E−03 | −1.3439E−01 | 2.4630E−01 | −2.6663E−01 | 1.7982E−01 |
| S5 | 2.8645E−03 | −1.2840E−01 | 2.3724E−01 | −1.5127E−01 | −1.2370E−01 |
| S6 | 1.7102E−02 | −7.3939E−02 | 2.0710E−01 | −3.5169E−01 | 4.2357E−01 |
| S7 | 4.3221E−02 | −1.4969E−01 | −1.0150E−01 | 8.1039E−01 | −1.5026E+00 |
| S8 | 1.7227E−01 | −3.2683E−01 | −1.3590E−01 | 7.2573E−01 | −1.2313E+00 |
| S9 | 1.3580E−01 | −2.2586E−01 | 1.2184E−01 | 1.2055E−01 | −3.6558E−01 |
| S10 | −1.4237E−01 | 6.7453E−02 | 1.8220E−02 | −6.2614E−02 | 2.6461E−02 |
| S11 | 1.1758E−01 | −2.4410E−01 | 2.2754E−01 | −1.5244E−01 | 7.1464E−02 |
| S12 | 1.4115E−01 | −2.4732E−01 | 1.7599E−01 | −8.0860E−02 | 2.4936E−02 |
| S13 | 1.7135E−01 | −3.0656E−01 | 2.3236E−01 | −9.2172E−02 | 2.2048E−02 |
| S14 | 1.6093E−01 | −2.4213E−01 | 1.5145E−01 | −5.3364E−02 | 1.1637E−02 |

| surface number | A14 | A16 | A18 | A20 |
|---|---|---|---|---|
| S1 | −2.3458E−01 | 1.3278E−01 | −4.1400E−02 | 5.4093E−03 |
| S2 | −2.1273E−01 | 1.3048E−01 | −4.4902E−02 | 6.4723E−03 |
| S3 | 3.9661E−02 | −3.5608E−02 | 1.2888E−02 | −1.7881E−03 |

TABLE 5-continued

| | | | | |
|---|---|---|---|---|
| S4 | −6.5913E−02 | 6.6621E−03 | 2.9159E−03 | −7.3521E−04 |
| S5 | 2.9154E−01 | −2.1705E−01 | 7.6293E−02 | −1.0609E−02 |
| S6 | −3.8854E−01 | 2.5377E−01 | −9.8209E−02 | 1.6436E−02 |
| S7 | 1.4786E+00 | −8.2137E−01 | 2.4364E−01 | −3.0301E−02 |
| S8 | 1.0578E+00 | −4.9783E−01 | 1.2103E−01 | −1.1896E−02 |
| S9 | 3.7213E−01 | −1.8969E−01 | 4.8594E−02 | −5.0078E−03 |
| S10 | 9.0866E−03 | −9.8481E−03 | 2.7044E−03 | −2.5493E−04 |
| S11 | −2.3074E−02 | 4.8017E−03 | −5.6378E−04 | 2.7874E−05 |
| S12 | −5.0734E−03 | 6.5304E−04 | −4.8398E−05 | 1.5809E−06 |
| S13 | −3.3183E−03 | 3.0904E−04 | −1.6321E−05 | 3.7418E−07 |
| S14 | −1.6152E−03 | 1.3946E−04 | −6.8220E−06 | 1.4380E−07 |

TABLE 6

| | parameter | | | | |
|---|---|---|---|---|---|
| | f1 (mm) | f2 (mm) | f3 (mm) | f4 (mm) | f5 (mm) |
| value | 14.86 | 4.04 | −6.21 | 14.01 | −8.30 |
| | parameter | | | | |
| | f6 (mm) | f7 (mm) | f (mm) | TTL (mm) | ImgH (mm) |
| value | 4.12 | −3.74 | 4.21 | 5.15 | 3.47 |

Figure 4A:
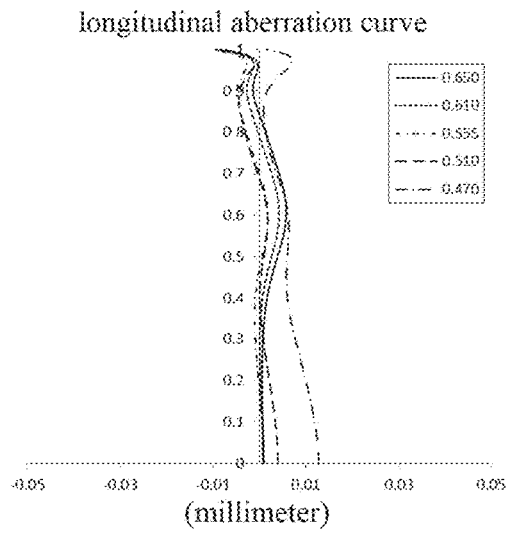
FIGS. 4A-4D respectively illustrate a longitudinal aberration curve, an astigmatic curve, a distortion curve and a lateral color curve of the optical imaging lens assembly according to Embodiment 2.
Figure 4B:
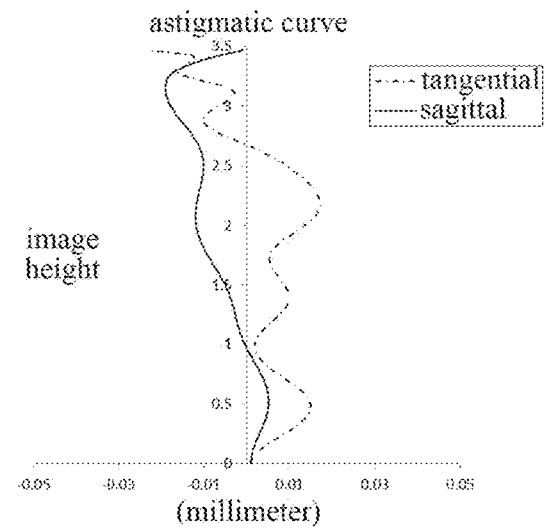
Figure 4C:
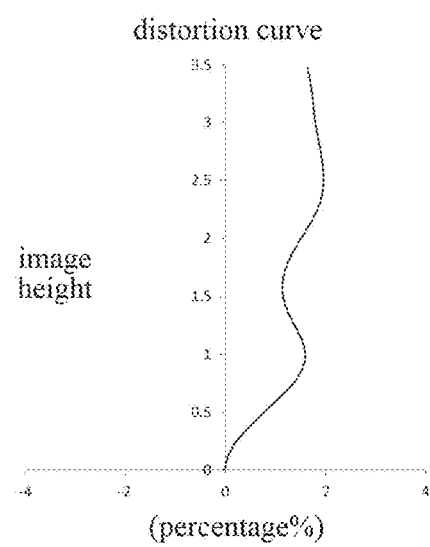
Figure 4D:
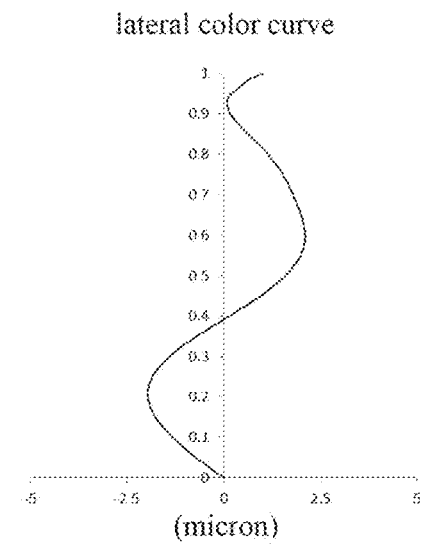

FIG. 4A illustrates the longitudinal aberration curve of the optical imaging lens assembly according to Embodiment 2, representing deviations of focal points of light of different wavelengths converged after passing through the lens assembly. FIG. 4B illustrates the astigmatic curve of the optical imaging lens assembly according to Embodiment 2, representing a curvature of the tangential image plane and a curvature of the sagittal image plane. FIG. 4C illustrates the distortion curve of the optical imaging lens assembly according to Embodiment 2, representing amounts of distortion at different viewing angles. FIG. 4D illustrates the lateral color curve of the optical imaging lens assembly according to Embodiment 2, representing deviations of different image heights on the image plane after light passes through the lens assembly. It can be seen from FIGS. 4A-4D that the optical imaging lens assembly according to Embodiment 2 can achieve a good imaging quality.

Embodiment 3

Figure 5:
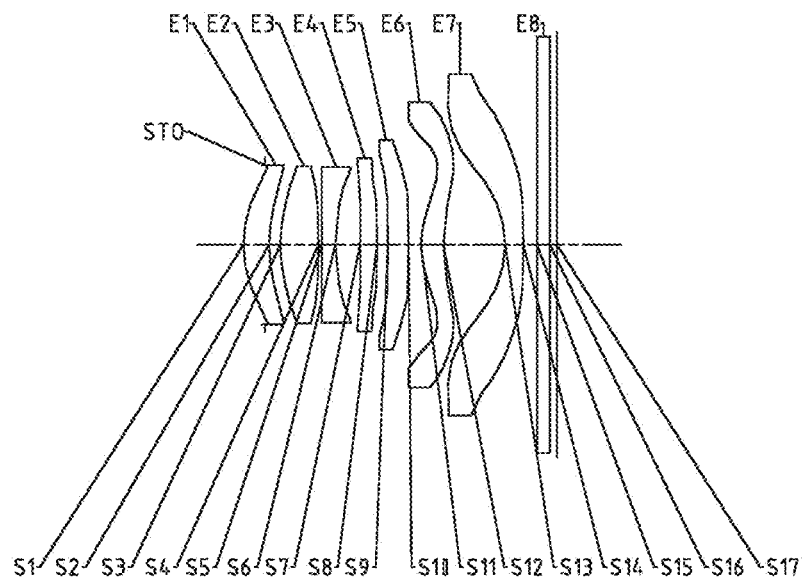
FIG. 5 is a schematic structural diagram illustrating an optical imaging lens assembly according to Embodiment 3 of the present disclosure.

An optical imaging lens assembly according to Embodiment 3 of the present disclosure is described below with reference to FIGS. 5-6D. FIG. 5 is a schematic structural diagram illustrating the optical imaging lens assembly according to Embodiment 3 of the present disclosure.

As shown in FIG. 5, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a convex surface, an image-side surface 36 of the third lens is a concave surface, and the object-side surface S5 and the image-side surface 36 of the third lens E3 are both aspheric surfaces.

The fourth lens E4 has a positive refractive power, an object-side surface S7 of the fourth lens is a convex surface, an image-side surface S8 of the fourth lens is a convex surface, and the object-side surface S7 and the image-side surface S8 of the fourth lens E4 are both aspheric surfaces.

The fifth lens E5 has a negative refractive power, an object-side surface S9 of the fifth lens is a concave surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a convex surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include an diaphragm STO disposed between the object side and the first lens E1, for improving the imaging quality of the lens assembly.

Table 7 shows the surface type, the radius of curvature, the thickness, the material and the conic coefficient of each lens of the optical imaging lens assembly in Embodiment 3. The radius of curvature and the thickness are shown in millimeters (mm). Table 8 shows the high-order coefficients of the aspheric surfaces in Embodiment 3. Here, the surface types of the aspheric surfaces may be defined by the formula (1) given in the above Embodiment 1. Table 9 shows the effective focal lengths f1-f7 of the lenses in Embodiment 3, the total effective focal length f, the total track length TTL and the half of the diagonal length ImgH of the effective pixel area on the image plane S17 of the optical imaging lens assembly.

TABLE 7

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.3546 | | | |
| S1 | aspheric | 1.9373 | 0.4210 | 1.54 | 55.7 | −2.3675 |
| S2 | aspheric | 2.3578 | 0.1850 | | | −7.9057 |
| S3 | aspheric | 2.4018 | 0.6243 | 1.55 | 56.1 | −10.5319 |
| S4 | aspheric | −25.0002 | 0.0595 | | | −78.8920 |
| S5 | aspheric | 21.3639 | 0.2200 | 1.67 | 20.4 | 45.2458 |
| S6 | aspheric | 3.4757 | 0.4071 | | | −2.6436 |
| S7 | aspheric | 32.1280 | 0.2785 | 1.55 | 56.1 | 0.0000 |
| S8 | aspheric | −9.7742 | 0.1753 | | | −8.0448 |

TABLE 7-continued

| surface number | surface type | radius of curvature | thickness | refractive index | abbe number | conic coefficient |
|---|---|---|---|---|---|---|
| S9 | aspheric | −11.6884 | 0.3420 | 1.67 | 20.4 | −65.1706 |
| S10 | aspheric | 10.3093 | 0.2054 | | | 27.7264 |
| S11 | aspheric | 1.4667 | 0.3678 | 1.55 | 56.1 | −6.5571 |
| S12 | aspheric | 3.9335 | 1.0142 | | | 0.0000 |
| S13 | aspheric | −1.5414 | 0.3000 | 1.54 | 55.7 | −0.7999 |
| S14 | aspheric | −6.8982 | 0.2260 | | | 0.0000 |
| S15 | spherical | infinite | 0.2110 | 1.52 | 64.2 | |
| S16 | spherical | infinite | 0.1130 | | | |
| S17 | spherical | infinite | | | | |

TABLE 8

| surface number | A4 | A6 | A8 | A10 | A12 |
|---|---|---|---|---|---|
| S1 | 1.9446E−02 | −1.9069E−02 | 4.2480E−02 | −9.9217E−02 | 1.4632E−01 |
| S2 | 1.4817E−02 | −7.3356E−02 | 1.2675E−01 | −2.4493E−01 | 3.6148E−01 |
| S3 | 4.7748E−02 | −8.2752E−02 | 5.1584E−02 | 5.3506E−05 | −4.1748E−02 |
| S4 | −2.2483E−03 | −1.3490E−01 | 2.4975E−01 | −2.7058E−01 | 1.7838E−01 |
| S5 | 1.5787E−03 | −1.2367E−01 | 2.3018E−01 | −1.5623E−01 | −8.9833E−02 |
| S6 | 1.9037E−02 | −9.3045E−02 | 2.9993E−01 | −6.0194E−01 | 8.3020E−01 |
| S7 | 3.8445E−02 | −1.2274E−01 | −1.9949E−01 | 1.0327E+00 | −1.8059E+00 |
| S8 | 1.7312E−01 | −3.1953E−01 | −5.3924E−02 | 8.1600E−01 | −1.3424E+00 |
| S9 | 1.3552E−01 | −2.1969E−01 | 9.2883E−02 | 1.7230E−01 | −4.1532E−01 |
| S10 | −1.4129E−01 | 6.4197E−02 | 2.8952E−02 | −7.9309E−02 | 4.3056E−02 |
| S11 | 1.1598E−01 | −2.4260E−01 | 2.2580E−01 | −1.5236E−01 | 7.2711E−02 |
| S12 | 1.4308E−01 | −2.4893E−01 | 1.7480E−01 | −7.8672E−02 | 2.3598E−02 |
| S13 | 1.7204E−01 | −3.0942E−01 | 2.3573E−01 | −9.4159E−02 | 2.2730E−02 |
| S14 | 1.6652E−01 | −2.5514E−01 | 1.6327E−01 | −5.8989E−02 | 1.3223E−02 |

| surface number | A14 | A16 | A18 | A20 |
|---|---|---|---|---|
| S1 | −1.3816E−01 | 7.9619E−02 | −2.5046E−02 | 3.2606E−03 |
| S2 | −3.3861E−01 | 1.9598E−01 | −6.3488E−02 | 8.6776E−03 |
| S3 | 6.8613E−02 | −4.9739E−02 | 1.6822E−02 | −2.2647E−03 |
| S4 | −5.9167E−02 | 8.3851E−04 | 5.0623E−03 | −1.0280E−03 |
| S5 | 2.3948E−01 | −1.7770E−01 | 6.1261E−02 | −8.2996E−03 |
| S6 | −7.9359E−01 | 4.9444E−01 | −1.7626E−01 | 2.7045E−02 |
| S7 | 1.7297E+00 | −9.4599E−01 | 2.7789E−01 | −3.4313E−02 |
| S8 | 1.1382E+00 | −5.3218E−01 | 1.2904E−01 | −1.2681E−02 |
| S9 | 4.0005E−01 | −1.9879E−01 | 5.0167E−02 | −5.1163E−03 |
| S10 | −1.6847E−03 | −5.6034E−03 | 1.8011E−03 | −1.7599E−04 |
| S11 | −2.4145E−02 | 5.1928E−03 | −6.3016E−04 | 3.2156E−05 |
| S12 | −4.6325E−03 | 5.7026E−04 | −4.0103E−05 | 1.2373E−06 |
| S13 | −3.4611E−03 | 3.2703E−04 | −1.7573E−05 | 4.1119E−07 |
| S14 | −1.8921E−03 | 1.6898E−04 | −8.5838E−06 | 1.8888E−07 |

TABLE 9

| parameter | | | | |
|---|---|---|---|---|
| f1 (mm) | f2 (mm) | f3 (mm) | f4 (mm) | f5 (mm) |
| value 15.00 | 4.05 | −6.27 | 13.76 | −8.18 |

| parameter | | | | |
|---|---|---|---|---|
| f6 (mm) | f7 (mm) | f (mm) | TTL (mm) | ImgH (mm) |
| value 4.07 | −3.77 | 4.18 | 5.15 | 3.50 |

Figure 6A:
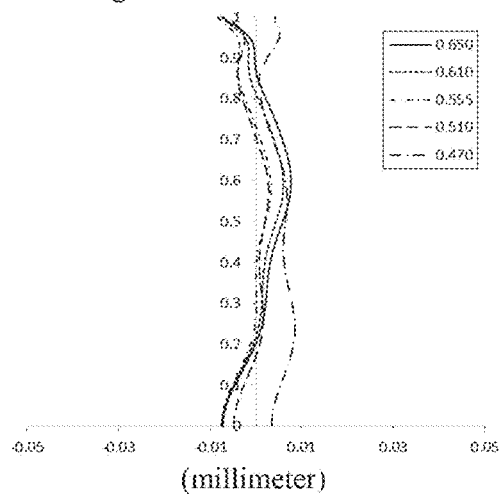
FIGS. 6A-6D respectively illustrate a longitudinal aberration curve, an astigmatic curve, a distortion curve and a lateral color curve of the optical imaging lens assembly according to Embodiment 3.
Figure 6B:
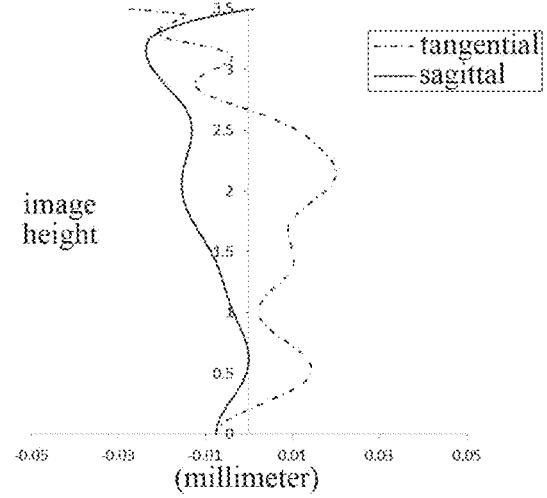
Figures 6C, 6D:
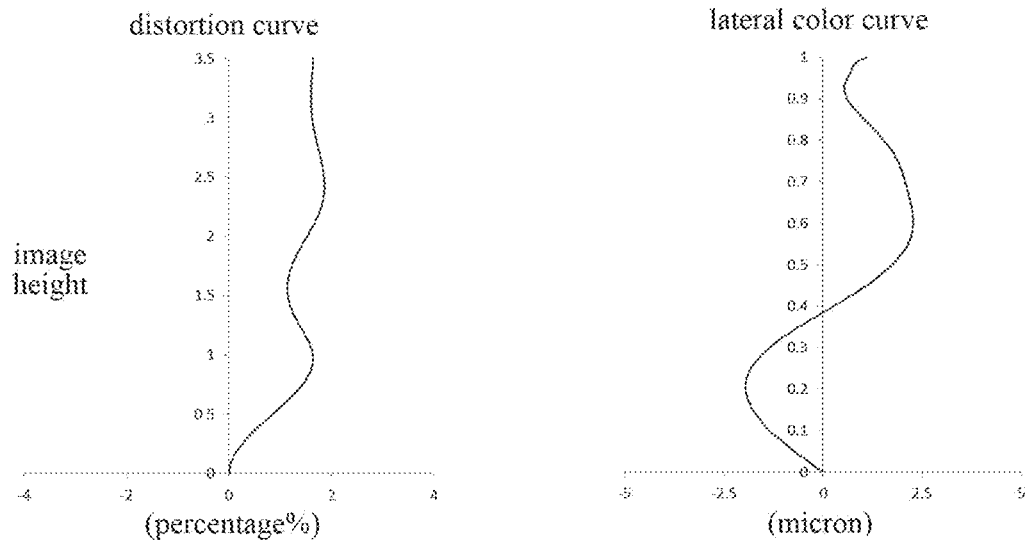

FIG. 6A illustrates the longitudinal aberration curve of the optical imaging lens assembly according to Embodiment 3, representing deviations of focal points of light of different wavelengths converged after passing through the lens assembly. FIG. 6B illustrates the astigmatic curve of the optical imaging lens assembly according to Embodiment 3, representing a curvature of the tangential image plane and a curvature of the sagittal image plane. FIG. 6C illustrates the distortion curve of the optical imaging lens assembly according to Embodiment 3, representing amounts of distortion at different viewing angles. FIG. 6D illustrates the lateral color curve of the optical imaging lens assembly according to Embodiment 3, representing deviations of different image heights on the image plane after light passes through the lens assembly. It can be seen from FIGS. 6A-6D that the optical imaging lens assembly according to Embodiment 3 can achieve a good imaging quality.

Embodiment 4

Figure 7:
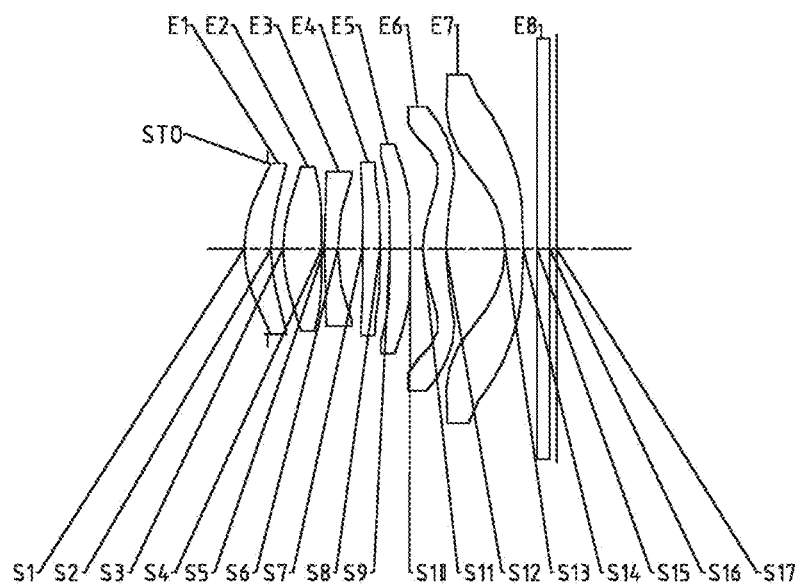
FIG. 7 is a schematic structural diagram illustrating an optical imaging lens assembly according to Embodiment 4 of the present disclosure.

An optical imaging lens assembly according to Embodiment 4 of the present disclosure is described below with reference to FIGS. 7-8D. FIG. 7 is a schematic structural diagram illustrating the optical imaging lens assembly according to Embodiment 4 of the present disclosure.

As shown in FIG. 7, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a convex surface, an image-side surface S6 of the third lens is a concave surface, and the object-side surface S5 and the image-side surface S6 of the third lens E3 are both aspheric surfaces.

The fourth lens E4 has a positive refractive power, an object-side surface S7 of the fourth lens is a convex surface, an image-side surface S8 of the fourth lens is a convex surface, and the object-side surface S7 and the image-side surface S8 of the fourth lens E4 are both aspheric surfaces.

The fifth lens E5 has a negative refractive power, an object-side surface S9 of the fifth lens is a concave surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a convex surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include a diaphragm STO disposed between the object side and the first lens E1, for improving the imaging quality of the lens assembly.

Table 10 shows the surface type, the radius of curvature, the thickness, the material and the conic coefficient of each lens of the optical imaging lens assembly in Embodiment 4. The radius of curvature and the thickness are shown in millimeters (mm). Table 11 shows the high-order coefficients of the aspheric surfaces in

TABLE 10

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.3852 | | | |
| S1 | aspheric | 1.9779 | 0.4403 | 1.54 | 55.7 | −2.5259 |
| S2 | aspheric | 2.3866 | 0.2013 | | | −8.9696 |
| S3 | aspheric | 2.3164 | 0.6359 | 1.55 | 56.1 | −10.1089 |
| S4 | aspheric | −69.6004 | 0.0453 | | | 44.7384 |
| S5 | aspheric | 11.9380 | 0.2200 | 1.67 | 20.4 | 47.8815 |
| S6 | aspheric | 3.2583 | 0.4070 | | | −2.0671 |
| S7 | aspheric | 25.2168 | 0.2892 | 1.55 | 56.1 | 0.0000 |
| S8 | aspheric | −10.1426 | 0.1607 | | | −8.0448 |
| S9 | aspheric | −11.5506 | 0.3359 | 1.67 | 20.4 | −99.0000 |
| S10 | aspheric | 9.5663 | 0.2064 | | | 21.8608 |
| S11 | aspheric | 1.5140 | 0.3809 | 1.55 | 56.1 | −6.8391 |
| S12 | aspheric | 4.4690 | 0.9770 | | | 0.0000 |
| S13 | aspheric | −1.5143 | 0.3000 | 1.54 | 55.7 | −0.8056 |
| S14 | aspheric | −6.2084 | 0.2260 | | | 0.0000 |
| S15 | spherical | infinite | 0.2110 | 1.52 | 64.2 | |
| S16 | spherical | infinite | 0.1130 | | | |
| S17 | spherical | infinite | | | | |

TABLE 11

| surface number | A4 | A6 | A8 | A10 | A12 |
|---|---|---|---|---|---|
| S1 | 1.8456E−02 | −1.9502E−02 | 3.5955E−02 | −7.1652E−02 | 9.0832E−02 |
| S2 | 1.9932E−02 | −9.2695E−02 | 1.7439E−01 | −3.2421E−01 | 4.3559E−01 |

TABLE 11-continued

| | | | | | |
|---|---|---|---|---|---|
| S3 | 5.5011E−02 | −1.0273E−01 | 1.2249E−01 | −1.7859E−01 | 2.2952E−01 |
| S4 | 1.0768E−02 | −1.8017E−01 | 3.2623E−01 | −3.3889E−01 | 2.1759E−01 |
| S5 | 1.2450E−02 | −1.7957E−01 | 3.8768E−01 | −4.5898E−01 | 3.4103E−01 |
| S6 | 2.1019E−02 | −9.1022E−02 | 2.6909E−01 | −4.7179E−01 | 5.7465E−01 |
| S7 | 3.4598E−02 | −8.8962E−02 | −3.4339E−01 | 1.3824E+00 | −2.3244E+00 |
| S8 | 1.8834E−01 | −3.8942E−01 | 1.7624E−01 | 3.6141E−01 | −8.1439E−01 |
| S9 | 1.4103E−01 | −2.9070E−01 | 3.2948E−01 | −2.1883E−01 | −5.7838E−02 |
| S10 | −1.4255E−01 | 3.0547E−02 | 1.5350E−01 | −2.7163E−01 | 2.0566E−01 |
| S11 | 1.0135E−01 | −2.4567E−01 | 2.5964E−01 | −1.8970E−01 | 9.3266E−02 |
| S12 | 1.3306E−01 | −2.5156E−01 | 1.9951E−01 | −1.0354E−01 | 3.5504E−02 |
| S13 | 1.7409E−01 | −3.2261E−01 | 2.4878E−01 | −9.9912E−02 | 2.4096E−02 |
| S14 | 1.6621E−01 | −2.5444E−01 | 1.6358E−01 | −5.9407E−02 | 1.3405E−02 |

| surface number | A14 | A16 | A18 | A20 |
|---|---|---|---|---|
| S1 | −7.4007E−02 | 3.6922E−02 | −1.0018E−02 | 1.1190E−03 |
| S2 | −3.6884E−01 | 1.8970E−01 | −5.3865E−02 | 6.4331E−03 |
| S3 | −1.8453E−01 | 8.9589E−02 | −2.4411E−02 | 2.8141E−03 |
| S4 | −8.4793E−02 | 1.9023E−02 | −2.4525E−03 | 1.8666E−04 |
| S5 | −1.8354E−01 | 7.9990E−02 | −2.4967E−02 | 3.7431E−03 |
| S6 | −5.0978E−01 | 3.0870E−01 | −1.0953E−01 | 1.6887E−02 |
| S7 | 2.2104E+00 | −1.2183E+00 | 3.6397E−01 | −4.5921E−02 |
| S8 | 7.6835E−01 | −3.7860E−01 | 9.4463E−02 | −9.4587E−03 |
| S9 | 2.1237E−01 | −1.4340E−01 | 4.1934E−02 | −4.6814E−03 |
| S10 | −8.2999E−02 | 1.8538E−02 | −2.1607E−03 | 1.0251E−04 |
| S11 | −3.1062E−02 | 6.6641E−03 | −8.1108E−04 | 4.1804E−05 |
| S12 | −7.8436E−03 | 1.0696E−03 | −8.1913E−05 | 2.6988E−06 |
| S13 | −3.6425E−03 | 3.3978E−04 | −1.7946E−05 | 4.1131E−07 |
| S14 | −1.9369E−03 | 1.7538E−04 | −9.0693E−06 | 2.0385E−07 |

TABLE 12

| parameter | | | | |
|---|---|---|---|---|
| f1 (mm) | f2 (mm) | f3 (mm) | f4 (mm) | f5 (mm) |
| 15.64 | 4.12 | −6.80 | 13.29 | −7.81 |

| parameter | | | | |
|---|---|---|---|---|
| f6 (mm) | f7 (mm) | f (mm) | TTL (mm) | ImgH (mm) |
| 4.01 | −3.82 | 4.14 | 5.15 | 3.50 |

Figure 8A:
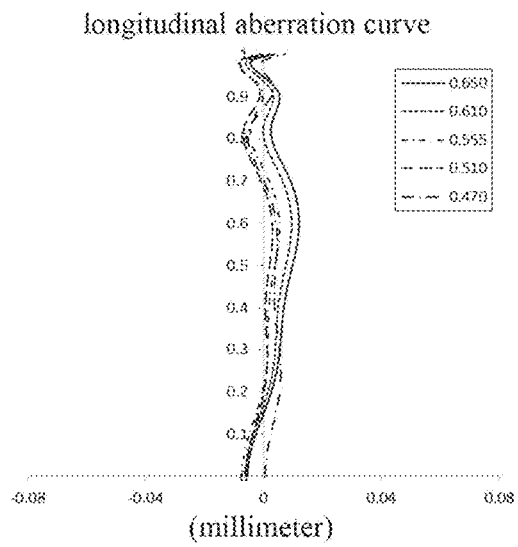
FIGS. 8A-8D respectively illustrate a longitudinal aberration curve, an astigmatic curve, a distortion curve and a lateral color curve of the optical imaging lens assembly according to Embodiment 4.
Figure 8B:
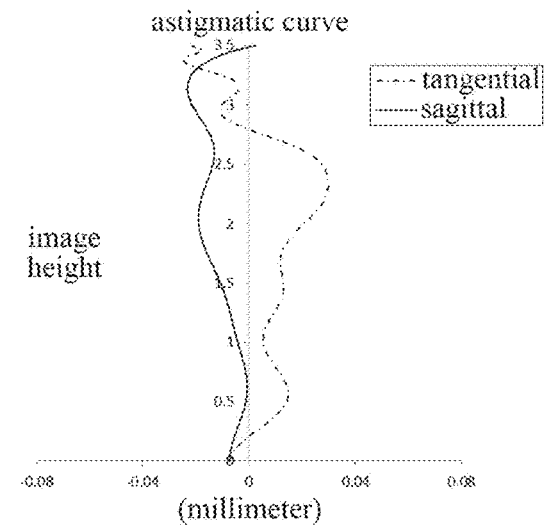
Figure 8C:
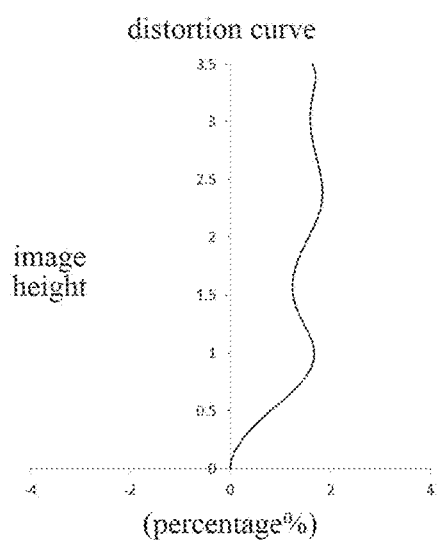
Figure 8D:
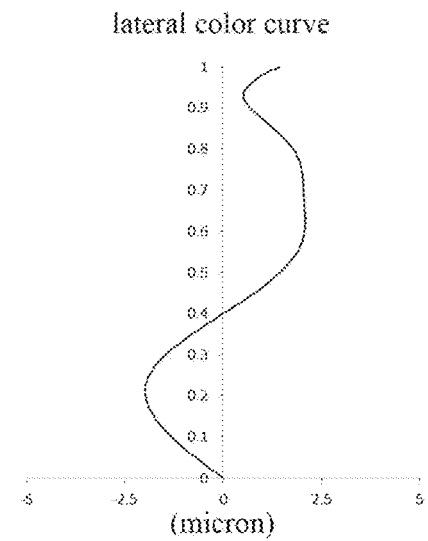

FIG. 8A illustrates the longitudinal aberration curve of the optical imaging lens assembly according to Embodiment 4, representing deviations of focal points of light of different wavelengths converged after passing through the lens assembly. FIG. 8B illustrates the astigmatic curve of the optical imaging lens assembly according to Embodiment 4, representing a curvature of the tangential image plane and a curvature of the sagittal image plane. FIG. 8C illustrates the distortion curve of the optical imaging lens assembly according to Embodiment 4, representing amounts of distortion at different viewing angles. FIG. 8D illustrates the lateral color curve of the optical imaging lens assembly according to Embodiment 4, representing deviations of different image heights on the image plane after light passes through the lens assembly. It can be seen from FIGS. 8A-8D that the optical imaging lens assembly according to Embodiment 4 can achieve a good imaging quality.

Embodiment 5

Figure 9:
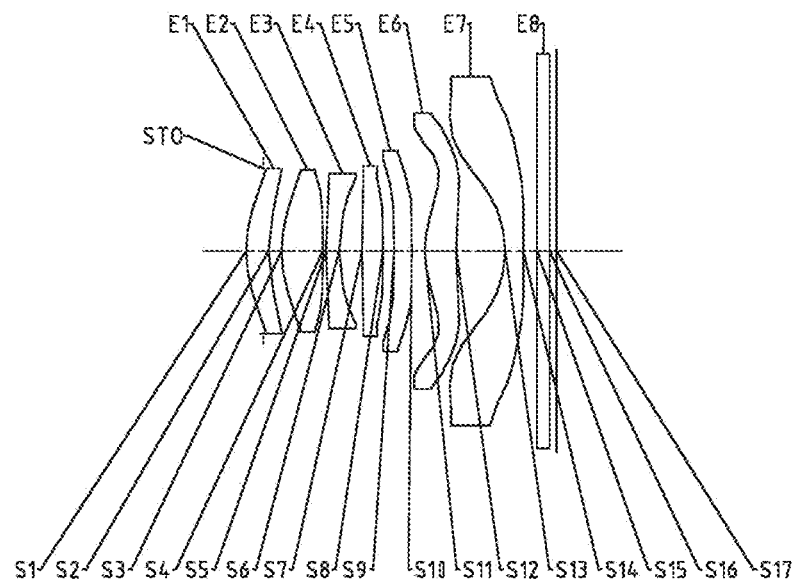
FIG. 9 is a schematic structural diagram illustrating an optical imaging lens assembly according to Embodiment 5 of the present disclosure.

An optical imaging lens assembly according to Embodiment 5 of the present disclosure is described below with reference to FIGS. 9-10D. FIG. 9 is a schematic structural diagram illustrating the optical imaging lens assembly according to Embodiment 5 of the present disclosure.

As shown in FIG. 9, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a convex surface, an image-side surface S6 of the third lens is a concave surface, and the object-side surface S5 and the image-side surface S6 of the third lens E3 are both aspheric surfaces.

The fourth lens E4 has a positive refractive power, an object-side surface S7 of the fourth lens is a convex surface, an image-side surface S8 of the fourth lens is a convex surface, and the object-side surface S7 and the image-side surface S8 of the fourth lens E4 are both aspheric surfaces.

The fifth lens E5 has a negative refractive power, an object-side surface S9 of the fifth lens is a concave surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a convex surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include a diaphragm STO disposed between the object side and the first lens E1, for improving the imaging quality of the lens assembly.

Table 13 shows the surface type, the radius of curvature, the thickness, the material and the conic coefficient of each lens of the optical imaging lens assembly in Embodiment 5. The radius of curvature and the thickness are shown in millimeters (mm). Table 14 shows the high-order coefficients of the aspheric surfaces in Embodiment 5. Here, the surface types of the aspheric surfaces may be defined by the formula (1) given in the above Embodiment 1. Table 15 shows the effective focal lengths f1-f7 of the lenses in Embodiment 5, the total effective focal length f, the total track length TTL and the half of the diagonal length ImgH of the effective pixel area on the image plane S17 of the optical imaging lens assembly.

TABLE 13

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.2834 | | | |

TABLE 13-continued

| surface number | surface type | radius of curvature | thickness | material refractive index | abbe number | conic coefficient |
|---|---|---|---|---|---|---|
| S1 | aspheric | 2.2138 | 0.3705 | 1.54 | 55.7 | −3.7640 |
| S2 | aspheric | 2.3963 | 0.2159 | | | −10.8598 |
| S3 | aspheric | 2.0546 | 0.6852 | 1.55 | 56.1 | −8.4097 |
| S4 | aspheric | −64.5986 | 0.0528 | | | 3.7823 |
| S5 | aspheric | 10.2199 | 0.2200 | 1.67 | 20.4 | 44.3536 |
| S6 | aspheric | 2.9623 | 0.3801 | | | −1.3130 |
| S7 | aspheric | 11.4989 | 0.3468 | 1.55 | 56.1 | 0.0000 |
| S8 | aspheric | −10.2881 | 0.1847 | | | −8.0448 |
| S9 | aspheric | −9.7337 | 0.2926 | 1.67 | 20.4 | −28.2643 |
| S10 | aspheric | 7.8420 | 0.2150 | | | 15.1375 |
| S11 | aspheric | 1.6344 | 0.5239 | 1.55 | 56.1 | −6.6560 |
| S12 | aspheric | 14.1280 | 0.8124 | | | 0.0000 |
| S13 | aspheric | −1.5813 | 0.3000 | 1.54 | 55.7 | −0.7932 |
| S14 | aspheric | −13.4202 | 0.2285 | | | 0.0000 |
| S15 | spherical | infinite | 0.2085 | 1.52 | 64.2 | |
| S16 | spherical | infinite | 0.1130 | | | |
| S17 | spherical | infinite | | | | |

TABLE 14

| surface number | A4 | A6 | A8 | A10 | A12 |
|---|---|---|---|---|---|
| S1 | 1.0381E−02 | −2.7286E−02 | 5.2890E−02 | −1.0545E−01 | 1.4076E−01 |
| S2 | 1.5597E−02 | −1.0054E−01 | 1.6545E−01 | −2.5292E−01 | 3.1395E−01 |
| S3 | 7.2765E−02 | −1.2903E−01 | 1.8786E−01 | −3.0401E−01 | 3.8903E−01 |
| S4 | 4.8833E−02 | −3.4451E−01 | 7.1477E−01 | −9.8032E−01 | 9.3288E−01 |
| S5 | 4.6744E−02 | −3.4605E−01 | 7.8803E−01 | −1.0568E+00 | 9.3318E−01 |
| S6 | 2.8288E−02 | −1.4361E−01 | 4.0729E−01 | −6.3878E−01 | 6.7701E−01 |
| S7 | 2.9776E−02 | −1.1354E−01 | −1.1092E−01 | 6.7206E−01 | −1.1696E+00 |
| S8 | 1.7548E−01 | −4.1018E−01 | 5.0330E−01 | −5.6819E−01 | 5.2624E−01 |
| S9 | 1.1665E−01 | −2.0446E−01 | 1.3955E−01 | 1.0562E−01 | −4.2975E−01 |
| S10 | −1.5125E−01 | 3.6547E−02 | 1.0978E−01 | −1.7086E−01 | 9.1282E−02 |
| S11 | 4.3321E−02 | −1.2750E−01 | 1.1347E−01 | −7.0245E−02 | 3.1239E−02 |
| S12 | 1.1392E−01 | −1.5709E−01 | 6.5439E−02 | 6.4079E−04 | −1.1641E−02 |
| S13 | 2.0284E−01 | −4.0797E−01 | 3.4458E−01 | −1.5685E−01 | 4.3776E−02 |
| S14 | 1.7808E−01 | −2.8564E−01 | 1.9526E−01 | −7.5445E−02 | 1.8035E−02 |

| surface number | A14 | A16 | A18 | A20 |
|---|---|---|---|---|
| S1 | −1.2020E−01 | 6.3105E−02 | −1.8303E−02 | 2.2327E−03 |
| S2 | −2.6183E−01 | 1.3652E−01 | −3.9973E−02 | 5.0039E−03 |
| S3 | −3.2208E−01 | 1.6385E−01 | −4.6964E−02 | 5.7925E−03 |
| S4 | −6.0397E−01 | 2.5213E−01 | −6.1119E−02 | 6.5385E−03 |
| S5 | −5.5893E−01 | 2.1957E−01 | −5.0950E−02 | 5.3122E−03 |
| S6 | −5.1540E−01 | 2.6972E−01 | −8.4766E−02 | 1.1835E−02 |
| S7 | 1.1043E+00 | −5.9256E−01 | 1.7064E−01 | −2.0727E−02 |
| S8 | −3.6660E−01 | 1.8500E−01 | −5.6323E−02 | 7.2552E−03 |
| S9 | 4.6871E−01 | −2.4562E−01 | 6.3875E−02 | −6.6582E−03 |
| S10 | −1.0992E−02 | −7.3678E−03 | 2.8735E−03 | −3.0909E−04 |
| S11 | −1.0638E−02 | 2.5199E−03 | −3.3956E−04 | 1.8883E−05 |
| S12 | 4.8812E−03 | −9.4562E−04 | 9.0667E−05 | −3.4642E−06 |
| S13 | −7.7358E−03 | 8.4601E−04 | −5.2315E−05 | 1.3994E−06 |
| S14 | −2.7335E−03 | 2.5612E−04 | −1.3519E−05 | 3.0684E−07 |

TABLE 15

| parameter | | | | |
|---|---|---|---|---|
| f1 (mm) | f2 (mm) | f3 (mm) | f4 (mm) | f5 (mm) |
| value 31.69 | 3.66 | −6.34 | 10.00 | −6.48 |

| parameter | | | | |
|---|---|---|---|---|
| f6 (mm) | f7 (mm) | f (mm) | TTL (mm) | ImgH (mm) |
| value 3.34 | −3.37 | 3.90 | 5.15 | 3.33 |

Figures 10A, 10B:
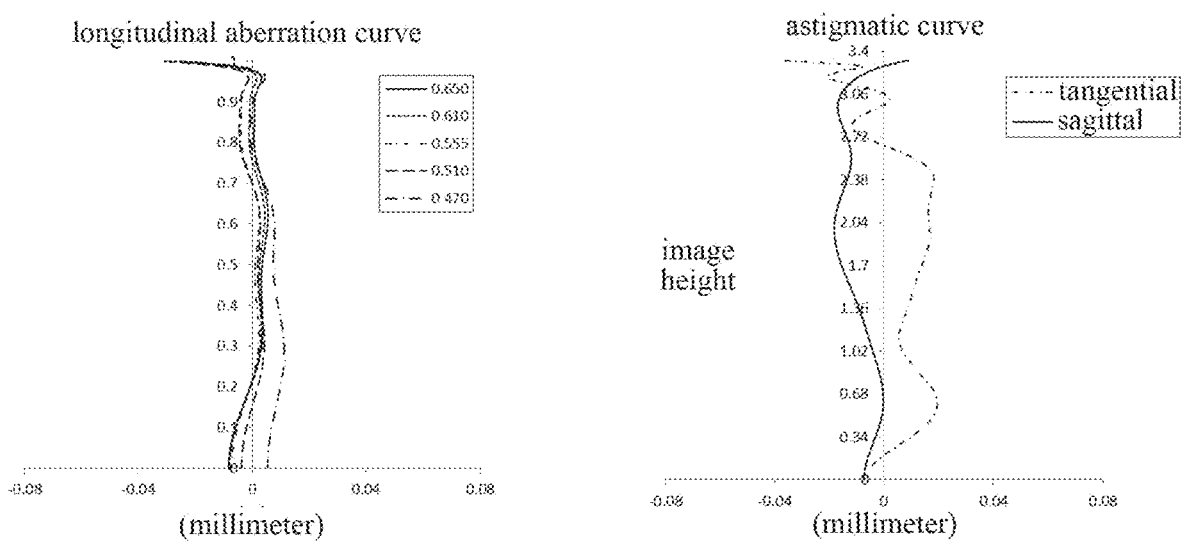
FIGS. 10A-10D respectively illustrate a longitudinal aberration curve, an astigmatic curve, a distortion curve and a lateral color curve of the optical imaging lens assembly according to Embodiment 5.
Figures 10C, 10D:
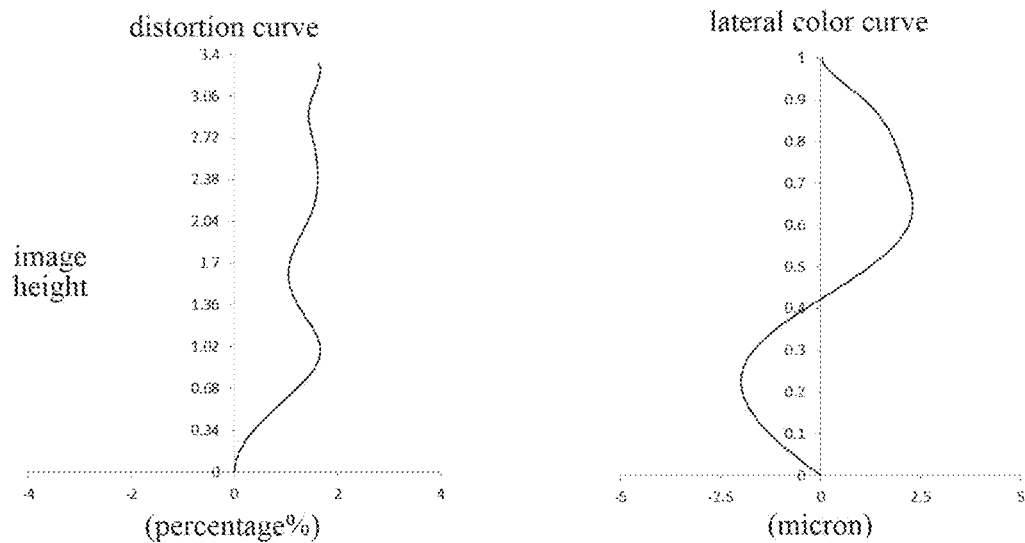

FIG. 10A illustrates the longitudinal aberration curve of the optical imaging lens assembly according to Embodiment 5, representing deviations of focal points of light of different wavelengths converged after passing through the lens assembly. FIG. 10B illustrates the astigmatic curve of the optical imaging lens assembly according to Embodiment 5, representing a curvature of the tangential image plane and a curvature of the sagittal image plane. FIG. 10C illustrates the distortion curve of the optical imaging lens assembly according to Embodiment 5, representing amounts of distortion at different viewing angles. FIG. 10D illustrates the lateral color curve of the optical imaging lens assembly according to Embodiment 5, representing deviations of different image heights on the image plane after light passes through the lens assembly. It can be seen from FIGS. 10A-10D that the optical imaging lens assembly according to Embodiment 5 can achieve a good imaging quality.

Embodiment 6

Figure 11:
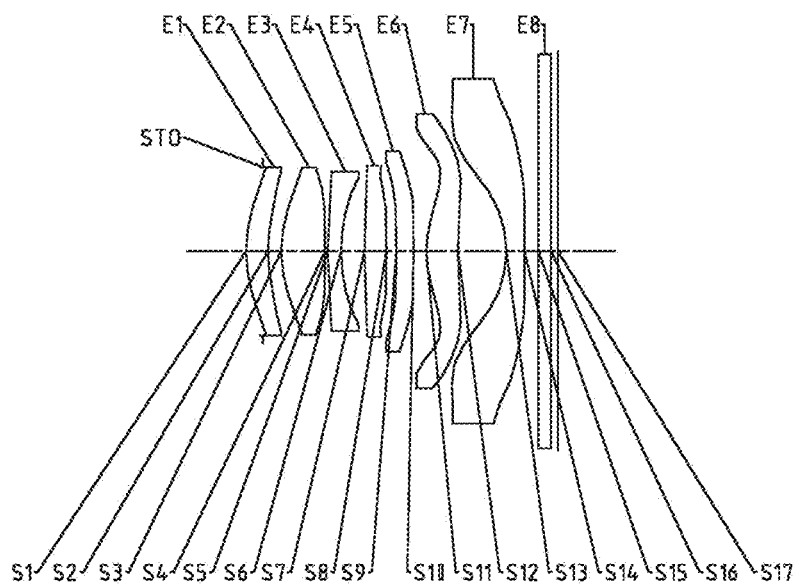
FIG. 11 is a schematic structural diagram illustrating an optical imaging lens assembly according to Embodiment 6 of the present disclosure.

An optical imaging lens assembly according to Embodiment 6 of the present disclosure is described below with reference to FIGS. 11-12D. FIG. 11 is a schematic structural diagram illustrating the optical imaging lens assembly according to Embodiment 6 of the present disclosure.

As shown in FIG. 11, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a convex surface, an image-side surface S6 of the third lens is a concave surface, and the object-side surface S5 and the image-side surface S6 of the third lens E3 are both aspheric surfaces.

The fourth lens E4 has a positive refractive power, an object-side surface S7 of the fourth lens is a convex surface, an image-side surface S8 of the fourth lens is a convex surface, and the object-side surface S7 and the image-side surface S8 of the fourth lens E4 are both aspheric surfaces.

The fifth lens E5 has a negative refractive power, an object-side surface S9 of the fifth lens is a concave surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a convex surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include a diaphragm STO disposed between the object side and the first lens E1, for improving the imaging quality of the lens assembly.

Table 16 shows the surface type, the radius of curvature, the thickness, the material and the conic coefficient of each lens of the optical imaging lens assembly in Embodiment 6. The radius of curvature and the thickness are shown in millimeters (mm). Table 17 shows the high-order coefficients of the aspheric surfaces in Embodiment 6. Here, the surface types of the aspheric surfaces may be defined by the formula (1) given in the above Embodiment 1. Table 18 shows the effective focal lengths f1-f7 of the lenses in Embodiment 6, the total effective focal length f, the total track length TTL and the half of the diagonal length ImgH of the effective pixel area on the image plane S17 of the optical imaging lens assembly.

TABLE 16

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.2797 | | | |
| S1 | aspheric | 2.2552 | 0.3614 | 1.54 | 55.7 | −4.1354 |
| S2 | aspheric | 2.3509 | 0.2175 | | | −11.6132 |
| S3 | aspheric | 1.9889 | 0.7259 | 1.55 | 56.1 | −8.0903 |
| S4 | aspheric | −63.2216 | 0.0457 | | | −99.0000 |
| S5 | aspheric | 10.1192 | 0.2200 | 1.67 | 20.4 | 44.2178 |
| S6 | aspheric | 2.9353 | 0.3843 | | | −1.1705 |
| S7 | aspheric | 10.0739 | 0.3610 | 1.55 | 56.1 | 0.0000 |
| S8 | aspheric | −10.7067 | 0.1647 | | | −8.0448 |
| S9 | aspheric | −9.9412 | 0.2837 | 1.67 | 20.4 | −25.8677 |
| S10 | aspheric | 7.3085 | 0.2102 | | | 14.3011 |
| S11 | aspheric | 1.6348 | 0.5259 | 1.55 | 56.1 | −6.6742 |
| S12 | aspheric | 17.4278 | 0.7986 | | | 0.0000 |
| S13 | aspheric | −1.5957 | 0.3000 | 1.54 | 55.7 | −0.7915 |
| S14 | aspheric | −14.7527 | 0.2285 | | | 0.0000 |
| S15 | spherical | infinite | 0.2097 | 1.52 | 64.2 | |
| S16 | spherical | infinite | 0.1130 | | | |
| S17 | spherical | infinite | | | | |

TABLE 17

| surface number | A4 | A6 | A8 | A10 | A12 |
|---|---|---|---|---|---|
| S1 | 7.0370E−03 | −2.7256E−02 | 5.5003E−02 | −1.0324E−01 | 1.2786E−01 |
| S2 | 1.6356E−02 | −1.1219E−01 | 1.9068E−01 | −2.8082E−01 | 3.2594E−01 |
| S3 | 7.3929E−02 | −1.3057E−01 | 1.9189E−01 | −3.0197E−01 | 3.6825E−01 |
| S4 | 5.8065E−02 | −3.9079E−01 | 8.2996E−01 | −1.1685E+00 | 1.1375E+00 |
| S5 | 5.1991E−02 | −3.7647E−01 | 8.8052E−01 | −1.2409E+00 | 1.1716E+00 |
| S6 | 2.4229E−02 | −1.3000E−01 | 3.8912E−01 | −6.2311E−01 | 6.6037E−01 |
| S7 | 1.8520E−02 | −7.7938E−02 | −1.7223E−01 | 7.3752E−01 | −1.1950E+00 |
| S8 | 1.7249E−01 | −3.7511E−01 | 3.7115E−01 | −2.7361E−01 | 1.1737E−01 |
| S9 | 1.2458E−01 | −2.3366E−01 | 2.0112E−01 | 3.5412E−02 | −3.8996E−01 |
| S10 | −1.5447E−01 | 1.8071E−02 | 1.6201E−01 | −2.3529E−01 | 1.3635E−01 |
| S11 | 4.2174E−02 | −1.2816E−01 | 1.1253E−01 | −6.8272E−02 | 3.0794E−02 |
| S12 | 1.1617E−01 | −1.5244E−01 | 5.0841E−02 | 1.7736E−02 | −2.1890E−02 |
| S13 | 1.9341E−01 | −3.9385E−01 | 3.3821E−01 | −1.5743E−01 | 4.5187E−02 |
| S14 | 1.7088E−01 | −2.7821E−01 | 1.9443E−01 | −7.7115E−02 | 1.8956E−02 |

| surface number | A14 | A16 | A18 | A20 |
|---|---|---|---|---|
| S1 | −1.0132E−01 | 4.9805E−02 | −1.3644E−02 | 1.5817E−03 |
| S2 | −2.5424E−01 | 1.2444E−01 | −3.4348E−02 | 4.0751E−03 |
| S3 | −2.8932E−01 | 1.3910E−01 | −3.7614E−02 | 4.3903E−03 |
| S4 | −7.4786E−01 | 3.1396E−01 | −7.5654E−02 | 7.9506E−03 |
| S5 | −7.5203E−01 | 3.1267E−01 | −7.5137E−02 | 7.8817E−03 |
| S6 | −4.8818E−01 | 2.4137E−01 | −7.0624E−02 | 9.1628E−03 |
| S7 | 1.0829E+00 | −5.6282E−01 | 1.5713E−01 | −1.8417E−02 |
| S8 | −1.5393E−02 | 3.9212E−03 | −5.1929E−03 | 1.2135E−03 |
| S9 | 4.6267E−01 | −2.5018E−01 | 6.6192E−02 | −6.9787E−03 |
| S10 | −2.9517E−02 | −3.1818E−03 | 2.4555E−03 | −3.0308E−04 |
| S11 | −1.1133E−02 | 2.8146E−03 | −3.9759E−04 | 2.2819E−05 |
| S12 | 8.3273E−03 | −1.6029E−03 | 1.5711E−04 | −6.2296E−06 |
| S13 | −8.2411E−03 | 9.3152E−04 | −5.9541E−05 | 1.6450E−06 |
| S14 | −2.9557E−03 | 2.8477E−04 | −1.5444E−05 | 3.5972E−07 |

TABLE 18

| parameter | f1 (mm) | f2 (mm) | f3 (mm) | f4 (mm) | f5 (mm) |
|---|---|---|---|---|---|
| value | 44.52 | 3.55 | −6.29 | 9.57 | −6.29 |

| parameter | f6 (mm) | f7 (mm) | f (mm) | TTL (mm) | ImgH (mm) |
|---|---|---|---|---|---|
| value | 3.27 | −3.36 | 3.86 | 5.15 | 3.30 |

Figure 12A:
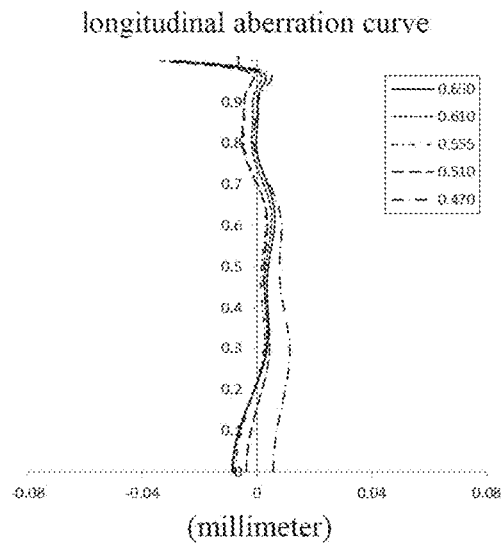
FIGS. 12A-12D respectively illustrate a longitudinal aberration curve, an astigmatic curve, a distortion curve and a lateral color curve of the optical imaging lens assembly according to Embodiment 6.
Figure 12B:
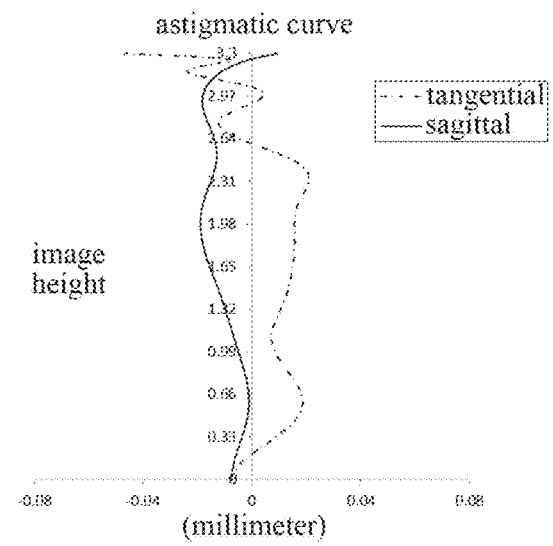
Figure 12C:
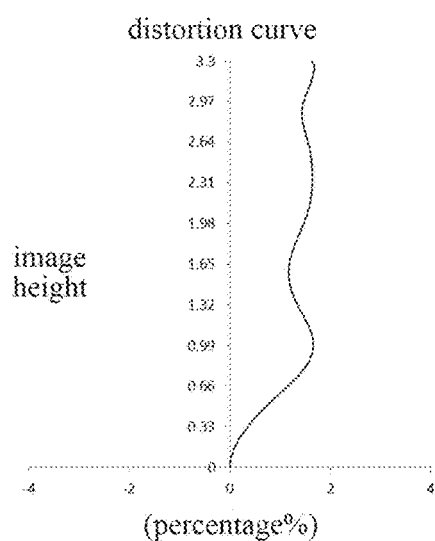
Figure 12D:
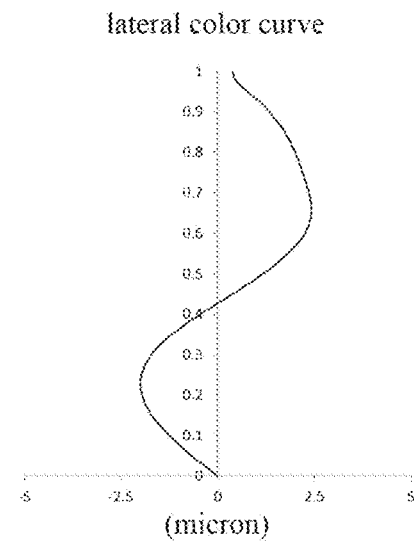

FIG. 12A illustrates the longitudinal aberration curve of the optical imaging lens assembly according to Embodiment 6, representing deviations of focal points of light of different wavelengths converged after passing through the lens assembly. FIG. 12B illustrates the astigmatic curve of the optical imaging lens assembly according to Embodiment 6, representing a curvature of the tangential image plane and a curvature of the sagittal image plane. FIG. 12C illustrates the distortion curve of the optical imaging lens assembly according to Embodiment 6, representing amounts of distortion at different viewing angles. FIG. 12D illustrates the lateral color curve of the optical imaging lens assembly according to Embodiment 6, representing deviations of different image heights on the image plane after light passes through the lens assembly. It can be seen from FIGS. 12A-12D that the optical imaging lens assembly according to Embodiment 6 can achieve a good imaging quality.

Embodiment 7

An optical imaging lens assembly according to Embodiment 7 of the present disclosure is described below with reference to FIGS. 13-14D. FIG. 13 is a schematic structural diagram illustrating the optical imaging lens assembly according to Embodiment 7 of the present disclosure.

As shown in FIG. 13, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a concave surface, an image-side surface S6 of the third lens is a concave surface, and the object-side surface S5 and the image-side surface S6 of the third lens E3 are both aspheric surfaces.

The fourth lens E4 has a negative refractive power, an object-side surface S7 of the fourth lens is a convex surface, an image-side surface S8 of the fourth lens is a concave surface, and the object-side surface S7 and the image-side surface S8 of the fourth lens E4 are both aspheric surfaces.

The fifth lens E5 has a negative refractive power, an object-side surface S9 of the fifth lens is a concave surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a convex surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include a diaphragm STO disposed between the object side and the first lens E1, for improving the imaging quality of the lens assembly.

Table 19 shows the surface type, the radius of curvature, the thickness, the material and the conic coefficient of each lens of the optical imaging lens assembly in Embodiment 7. The radius of curvature and the thickness are shown in millimeters (mm). Table 20 shows the high-order coefficients of the aspheric surfaces in Embodiment 7. Here, the surface types of the aspheric surfaces may be defined by the formula (1) given in the above Embodiment 1. Table 21 shows the effective focal lengths f1-f7 of the lenses in Embodiment 7, the total effective focal length f, the total track length TTL and the half of the diagonal length ImgH of the effective pixel area on the image plane S17 of the optical imaging lens assembly.

TABLE 19

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.3399 | | | |
| S1 | aspheric | 1.9359 | 0.4597 | 1.54 | 55.7 | −2.5364 |
| S2 | aspheric | 2.8959 | 0.2156 | | | −11.1911 |
| S3 | aspheric | 2.8010 | 0.5716 | 1.55 | 56.1 | −18.4227 |
| S4 | aspheric | −9.3933 | 0.0300 | | | −98.9772 |
| S5 | aspheric | −497.7809 | 0.2200 | 1.67 | 20.4 | 50.0000 |
| S6 | aspheric | 3.7711 | 0.4187 | | | −1.0603 |
| S7 | aspheric | 21.0464 | 0.2500 | 1.67 | 20.4 | 0.0000 |
| S8 | aspheric | 20.3058 | 0.1498 | | | −8.0448 |
| S9 | aspheric | −50.0000 | 0.4026 | 1.67 | 20.4 | 3.4937 |
| S10 | aspheric | 7.5470 | 0.1817 | | | 14.6078 |
| S11 | aspheric | 1.4239 | 0.4575 | 1.55 | 56.1 | −5.9686 |
| S12 | aspheric | 3.7996 | 0.9429 | | | 0.0000 |
| S13 | aspheric | −1.6927 | 0.3000 | 1.54 | 55.7 | −0.7829 |
| S14 | aspheric | −8.5494 | 0.2260 | | | 0.0000 |
| S15 | spherical | infinite | 0.2110 | 1.52 | 64.2 | |
| S16 | spherical | infinite | 0.1130 | | | |
| S17 | spherical | infinite | | | | |

TABLE 20

| surface number | A4 | A6 | A8 | A10 | A12 |
|---|---|---|---|---|---|
| S1 | 2.3841E−02 | −1.3902E−02 | 1.2640E−02 | −2.8926E−02 | 3.2595E−02 |
| S2 | −2.4104E−03 | −6.1721E−02 | 1.5336E−01 | −3.9192E−01 | 6.7313E−01 |
| S3 | 3.9210E−02 | −1.2259E−01 | 1.5571E−01 | −1.7588E−01 | 1.9436E−01 |
| S4 | −2.6721E−02 | −1.6891E−01 | 5.4893E−01 | −1.0318E+00 | 1.2793E+00 |
| S5 | 4.4600E−02 | −1.7060E−01 | 4.2939E−01 | −7.2907E−01 | 7.8056E−01 |
| S6 | 4.5407E−02 | −9.3421E−02 | 2.4870E−01 | −5.8523E−01 | 9.0719E−01 |
| S7 | −6.5039E−03 | −2.0025E−01 | 5.3626E−02 | 8.8506E−01 | −2.1688E+00 |
| S8 | 1.2293E−01 | −4.9301E−01 | 5.0231E−01 | 2.7572E−02 | −6.9979E−01 |
| S9 | 1.5748E−01 | −3.1695E−01 | 2.9567E−01 | −1.0408E−01 | −1.6284E−01 |
| S10 | −1.6426E−01 | 1.0828E−01 | 1.4520E−02 | −1.1288E−01 | 1.0040E−01 |
| S11 | 4.4661E−02 | −1.6138E−01 | 1.3355E−01 | −6.6192E−02 | 2.0927E−02 |
| S12 | 1.1496E−01 | −2.4441E−01 | 1.8031E−01 | −7.9371E−02 | 2.2650E−02 |
| S13 | 1.8659E−01 | −3.5293E−01 | 2.8348E−01 | −1.2125E−01 | 3.1221E−02 |
| S14 | 1.6782E−01 | −2.7153E−01 | 1.7585E−01 | −6.3169E−02 | 1.3804E−02 |

| surface number | A14 | A16 | A18 | A20 |
|---|---|---|---|---|
| S1 | −2.3655E−02 | 9.7262E−03 | −1.5038E−03 | −8.9828E−05 |
| S2 | −7.0730E−01 | 4.4544E−01 | −1.5394E−01 | 2.2310E−02 |
| S3 | −1.3508E−01 | 5.1322E−02 | −8.8588E−03 | 1.7008E−04 |
| S4 | −1.0369E+00 | 5.2552E−01 | −1.5036E−01 | 1.8378E−02 |
| S5 | −5.4279E−01 | 2.4291E−01 | −6.3141E−02 | 7.1843E−03 |
| S6 | −9.2718E−01 | 6.0509E−01 | −2.2511E−01 | 3.6115E−02 |
| S7 | 2.5371E+00 | −1.6374E+00 | 5.5981E−01 | −7.9738E−02 |
| S8 | 8.6061E−01 | −4.9024E−01 | 1.3675E−01 | −1.5059E−02 |
| S9 | 2.5580E−01 | −1.5198E−01 | 4.2809E−02 | −4.7668E−03 |
| S10 | −4.3707E−02 | 1.0509E−02 | −1.3537E−03 | 7.3724E−05 |
| S11 | −4.6915E−03 | 7.7708E−04 | −8.0850E−05 | 3.6025E−06 |
| S12 | −4.2953E−03 | 5.2790E−04 | −3.8111E−05 | 1.2218E−06 |
| S13 | −5.0149E−03 | 4.9339E−04 | −2.7260E−05 | 6.4837E−07 |
| S14 | −1.8795E−03 | 1.5528E−04 | −7.0677E−06 | 1.3412E−07 |

TABLE 21

| | parameter | | | | |
|---|---|---|---|---|---|
| | f1 (mm) | f2 (mm) | f3 (mm) | f4 (mm) | f5 (mm) |
| value | 9.32 | 4.02 | −5.62 | −1001.98 | −9.82 |

| | parameter | | | |
|---|---|---|---|---|
| | f6 (mm) | f7 (mm) | f (mm) | TTL (mm) | ImgH (mm) |
| value | 3.91 | −3.99 | 4.22 | 5.15 | 3.50 |

Figures 14C, 14D:
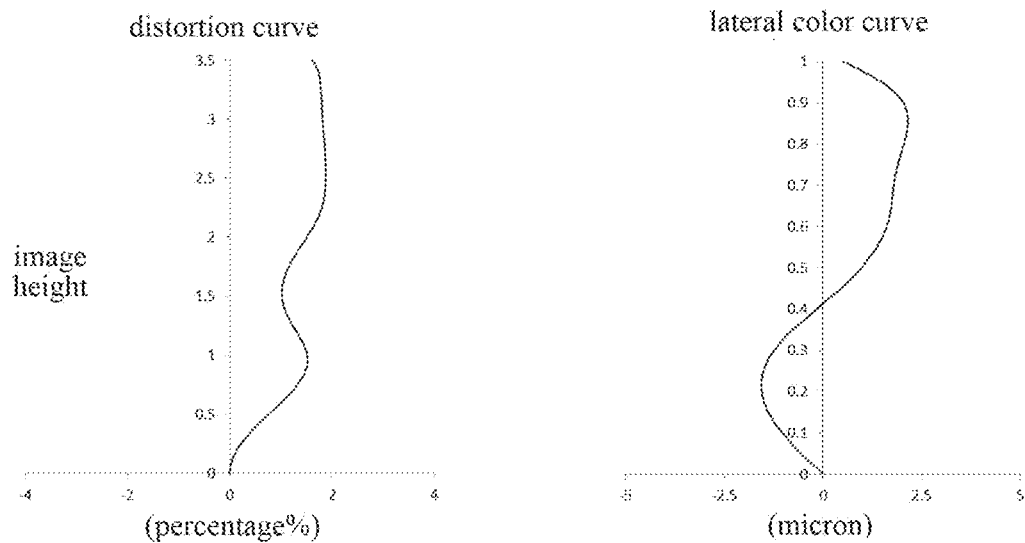

FIG. 14A illustrates the longitudinal aberration curve of the optical imaging lens assembly according to Embodiment 7, representing deviations of focal points of light of different wavelengths converged after passing through the lens assembly. FIG. 14B illustrates the astigmatic curve of the optical imaging lens assembly according to Embodiment 7, representing a curvature of the tangential image plane and a curvature of the sagittal image plane. FIG. 14C illustrates the distortion curve of the optical imaging lens assembly according to Embodiment 7, representing amounts of distortion at different viewing angles. FIG. 14D illustrates the lateral color curve of the optical imaging lens assembly according to Embodiment 7, representing deviations of different image heights on the image plane after light passes through the lens assembly. It can be seen from FIGS. 14A-14D that the optical imaging lens assembly according to Embodiment 7 can achieve a good imaging quality.

Embodiment 8

Figure 15:
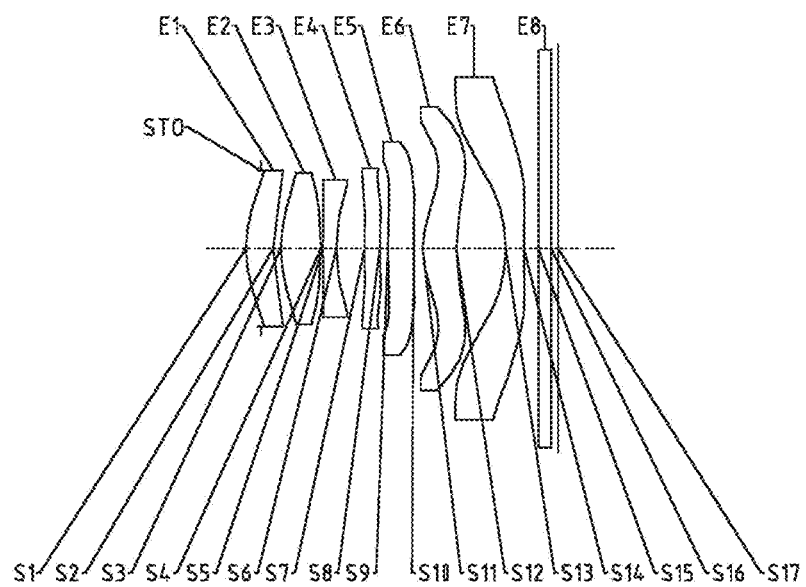
FIG. 15 is a schematic structural diagram illustrating an optical imaging lens assembly according to Embodiment 8 of the present disclosure.

An optical imaging lens assembly according to Embodiment 8 of the present disclosure is described below with reference to FIGS. 15-16D. FIG. 15 is a schematic structural diagram illustrating the optical imaging lens assembly according to Embodiment 8 of the present disclosure.

As shown in FIG. 15, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a concave surface, an image-side surface S6 of the third lens is a concave surface, and the object-side surface S5 and the image-side surface S6 of the third lens E3 are both aspheric surfaces.

The fourth lens E4 has a negative refractive power, an object-side surface S7 of the fourth lens is a convex surface, an image-side surface S8 of the fourth lens is a concave surface, and the object-side surface S7 and the image-side surface S8 of the fourth lens E4 are both aspheric surfaces.

The fifth lens E5 has a negative refractive power, an object-side surface S9 of the fifth lens is a concave surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a convex surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include a diaphragm STO disposed between the object side and the first lens E1, for improving the imaging quality of the lens assembly.

Table 22 shows the surface type, the radius of curvature, the thickness, the material and the conic coefficient of each lens of the optical imaging lens assembly in Embodiment 8. The radius of curvature and the thickness are shown in millimeters (mm). Table 23 shows the high-order coefficients of the aspheric surfaces in Embodiment 8. Here, the surface types of the aspheric surfaces may be defined by the formula (1) given in the above Embodiment 1. Table 24 shows the effective focal lengths f1-f7 of the lenses in Embodiment 8, the total effective focal length f, the total track length TTL and the half of the diagonal length ImgH of the effective pixel area on the image plane S17 of the optical imaging lens assembly.

TABLE 22

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.2509 | | | |
| S1 | aspheric | 2.0393 | 0.4506 | 1.54 | 55.7 | −3.6800 |
| S2 | aspheric | 2.1148 | 0.1246 | | | −12.6647 |
| S3 | aspheric | 2.0264 | 0.6564 | 1.55 | 56.1 | −12.9191 |
| S4 | aspheric | −6.8432 | 0.0352 | | | −98.9995 |
| S5 | aspheric | −498.8383 | 0.2200 | 1.67 | 20.4 | −87.8265 |
| S6 | aspheric | 3.4777 | 0.4623 | | | −0.3809 |
| S7 | aspheric | 13.7623 | 0.2500 | 1.67 | 20.4 | 0.0000 |
| S8 | aspheric | 13.3861 | 0.1313 | | | −8.0448 |
| S9 | aspheric | −49.7860 | 0.4216 | 1.67 | 20.4 | 43.1854 |
| S10 | aspheric | 6.0952 | 0.1508 | | | 9.6754 |
| S11 | aspheric | 1.3513 | 0.5513 | 1.55 | 56.1 | −4.6149 |
| S12 | aspheric | 4.2795 | 0.8104 | | | 0.0000 |
| S13 | aspheric | −1.9857 | 0.3000 | 1.54 | 55.7 | −0.7249 |
| S14 | aspheric | −19.0543 | 0.2364 | | | 0.0000 |
| S15 | spherical | infinite | 0.2106 | 1.52 | 64.2 | |
| S16 | spherical | infinite | 0.1130 | | | |
| S17 | spherical | infinite | | | | |

TABLE 23

| surface number | A4 | A6 | A8 | A10 | A12 |
|---|---|---|---|---|---|
| S1 | 1.7349E−02 | −1.0766E−02 | −2.4701E−02 | 7.9530E−02 | −1.4945E−01 |
| S2 | 2.9849E−02 | −1.7867E−01 | 2.3818E−01 | −2.6990E−01 | 2.5770E−01 |
| S3 | 8.7893E−02 | −2.5095E−01 | 3.3100E−01 | −3.3792E−01 | 2.2839E−01 |
| S4 | −3.1873E−02 | −7.2541E−03 | −1.4621E−01 | 5.4263E−01 | −9.0973E−01 |
| S5 | 2.3285E−02 | 2.9071E−02 | −2.7744E−01 | 8.4086E−01 | −1.4319E+00 |
| S6 | 6.0182E−03 | 6.0200E−02 | −1.7552E−01 | 3.7487E−01 | −5.8893E−01 |
| S7 | −6.4925E−02 | −1.1797E−02 | −4.9555E−01 | 1.9766E+00 | −3.5212E+00 |
| S8 | 8.8054E−02 | −3.3810E−01 | 5.7947E−02 | 6.8740E−01 | −1.2232E+00 |
| S9 | 1.8836E−01 | −2.6711E−01 | 1.2140E−01 | 1.0191E−01 | −2.6392E−01 |
| S10 | −1.8621E−01 | 1.8150E−01 | −6.1078E−02 | −6.9078E−02 | 8.6693E−02 |
| S11 | −2.0225E−02 | −4.6908E−02 | 1.3207E−02 | 2.0864E−02 | −2.1304E−02 |
| S12 | 1.4614E−01 | −2.7071E−01 | 1.9707E−01 | −8.8245E−02 | 2.6443E−02 |
| S13 | 2.2295E−01 | −3.9817E−01 | 3.1395E−01 | −1.3517E−01 | 3.5377E−02 |
| S14 | 1.9743E−01 | −3.0869E−01 | 2.0008E−01 | −7.2802E−02 | 1.6238E−02 |

| surface number | A14 | A16 | A18 | A20 |
|---|---|---|---|---|
| S1 | 1.5486E−01 | −9.0551E−02 | 2.8555E−02 | −3.8296E−03 |
| S2 | −1.5678E−01 | 5.5365E−02 | −1.0545E−02 | 7.4947E−04 |
| S3 | 1.2532E−02 | −1.3376E−01 | 8.0029E−02 | −1.5681E−02 |
| S4 | 8.9126E−01 | −5.2412E−01 | 1.7180E−01 | −2.4326E−02 |
| S5 | 1.4416E+00 | −8.5869E−01 | 2.8143E−01 | −3.9133E−02 |
| S6 | 5.7733E−01 | −3.2749E−01 | 9.7776E−02 | −1.1589E−02 |
| S7 | 3.5923E+00 | −2.1429E+00 | 6.9554E−01 | −9.5325E−02 |
| S8 | 1.0587E+00 | −4.9907E−01 | 1.2071E−01 | −1.1651E−02 |
| S9 | 2.4772E−01 | −1.2297E−01 | 3.1847E−02 | −3.4202E−03 |
| S10 | −4.3409E−02 | 1.1733E−02 | −1.6971E−03 | 1.0341E−04 |
| S11 | 8.8072E−03 | −1.9032E−03 | 2.1289E−04 | −9.7889E−06 |
| S12 | −5.4244E−03 | 7.3350E−04 | −5.8322E−05 | 2.0397E−06 |
| S13 | −5.8033E−03 | 5.8510E−04 | −3.3240E−05 | 8.1607E−07 |
| S14 | −2.2695E−03 | 1.9386E−04 | −9.2351E−06 | 1.8738E−07 |

TABLE 24

| parameter | | | | |
|---|---|---|---|---|
| f1 (mm) | f2 (mm) | f3 (mm) | f4 (mm) | f5 (mm) |
| value 34.51 | 2.94 | −5.19 | −1001.84 | −8.13 |

| parameter | | | | |
|---|---|---|---|---|
| f6 (mm) | f7 (mm) | f (mm) | TTL (mm) | ImgH (mm) |
| value 3.39 | −4.16 | 4.01 | 5.12 | 3.33 |

Figure 16A:
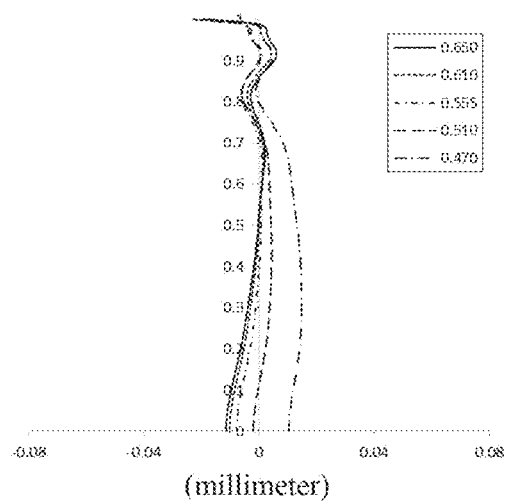
FIGS. 16A-16D respectively illustrate a longitudinal aberration curve, an astigmatic curve, a distortion curve and a lateral color curve of the optical imaging lens assembly according to Embodiment 8.
Figure 16B:
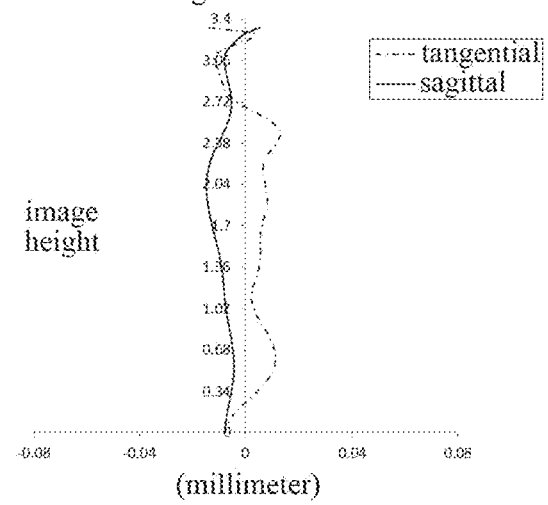
Figure 16C:
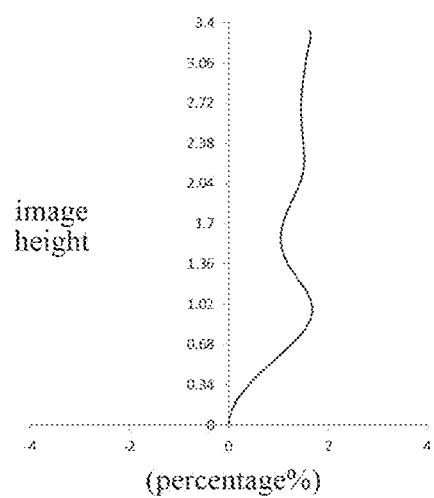
Figure 16D:
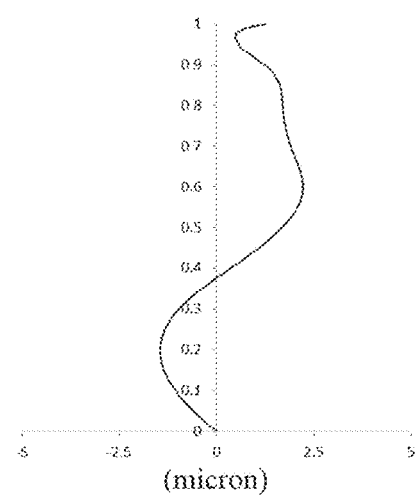

FIG. 16A illustrates the longitudinal aberration curve of the optical imaging lens assembly according to Embodiment 8, representing deviations of focal points of light of different wavelengths converged after passing through the lens assembly. FIG. 16B illustrates the astigmatic curve of the optical imaging lens assembly according to Embodiment 8, representing a curvature of the tangential image plane and a curvature of the sagittal image plane. FIG. 16C illustrates the distortion curve of the optical imaging lens assembly according to Embodiment 8, representing amounts of distortion at different viewing angles. FIG. 16D illustrates the lateral color curve of the optical imaging lens assembly according to Embodiment 8, representing deviations of different image heights on the image plane after light passes through the lens assembly. It can be seen from FIGS. 16A-16D that the optical imaging lens assembly according to Embodiment 8 can achieve a good imaging quality.

Embodiment 9

An optical imaging lens assembly according to Embodiment 9 of the present disclosure is described below with reference to FIGS. 17-18D. FIG. 17 is a schematic structural diagram illustrating the optical imaging lens assembly according to Embodiment 9 of the present disclosure.

As shown in FIG. 17, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a concave surface, an image-side surface S6 of the third lens is a concave surface, and the object-side surface S5 and the image-side surface S6 of the third lens E3 are both aspheric surfaces.

The fourth lens E4 has a negative refractive power, an object-side surface S7 of the fourth lens is a convex surface, an image-side surface S8 of the fourth lens is a concave surface, and the object-side surface S7 and the image-side surface S8 of the fourth lens E4 are both aspheric surfaces.

The fifth lens E5 has a negative refractive power, an object-side surface S9 of the fifth lens is a concave surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a convex surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include a diaphragm STO disposed between the object side and the first lens E1, for improving the imaging quality of the lens assembly.

Table 25 shows the surface type, the radius of curvature, the thickness, the material and the conic coefficient of each lens of the optical imaging lens assembly in Embodiment 9. The radius of curvature and the thickness are shown in millimeters (mm). Table 26 shows the high-order coefficients of the aspheric surfaces in Embodiment 9. Here, the surface types of the aspheric surfaces may be defined by the formula (1) given in the above Embodiment 1. Table 27 shows the effective focal lengths f1-f7 of the lenses in Embodiment 9, the total effective focal length f, the total track length TTL and the half of the diagonal length ImgH of the effective pixel area on the image plane S17 of the optical imaging lens assembly.

TABLE 25

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.1999 | | | |
| S1 | aspheric | 2.1930 | 0.4441 | 1.54 | 55.7 | −5.1873 |
| S2 | aspheric | 2.2730 | 0.1357 | | | −17.3665 |
| S3 | aspheric | 1.9714 | 0.7178 | 1.55 | 56.1 | −11.4967 |
| S4 | aspheric | −6.4468 | 0.0300 | | | −98.8869 |
| S5 | aspheric | −498.0947 | 0.2200 | 1.67 | 20.4 | −99.0000 |
| S6 | aspheric | 3.3231 | 0.4355 | | | 0.4698 |
| S7 | aspheric | 7.3688 | 0.2500 | 1.67 | 20.4 | 0.0000 |
| S8 | aspheric | 7.1894 | 0.1739 | | | −8.0448 |
| S9 | aspheric | −50.0000 | 0.4488 | 1.67 | 20.4 | −45.7506 |
| S10 | aspheric | 5.4240 | 0.1057 | | | 6.5136 |
| S11 | aspheric | 1.3155 | 0.5846 | 1.55 | 56.1 | −4.3340 |
| S12 | aspheric | 4.5384 | 0.7012 | | | 0.0000 |
| S13 | aspheric | −2.2078 | 0.3000 | 1.54 | 55.7 | −0.6598 |
| S14 | aspheric | −166.5506 | 0.2436 | | | 0.0000 |
| S15 | spherical | infinite | 0.2110 | 1.52 | 64.2 | |
| S16 | spherical | infinite | 0.1152 | | | |
| S17 | spherical | infinite | | | | |

TABLE 26

| surface number | A4 | A6 | A8 | A10 | A12 |
|---|---|---|---|---|---|
| S1 | 1.7246E−02 | −2.2418E−02 | −8.7158E−03 | 3.0621E−02 | −5.2124E−02 |
| S2 | 3.1821E−02 | −2.2589E−01 | 3.2306E−01 | −3.4873E−01 | 3.0625E−01 |
| S3 | 7.9722E−02 | −2.1344E−01 | 2.7035E−01 | −2.8660E−01 | 2.9099E−01 |
| S4 | −1.2487E−02 | −7.7743E−02 | 7.5481E−02 | 7.3116E−02 | −2.3548E−01 |
| S5 | 3.8262E−02 | −3.0032E−02 | −6.4340E−02 | 3.5806E−01 | −6.9849E−01 |
| S6 | 3.9929E−03 | 3.0499E−02 | 5.0638E−02 | −3.0296E−01 | 6.1147E−01 |
| S7 | −5.7892E−02 | −1.2325E−01 | −1.0432E−02 | 8.2647E−01 | −1.8035E+00 |
| S8 | 8.5337E−02 | −5.3807E−01 | 9.4555E−01 | −1.1786E+00 | 1.1250E+00 |
| S9 | 2.1278E−01 | −3.9779E−01 | 5.1343E−01 | −5.2291E−01 | 3.4388E−01 |
| S10 | −1.7226E−01 | 1.3552E−01 | 2.7769E−02 | −1.6462E−01 | 1.5064E−01 |
| S11 | −5.1307E−02 | −1.8635E−02 | −1.7794E−03 | 2.8870E−02 | −2.7624E−02 |
| S12 | 1.6212E−01 | −3.1044E−01 | 2.4513E−01 | −1.2418E−01 | 4.3291E−02 |
| S13 | 2.0755E−01 | −3.6471E−01 | 2.6433E−01 | −9.6597E−02 | 1.9022E−02 |
| S14 | 1.7094E−01 | −2.8247E−01 | 1.8554E−01 | −6.7939E−02 | 1.5272E−02 |

| surface number | A14 | A16 | A18 | A20 |
|---|---|---|---|---|
| S1 | 4.5927E−02 | −2.0997E−02 | 4.8256E−03 | −4.5037E−04 |
| S2 | −1.9057E−01 | 7.6111E−02 | −1.7503E−02 | 1.7489E−03 |
| S3 | −1.9844E−01 | 7.4556E−02 | −1.2716E−02 | 4.0597E−03 |
| S4 | 2.4334E−01 | −1.3091E−01 | 3.6507E−02 | −4.1963E−03 |
| S5 | 7.0561E−01 | −3.9528E−01 | 1.1708E−01 | −1.4271E−02 |
| S6 | −7.4266E−01 | 5.5187E−01 | −2.2606E−01 | 3.8901E−02 |
| S7 | 1.9447E+00 | −1.1745E+00 | 3.8050E−01 | −5.1914E−02 |
| S8 | −7.8835E−01 | 3.7839E−01 | −1.0757E−01 | 1.3213E−02 |
| S9 | −1.2801E−01 | 1.8594E−02 | 2.6726E−03 | −9.3628E−04 |
| S10 | −7.1663E−02 | 1.9717E−02 | −2.9835E−03 | 1.9250E−04 |
| S11 | 1.2066E−02 | −2.7703E−03 | 3.2586E−04 | −1.5549E−05 |
| S12 | −1.0300E−02 | 1.5716E−03 | −1.3641E−04 | 5.0701E−06 |
| S13 | −1.8202E−03 | 2.4863E−05 | 9.2497E−06 | −5.3395E−07 |
| S14 | −2.1609E−03 | 1.8783E−04 | −9.1476E−06 | 1.9042E−07 |

TABLE 27

| parameter | | | | |
|---|---|---|---|---|
| f1 (mm) | f2 (mm) | f3 (mm) | f4 (mm) | f5 (mm) |
| value 39.51 | 2.85 | −4.96 | −1001.36 | −7.33 |

| parameter | | | | |
|---|---|---|---|---|
| f6 (mm) | f7 (mm) | f (mm) | TTL (mm) | ImgH (mm) |
| value 3.19 | −4.17 | 3.93 | 5.12 | 3.25 |

Figure 18C:
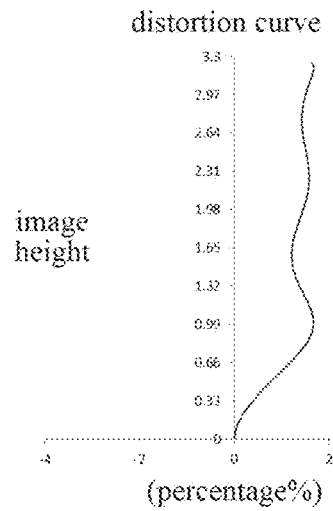
Figure 18D:
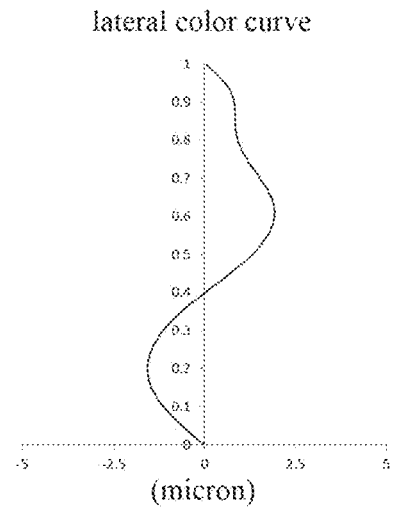

FIG. 18A illustrates the longitudinal aberration curve of the optical imaging lens assembly according to Embodiment 9, representing deviations of focal points of light of different wavelengths converged after passing through the lens assembly. FIG. 18B illustrates the astigmatic curve of the optical imaging lens assembly according to Embodiment 9, representing a curvature of the tangential image plane and a curvature of the sagittal image plane. FIG. 18C illustrates the distortion curve of the optical imaging lens assembly according to Embodiment 9, representing amounts of distortion at different viewing angles. FIG. 18D illustrates the lateral color curve of the optical imaging lens assembly according to Embodiment 9, representing deviations of different image heights on the image plane after light passes through the lens assembly. It can be seen from FIGS. 18A-18D that the optical imaging lens assembly according to Embodiment 9 can achieve a good imaging quality.

Embodiment 10

Figure 19:
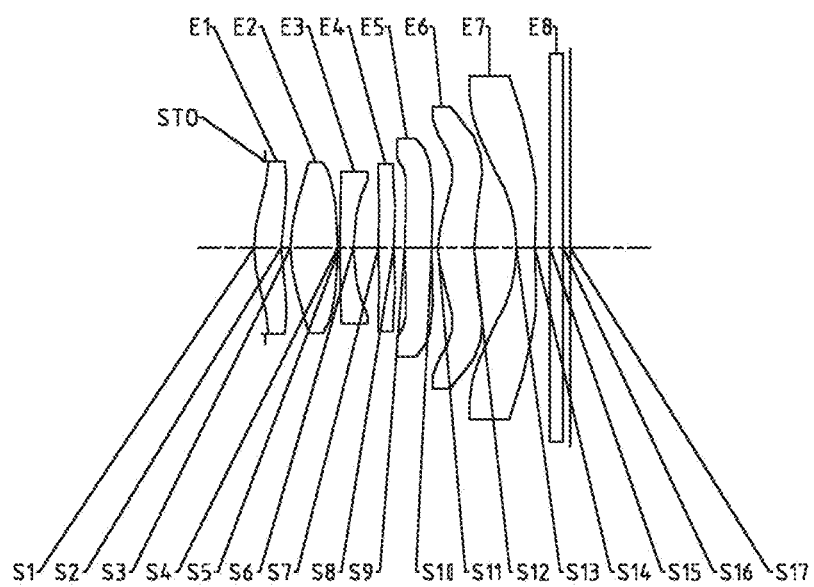
FIG. 19 is a schematic structural diagram illustrating an optical imaging lens assembly according to Embodiment 10 of the present disclosure.

An optical imaging lens assembly according to Embodiment 10 of the present disclosure is described below with reference to FIGS. 19-20D. FIG. 19 is a schematic structural diagram illustrating the optical imaging lens assembly according to Embodiment 10 of the present disclosure.

As shown in FIG. 19, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a concave surface, an image-side surface S6 of the third lens is a concave surface, and the object-side surface S5 and the image-side surface S6 of the third lens E3 are both aspheric surfaces.

The fourth lens E4 has a negative refractive power, an object-side surface S7 of the fourth lens is a convex surface, an image-side surface S8 of the fourth lens is a concave surface, and the object-side surface S7 and the image-side surface S8 of the fourth lens E4 are both aspheric surfaces.

The fifth lens E5 has a negative refractive power, an object-side surface S9 of the fifth lens is a concave surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a concave surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include diaphragm STO disposed between the object side and the first lens E1, for improving the imaging quality of the lens assembly.

Table 28 shows the surface type, the radius of curvature, the thickness, the material and the conic coefficient of each lens of the optical imaging lens assembly in Embodiment 10. The radius of curvature and the thickness are shown in millimeters (mm). Table 29 shows the high-order coefficients of the aspheric surfaces in Embodiment 10. Here, the surface types of the aspheric surfaces may be defined by the formula (1) given in the above Embodiment 1. Table 30 shows the effective focal lengths f1-f7 of the lenses in Embodiment 10, the total effective focal length f, the total track length TTL and the half of the diagonal length ImgH of the effective pixel area on the image plane S17 of the optical imaging lens assembly.

TABLE 28

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.1812 | | | |
| S1 | aspheric | 2.2451 | 0.4369 | 1.54 | 55.7 | −5.6732 |
| S2 | aspheric | 2.4852 | 0.1517 | | | −19.2208 |
| S3 | aspheric | 2.0550 | 0.7687 | 1.55 | 56.1 | −11.0716 |
| S4 | aspheric | −6.2871 | 0.0300 | | | −98.4249 |
| S5 | aspheric | −496.3558 | 0.2200 | 1.67 | 20.4 | −99.0000 |
| S6 | aspheric | 3.2055 | 0.4052 | | | 0.5741 |
| S7 | aspheric | 6.9180 | 0.2500 | 1.67 | 20.4 | 0.0000 |
| S8 | aspheric | 6.7481 | 0.1783 | | | −8.0448 |
| S9 | aspheric | −46.9121 | 0.4370 | 1.67 | 20.4 | 43.8562 |
| S10 | aspheric | 5.5414 | 0.1023 | | | 6.6004 |
| S11 | aspheric | 1.3222 | 0.5854 | 1.55 | 56.1 | −4.2498 |
| S12 | aspheric | 4.7327 | 0.6853 | | | 0.0000 |
| S13 | aspheric | −2.2191 | 0.3000 | 1.54 | 55.7 | −0.6482 |
| S14 | aspheric | 99.3440 | 0.2449 | | | 0.0000 |
| S15 | spherical | infinite | 0.2110 | 1.52 | 64.2 | |
| S16 | spherical | infinite | 0.1152 | | | |
| S17 | spherical | infinite | | | | |

TABLE 29

| surface number | A4 | A6 | A8 | A10 | A12 |
|---|---|---|---|---|---|
| S1 | 1.8112E−02 | −2.6989E−02 | −6.0319E−03 | 2.9310E−02 | −5.3009E−02 |
| S2 | 1.5896E−02 | −1.8203E−01 | 2.4795E−01 | −2.5442E−01 | 2.1576E−01 |
| S3 | 6.4809E−02 | −1.6560E−01 | 2.1086E−01 | −2.3563E−01 | 2.5838E−01 |
| S4 | 19133E−02 | −2.2543E−01 | 4.5817E−01 | −5.6251E−01 | 4.5722E−01 |
| S5 | 7.3517E−02 | −1.9716E−01 | 3.6025E−01 | −3.7765E−01 | 1.8048E−01 |
| S6 | 1.1979E−02 | −1.2306E−02 | 1.6670E−01 | −5.2284E−01 | 9.1034E−01 |
| S7 | −6.0823E−02 | −1.3940E−01 | 1.0905E−01 | 4.7031E−01 | −1.2214E+00 |
| S8 | 7.1853E−02 | −5.5249E−01 | 1.1139E+00 | −1.6162E+00 | 1.7190E+00 |
| S9 | 1.9855E−01 | −3.9474E−01 | 5.8354E−01 | −6.7961E−01 | 5.1228E−01 |
| S10 | −1.8280E−01 | 1.3461E−01 | 6.7558E−02 | −2.2943E−01 | 2.0263E−01 |
| S11 | −6.5083E−02 | −1.3789E−02 | 9.8937E−03 | 1.2834E−02 | −1.8532E−02 |
| S12 | 1.6685E−01 | −3.2886E−01 | 2.7301E−01 | −1.4581E−01 | 5.3211E−02 |
| S13 | 1.9788E−01 | −3.6607E−01 | 2.7689E−01 | −1.0576E−01 | 2.2070E−02 |
| S14 | 1.5761E−01 | −2.7492E−01 | 1.8518E−01 | −6.9318E−02 | 1.5943E−02 |

| surface number | A14 | A16 | A18 | A20 |
|---|---|---|---|---|
| S1 | 4.9411E−02 | −2.4413E−02 | 6.2649E−03 | −6.7168E−04 |
| S2 | −1.3133E−01 | 5.1519E−02 | −1.1587E−02 | 1.1245E−03 |
| S3 | −1.9191E−01 | 8.2102E−02 | −1.8204E−02 | 1.5293E−03 |
| S4 | −2.4741E−01 | 8.5261E−02 | −1.7033E−02 | 1.5033E−03 |
| S5 | 8.0631E−03 | −4.8417E−02 | 1.9843E−02 | −2.5779E−03 |
| S6 | −1.0108E+00 | 6.9922E−01 | −2.7085E−01 | 4.4711E−02 |
| S7 | 1.3798E+00 | −8.4983E−01 | 2.7862E−01 | −3.8480E−02 |
| S8 | −1.2656E+00 | 6.0648E−01 | −1.6746E−01 | 1.9855E−02 |
| S9 | −2.3342E−01 | 5.7990E−02 | −5.5506E−03 | −1.8869E−04 |
| S10 | −9.5994E−02 | 2.6474E−02 | −4.0181E−03 | 2.5989E−04 |
| S11 | 9.1364E−03 | −2.1965E−03 | 2.6180E−04 | −1.2441E−05 |
| S12 | −1.3133E−02 | 2.0658E−03 | −1.8425E−04 | 7.0241E−06 |
| S13 | −2.3625E−03 | 7.6423E−05 | 6.9757E−06 | −5.0775E−07 |
| S14 | −2.3123E−03 | 2.0639E−04 | −1.0341E−05 | 2.2194E−07 |

TABLE 30

| parameter | | | | |
|---|---|---|---|---|
| f1 (mm) | f2 (mm) | f3 (mm) | f4 (mm) | f5 (mm) |
| value 26.47 | 2.93 | −4.78 | −1001.23 | −7.42 |

| parameter | | | | |
|---|---|---|---|---|
| f6 (mm) | f7 (mm) | f (mm) | TTL (mm) | ImgH (mm) |
| value 3.17 | −4.04 | 3.93 | 5.12 | 3.25 |

Figure 20A:
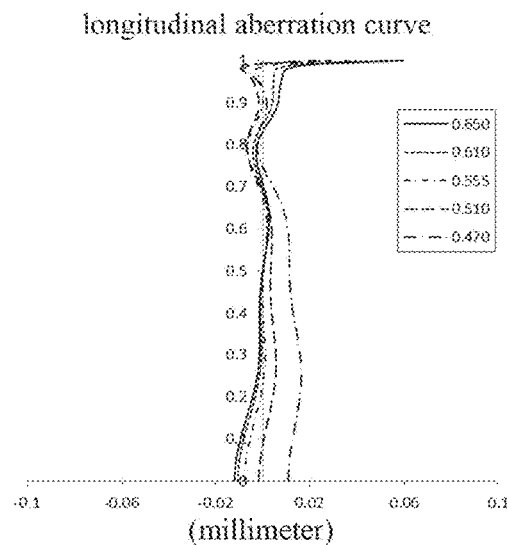
FIGS. 20A-20D respectively illustrate a longitudinal aberration curve, an astigmatic curve, a distortion curve and a lateral color curve of the optical imaging lens assembly according to Embodiment 10.
Figure 20B:
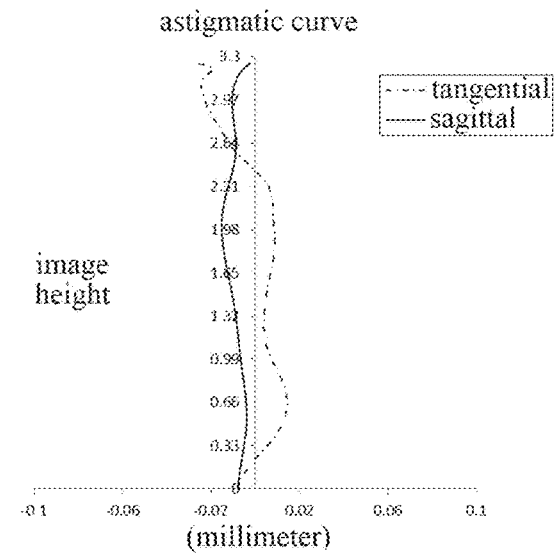
Figure 20C:
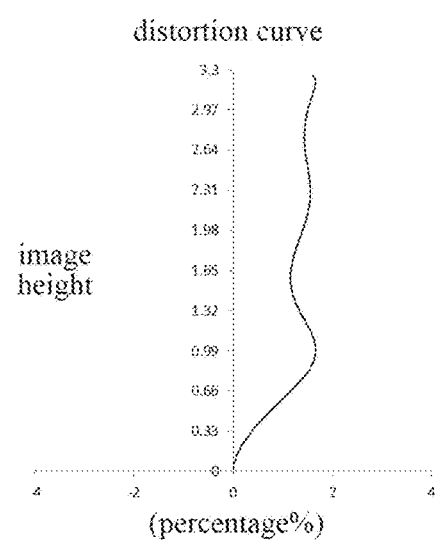
Figure 20D:
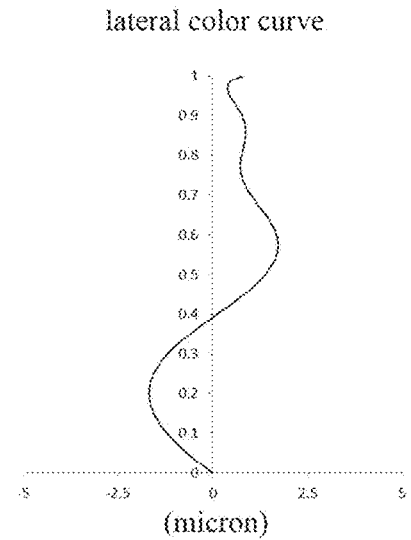

FIG. 20A illustrates the longitudinal aberration curve of the optical imaging lens assembly according to Embodiment 10, representing deviations of focal points of light of different wavelengths converged after passing through the lens assembly. FIG. 20B illustrates the astigmatic curve of the optical imaging lens assembly according to Embodiment 10, representing a curvature of the tangential image plane and a curvature of the sagittal image plane. FIG. 20C illustrates the distortion curve of the optical imaging lens assembly according to Embodiment 10, representing amounts of distortion at different viewing angles. FIG. 20D illustrates the lateral color curve of the optical imaging lens assembly according to Embodiment 10, representing deviations of different image heights on the image plane after light passes through the lens assembly. It can be seen from FIGS. 20A-20D that the optical imaging lens assembly according to Embodiment 10 can achieve a good imaging quality.

Embodiment 11

Figure 21:
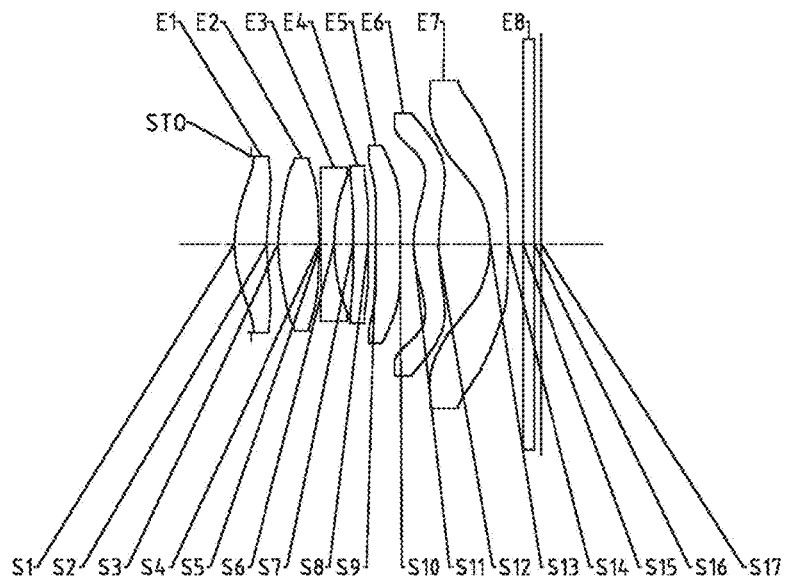
FIG. 21 is a schematic structural diagram illustrating an optical imaging lens assembly according to Embodiment 11 of the present disclosure.

An optical imaging lens assembly according to Embodiment 11 of the present disclosure is described below with reference to FIGS. 21-22D. FIG. 21 is a schematic structural diagram illustrating the optical imaging lens assembly according to Embodiment 11 of the present disclosure.

As shown in FIG. 21, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a concave surface, an image-side surface S6 of the third lens is a concave surface, and the object-side surface S5 and the image-side surface S6 of the third lens E3 are both aspheric surfaces.

The fourth lens E4 has a negative refractive power, an object-side surface S7 of the fourth lens is a convex surface, an image-side surface S8 of the fourth lens is a concave surface, and the object-side surface S7 and the image-side surface S8 of the fourth lens E4 are both aspheric surfaces.

The fifth lens E5 has a negative refractive power, an object-side surface S9 of the fifth lens is a concave surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a convex surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include a diaphragm STO disposed between the object side and the first lens E1, for improving the imaging quality of the lens assembly.

Table 31 shows the surface type, the radius of curvature, the thickness, the material and the conic coefficient of each lens of the optical imaging lens assembly in Embodiment 11. The radius of curvature and the thickness are shown in millimeters (mm). Table 32 shows the high-order coefficients of the aspheric surfaces in Embodiment 11. Here, the surface types of the aspheric surfaces may be defined by the formula (1) given in the above Embodiment 1. Table 33 shows the effective focal lengths f1-f7 of the lenses in Embodiment 11, the total effective focal length f, the total track length TTL and the half of the diagonal length ImgH of the effective pixel area on the image plane S17 of the optical imaging lens assembly.

TABLE 31

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.2839 | | | |
| S1 | aspheric | 2.0963 | 0.5545 | 1.54 | 55.7 | −3.4320 |
| S2 | aspheric | 3.3389 | 0.1890 | | | −22.0036 |
| S3 | aspheric | 2.6476 | 0.6918 | 1.55 | 56.1 | −17.1738 |
| S4 | aspheric | −14.0397 | 0.0300 | | | −97.3364 |
| S5 | aspheric | −493.9380 | 0.2200 | 1.67 | 20.4 | −98.9999 |
| S6 | aspheric | 3.6476 | 0.3161 | | | 1.3520 |
| S7 | aspheric | 32.7887 | 0.2500 | 1.55 | 56.1 | 0.0000 |
| S8 | aspheric | 30.8494 | 0.1300 | | | −8.0448 |
| S9 | aspheric | 20.6755 | 0.4073 | 1.67 | 20.4 | −7.9313 |
| S10 | aspheric | 6.8271 | 0.2195 | | | 13.8670 |
| S11 | aspheric | 1.5928 | 0.4270 | 1.55 | 56.1 | −6.0646 |
| S12 | aspheric | 4.8034 | 0.8648 | | | 0.0000 |
| S13 | aspheric | −1.6095 | 0.3000 | 1.54 | 55.7 | −0.8002 |
| S14 | aspheric | −9.3184 | 0.2470 | | | 0.0000 |
| S15 | spherical | infinite | 0.1900 | 1.52 | 64.2 | |
| S16 | spherical | infinite | 0.1130 | | | |
| S17 | spherical | infinite | | | | |

TABLE 32

| surface number | A4 | A6 | A8 | A10 | A12 |
|---|---|---|---|---|---|
| S1 | 2.3420E−02 | −1.9337E−02 | 1.1335E−02 | −2.4667E−02 | 2.7801E−02 |
| S2 | −7.6394E−03 | −7.6898E−02 | 9.0698E−02 | −1.1691E−01 | 1.3632E−01 |
| S3 | 5.1105E−02 | −1.3954E−01 | 1.8880E−01 | −2.4326E−01 | 2.8004E−01 |
| S4 | 7.7309E−02 | −4.7988E−01 | 1.0306E+00 | −1.3950E+00 | 1.2657E+00 |
| S5 | 1.2278E−01 | −4.9181E−01 | 1.0555E+00 | −1.4720E+00 | 1.3673E+00 |
| S6 | 5.6246E−02 | −1.3944E−01 | 3.1386E−01 | −4.9789E−01 | 5.2584E−01 |
| S7 | −6.0889E−03 | −8.1793E−02 | −1.3736E−01 | 7.6367E−01 | −1.3818E+00 |
| S8 | −3.8964E−03 | 4.9287E−02 | −6.7793E−01 | 1.6939E+00 | −2.3613E+00 |
| S9 | −6.4193E−02 | 1.7703E−01 | −5.0072E−01 | 8.4319E−01 | −1.0404E+00 |
| S10 | −2.4605E−01 | 2.3970E−01 | −1.6234E−01 | 3.3714E−02 | 1.8473E−02 |
| S11 | 2.6642E−02 | −1.4934E−01 | 1.6884E−01 | −1.3270E−01 | 6.8066E−02 |
| S12 | 1.1950E−01 | −2.6056E−01 | 2.2644E−01 | −1.3043E−01 | 4.8327E−02 |
| S13 | 1.7144E−01 | −3.6330E−01 | 2.8808E−01 | −1.1611E−01 | 2.7373E−02 |
| S14 | 1.3684E−01 | −2.2932E−01 | 1.3967E−01 | −4.5043E−02 | 8.3927E−03 |

| surface number | A14 | A16 | A18 | A20 |
|---|---|---|---|---|
| S1 | −2.1480E−02 | 1.0210E−02 | −2.5180E−03 | 2.4608E−04 |
| S2 | −1.0421E−01 | 4.7566E−02 | −1.1774E−02 | 1.2189E−03 |
| S3 | −2.0824E−01 | 9.1023E−02 | −2.1586E−02 | 2.1548E−03 |
| S4 | −7.6893E−01 | 2.9996E−01 | −6.7718E−02 | 6.6993E−03 |
| S5 | −8.6360E−01 | 3.6567E−01 | −9.3776E−02 | 1.0872E−02 |
| S6 | −3.7871E−01 | 1.8394E−01 | −5.2779E−02 | 6.7256E−03 |
| S7 | 1.3794E+00 | −7.9378E−01 | 2.4717E−01 | −3.2550E−02 |
| S8 | 2.0189E+00 | −1.0176E+00 | 2.7543E−01 | −3.0914E−02 |
| S9 | 8.6070E−01 | −4.2553E−01 | 1.1270E−01 | −1.2345E−02 |
| S10 | −1.2135E−02 | 3.2583E−03 | −6.3507E−04 | 7.0842E−05 |
| S11 | −2.4192E−02 | 5.7831E−03 | −7.9844E−04 | 4.6424E−05 |
| S12 | −1.0972E−02 | 1.4244E−03 | −9.0793E−05 | 1.8034E−06 |
| S13 | −3.9117E−03 | 3.2986E−04 | −1.4748E−05 | 2.5552E−07 |
| S14 | −8.9240E−04 | 4.6630E−05 | −4.0966E−07 | −4.0855E−08 |

TABLE 33

| parameter | | | | |
|---|---|---|---|---|
| f1 (mm) | f2 (mm) | f3 (mm) | f4 (mm) | f5 (mm) |
| value 9.08 | 4.14 | −5.44 | −1000.98 | −15.49 |
| parameter | | | | |
| f6 (mm) | f7 (mm) | f (mm) | TTL (mm) | ImgH (mm) |
| value 4.17 | −3.67 | 4.22 | 5.15 | 3.50 |

Figures 22A, 22B:
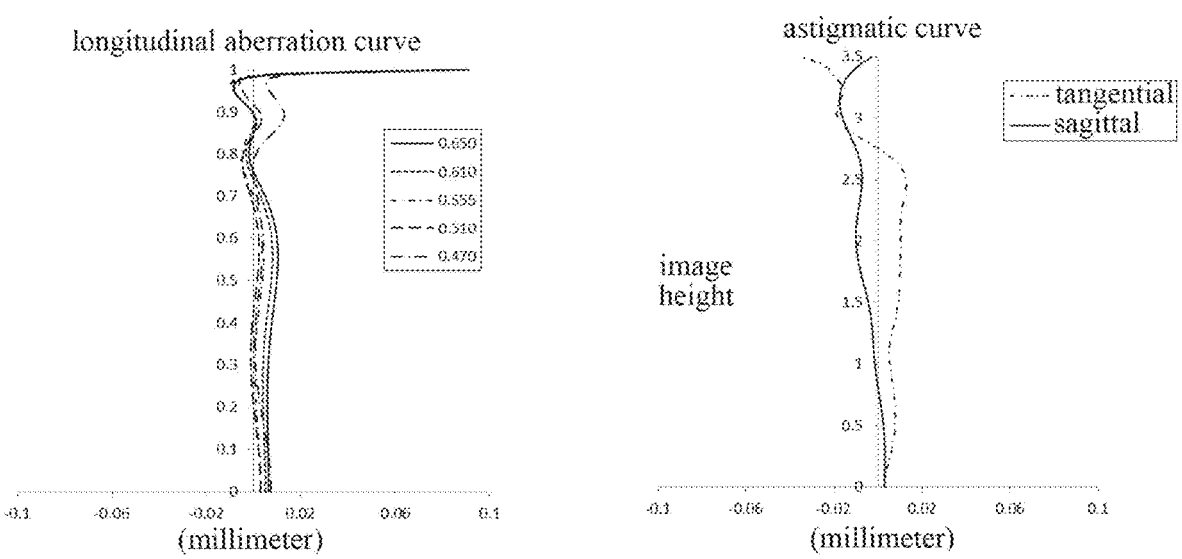

FIG. 22A illustrates the longitudinal aberration curve of the optical imaging lens assembly according to Embodiment 11, representing deviations of focal points of light of different wavelengths converged after passing through the lens assembly. FIG. 22B illustrates the astigmatic curve of the optical imaging lens assembly according to Embodiment 11, representing a curvature of the tangential image plane and a curvature of the sagittal image plane. FIG. 22C illustrates the distortion curve of the optical imaging lens assembly according to Embodiment 11, representing amounts of distortion at different viewing angles. FIG. 22D illustrates the lateral color curve of the optical imaging lens assembly according to Embodiment 11, representing deviations of different image heights on the image plane after light passes through the lens assembly. It can be seen from FIGS. 22A-22D that the optical imaging lens assembly according to Embodiment 11 can achieve a good imaging quality.

Embodiment 12

An optical imaging lens assembly according to Embodiment 12 of the present disclosure is described below with reference to FIGS. 23-24D. FIG. 23 is a schematic structural diagram illustrating the optical imaging lens assembly according to Embodiment 12 of the present disclosure.

As shown in FIG. 23, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a concave surface, an image-side surface S6 of the third lens is a concave surface, and the object-side surface S5 and the image-side surface S6 of the third lens E3 are both aspheric surfaces.

The fourth lens E4 has a negative refractive power, an object-side surface S7 of the fourth lens is a convex surface, an image-side surface S8 of the fourth lens is a concave surface, and the object-side surface S7 and the image-side surface S8 of the fourth lens E4 are both aspheric surfaces.

The fifth lens E5 has a negative refractive power, an object-side surface S9 of the fifth lens is a concave surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a convex surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include a diaphragm STO disposed between the object side and the first lens E1, for improving the imaging quality of the lens assembly.

Table 34 shows the surface type, the radius of curvature, the thickness, the material and the conic coefficient of each lens of the optical imaging lens assembly in Embodiment 12. The radius of curvature and the thickness are shown in millimeters (mm). Table 35 shows the high-order coefficients of the aspheric surfaces in Embodiment 12. Here, the surface types of the aspheric surfaces may be defined by the formula (1) given in the above Embodiment 1. Table 36 shows the effective focal lengths f1-f7 of the lenses in Embodiment 12, the total effective focal length f, the total track length TTL and the half of the diagonal length ImgH of the effective pixel area on the image plane S17 of the optical imaging lens assembly.

TABLE 34

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.2472 | | | |
| S1 | aspheric | 2.1455 | 0.5043 | 1.54 | 55.7 | −4.1931 |
| S2 | aspheric | 2.6846 | 0.1890 | | | −19.1193 |
| S3 | aspheric | 2.1901 | 0.7663 | 1.55 | 56.1 | −12.3282 |
| S4 | aspheric | −9.0392 | 0.0300 | | | −99.0000 |
| S5 | aspheric | −494.6868 | 0.2200 | 1.67 | 20.4 | 50.0000 |
| S6 | aspheric | 3.2414 | 0.3377 | | | 0.4544 |
| S7 | aspheric | 19.9933 | 0.2584 | 1.55 | 56.1 | 0.0000 |
| S8 | aspheric | 19.1996 | 0.1052 | | | −8.0448 |
| S9 | aspheric | 13.0191 | 0.3984 | 1.67 | 20.4 | 2.7283 |
| S10 | aspheric | 5.7540 | 0.2195 | | | 9.4031 |
| S11 | aspheric | 1.4994 | 0.5417 | 1.55 | 56.1 | −6.3256 |
| S12 | aspheric | 4.0284 | 0.7296 | | | 0.0000 |
| S13 | aspheric | −1.9523 | 0.3000 | 1.54 | 55.7 | −0.7370 |
| S14 | aspheric | −18.0564 | 0.2260 | | | 0.0000 |
| S15 | spherical | infinite | 0.2110 | 1.52 | 64.2 | |
| S16 | spherical | infinite | 0.1130 | | | |
| S17 | spherical | infinite | | | | |

TABLE 35

| surface number | A4 | A6 | A8 | A10 | A12 |
|---|---|---|---|---|---|
| S1 | 2.0549E−02 | −1.9054E−02 | 4.2786E−03 | −9.8036E−03 | 1.0267E−02 |
| S2 | 2.0594E−02 | −1.4103E−01 | 1.7657E−01 | −1.9668E−01 | 1.7934E−01 |
| S3 | 7.4423E−02 | −1.5927E−01 | 1.9637E−01 | −2.4166E−01 | 2.5592E−01 |
| S4 | 8.4722E−02 | −3.5773E−01 | 5.7619E−01 | −5.9654E−01 | 4.3026E−01 |
| S3 | 1.0720E−01 | −3.1982E−01 | 5.1780E−01 | −5.3956E−01 | 3.8241E−01 |
| S5 | 2.5070E−02 | −5.9618E−02 | 1.9156E−01 | −4.0246E−01 | 5.6033E−01 |
| S7 | −9.0556E−02 | 2.7173E−01 | −1.1562E+00 | 2.7213E+00 | −3.8443E+00 |
| S8 | −1.8224E−01 | 7.5528E−01 | −2.3068E+00 | 3.9768E+00 | −4.3480E+00 |
| S9 | −1.8039E−01 | 6.7875E−01 | −1.5029E+00 | 1.9862E+00 | −1.7780E+00 |
| S10 | −3.2712E−01 | 5.1535E−01 | −5.9398E−01 | 4.4413E−01 | −2.2909E−01 |
| S11 | −3.6673E−02 | −2.6895E−02 | 1.4055E−02 | 3.4805E−03 | −1.4176E−02 |
| S12 | 6.9139E−02 | −2.0888E−01 | 1.8428E−01 | −1.0430E−01 | 3.5470E−02 |
| S13 | 1.7122E−01 | −3.7564E−01 | 3.0124E−01 | −1.2646E−01 | 3.1827E−02 |
| S14 | 1.4131E−01 | −2.3983E−01 | 1.4938E−01 | −4.9516E−02 | 9.6657E−03 |

| surface number | A14 | A16 | A18 | A20 |
|---|---|---|---|---|
| S1 | −8.6407E−03 | 4.8546E−03 | −1.3769E−03 | 1.5008E−04 |
| S2 | −1.1173E−01 | 4.3437E−02 | −9.4637E−03 | 8.8177E−04 |
| S3 | −1.7217E−01 | 6.7587E−02 | −1.4339E−02 | 1.2684E−03 |
| S4 | −2.1885E−01 | 7.4924E−02 | −1.5365E−02 | 1.4064E−03 |
| S5 | −2.0518E−01 | 8.6690E−02 | −2.4230E−02 | 3.0709E−03 |
| S6 | −5.2876E−01 | 3.2045E−01 | −1.1002E−01 | 1.6249E−02 |
| S7 | 3.4035E+00 | −1.8354E+00 | 5.5017E−01 | −7.0499E−02 |
| S8 | 3.0883E+00 | −1.3557E+00 | 3.3022E−01 | −3.4004E−02 |
| S9 | 1.0909E+00 | −4.3132E−01 | 9.7682E−02 | −9.5947E−03 |
| S10 | 8.0691E−02 | −1.7325E−02 | 1.7905E−03 | −4.3112E−05 |
| S11 | 8.1271E−03 | −1.9399E−03 | 2.1300E−04 | −9.1930E−06 |
| S12 | −6.4148E−03 | 3.9485E−04 | 3.8548E−05 | −4.9999E−06 |
| S13 | −4.9712E−03 | 4.7154E−04 | −2.4794E−05 | 5.5048E−07 |
| S14 | −1.1330E−03 | 7.6221E−05 | −2.5256E−06 | 2.4688E−08 |

TABLE 36

| parameter | f1 (mm) | f2 (mm) | f3 (mm) | f4 (mm) | f5 (mm) |
|---|---|---|---|---|---|
| value | 15.01 | 3.31 | −4.84 | −1000.98 | −15.84 |

| parameter | f6 (mm) | f7 (mm) | f (mm) | TTL (mm) | ImgH (mm) |
|---|---|---|---|---|---|
| value | 4.07 | −4.11 | 4.02 | 5.15 | 3.33 |

Figure 24A:
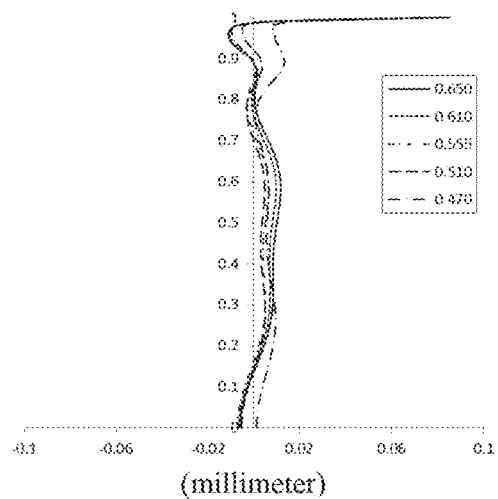
FIGS. 24A-24D respectively illustrate a longitudinal aberration curve, an astigmatic curve, a distortion curve and a lateral color curve of the optical imaging lens assembly according to Embodiment 12.
Figure 24B:
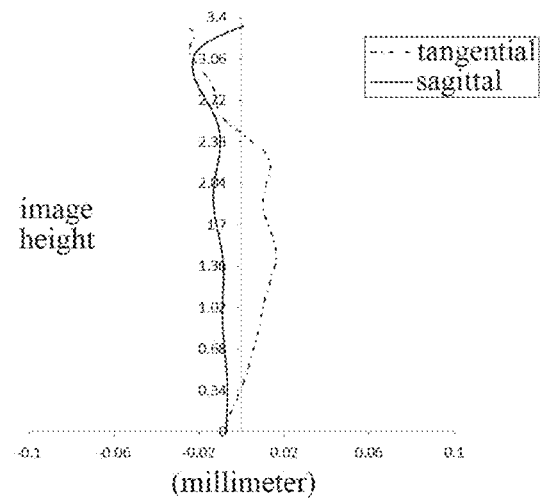
Figure 24C:
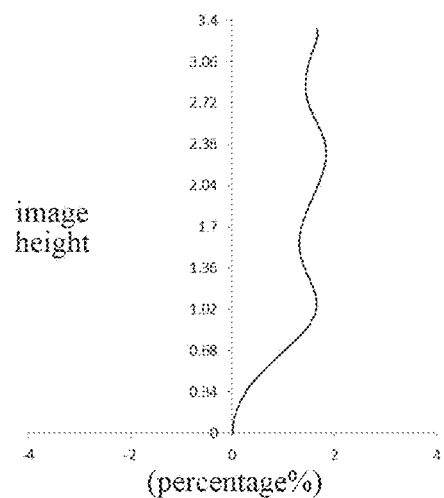
Figure 24D:
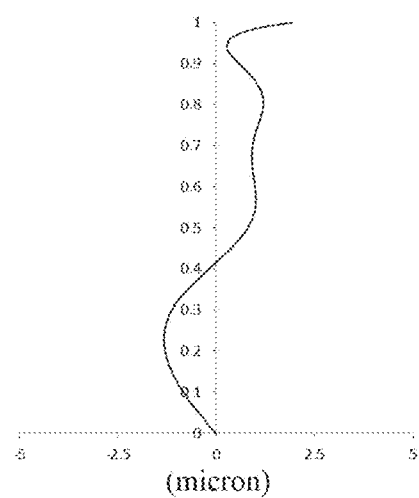

FIG. 24A illustrates the longitudinal aberration curve of the optical imaging lens assembly according to Embodiment 12, representing deviations of focal points of light of different wavelengths converged after passing through the lens assembly. FIG. 24B illustrates the astigmatic curve of the optical imaging lens assembly according to Embodiment 12, representing a curvature of the tangential image plane and a curvature of the sagittal image plane. FIG. 24C illustrates the distortion curve of the optical imaging lens assembly according to Embodiment 12, representing amounts of distortion at different viewing angles. FIG. 24D illustrates the lateral color curve of the optical imaging lens assembly according to Embodiment 12, representing deviations of different image heights on the image plane after light passes through the lens assembly. It can be seen from FIGS. 24A-24D that the optical imaging lens assembly according to Embodiment 12 can achieve a good imaging quality.

Embodiment 13

An optical imaging lens assembly according to Embodiment 13 of the present disclosure is described below with reference to FIGS. 25-26D. FIG. 25 is a schematic structural diagram illustrating the optical imaging lens assembly according to Embodiment 13 of the present disclosure.

As shown in FIG. 25, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a concave surface, an image-side surface S6 of the third lens is a concave surface, and the object-side surface S5 and the image-side surface 36 of the third lens E3 are both aspheric surfaces.

The fourth lens E4 has a negative refractive power, an object-side surface S7 of the fourth lens is a convex surface, an image-side surface S8 of the fourth lens is a concave surface, and the object-side surface S7 and the image-side surface S8 of the fourth lens E4 are both aspheric surfaces.

The fifth lens E5 has a negative refractive power, an object-side surface S9 of the fifth lens is a convex surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a convex surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include a diaphragm STO disposed between the object side and the first lens E1, for improving the imaging quality of the lens assembly.

Table 37 shows the surface type, the radius of curvature, the thickness, the material and the conic coefficient of each lens of the optical imaging lens assembly in Embodiment 13. The radius of curvature and the thickness are shown in millimeters (mm). Table 38 shows the high-order coefficients of the aspheric surfaces in Embodiment 13. Here, the surface types of the aspheric surfaces may be defined by the formula (1) given in the above Embodiment 1. Table 39 shows the effective focal lengths f1-f7 of the lenses in Embodiment 13, the total effective focal length f, the total track length TTL and the half of the diagonal length ImgH of the effective pixel area on the image plane S17 of the optical imaging lens assembly.

TABLE 37

| surface number | surface type | radius of curvature | thickness | refractive index | abbe number | conic coefficient |
|---|---|---|---|---|---|---|
| OBJ | spherical | infinite | infinite | | | |
| STO | spherical | infinite | −0.1619 | | | |
| S1 | aspheric | 2.3487 | 0.3706 | 1.54 | 55.7 | −6.7173 |
| S2 | aspheric | 2.5446 | 0.1788 | | | −17.1856 |
| S3 | aspheric | 2.0823 | 0.7299 | 1.55 | 56.1 | −10.7044 |
| S4 | aspheric | −5.2706 | 0.0551 | | | −99.0000 |
| S5 | aspheric | −492.9556 | 0.2200 | 1.67 | 20.4 | −99.0000 |
| S6 | aspheric | 2.9832 | 0.3703 | | | 0.0483 |
| S7 | aspheric | 69.3195 | 0.3018 | 1.55 | 56.1 | 0.0000 |
| S8 | aspheric | 61.4217 | 0.1582 | | | −8.0448 |
| S9 | aspheric | 29.1018 | 0.3763 | 1.67 | 20.4 | −99.0000 |
| S10 | aspheric | 6.4291 | 0.2053 | | | 13.4497 |
| S11 | aspheric | 1.6080 | 0.5246 | 1.55 | 56.1 | −5.9464 |
| S12 | aspheric | 10.2376 | 0.7876 | | | 0.0000 |
| S13 | aspheric | −1.8123 | 0.3000 | 1.54 | 55.7 | −0.7600 |
| S14 | aspheric | −657.6300 | 0.2474 | | | 0.0000 |
| S15 | spherical | infinite | 0.2110 | 1.52 | 64.2 | |
| S16 | spherical | infinite | 0.1130 | | | |
| S17 | spherical | infinite | | | | |

TABLE 38

| surface number | A4 | A6 | A8 | A10 | A12 |
|---|---|---|---|---|---|
| S1 | 1.4564E−02 | −2.7031E−02 | −1.5070E−02 | 5.9387E−02 | −1.0092E−01 |
| S2 | 1.9481E−03 | −1.3622E−01 | 1.9596E−01 | −2.3579E−01 | 2.4832E−01 |
| S3 | 6.6151E−02 | −1.5438E−01 | 2.0215E−01 | −2.4907E−01 | 2.8234E−01 |
| S4 | 2.8238E−02 | −3.4850E−01 | 8.3475E−01 | −1.2456E+00 | 1.2590E+00 |
| S5 | 1.4296E−01 | −5.4172E−01 | 1.2751E+00 | −1.9659E+00 | 2.0654E+00 |
| S6 | 4.9651E−02 | −1.8507E−01 | 5.0569E−01 | −8.8251E−01 | 1.0649E+00 |
| S7 | −3.9605E−02 | −6.8749E−02 | −7.5634E−02 | 6.8518E−01 | −1.4374E+00 |
| S8 | 2.7179E−02 | −3.2705E−01 | 6.4079E−01 | −1.0984E+00 | 1.4433E+00 |
| S9 | 5.5931E−03 | −1.0853E−01 | 1.5175E−01 | −1.8744E−01 | 7.3278E−02 |
| S10 | −2.0146E−01 | 8.5603E−02 | 7.6981E−02 | −2.0923E−01 | 1.8789E−01 |
| S11 | 4.6247E−02 | −1.5928E−01 | 1.5912E−01 | −1.1328E−01 | 6.0517E−02 |
| S12 | 1.5339E−01 | −2.2412E−01 | 1.2110E−01 | −2.4458E−02 | −4.8180E−03 |
| S13 | 2.2145E−01 | −4.6091E−01 | 3.9214E−01 | −1.7867E−01 | 4.9373E−02 |
| S14 | 1.7721E−01 | −3.0212E−01 | 2.0758E−01 | −7.9895E−02 | 1.8872E−02 |

| surface number | A14 | A16 | A18 | A20 |
|---|---|---|---|---|
| S1 | 9.6721E−02 | −5.1566E−02 | 1.4482E−02 | −1.6948E−03 |
| S2 | −1.8376E−01 | 8.6385E−02 | −2.3246E−02 | 2.7074E−03 |
| S3 | −2.0529E−01 | 8.3034E−02 | −1.6346E−02 | 9.8826E−04 |
| S4 | −8.5286E−01 | 3.6772E−01 | −9.0829E−02 | 9.7241E−03 |
| S5 | −1.4870E+00 | 6.9849E−01 | −1.9096E−01 | 2.2957E−02 |
| S6 | −9.1080E−01 | 5.2350E−01 | −1.7805E−01 | 2.6708E−02 |
| S7 | 1.6552E+00 | −1.0929E+00 | 3.8729E−01 | −5.7728E−02 |
| S8 | −1.2530E+00 | 6.8707E−01 | −2.1392E−01 | 2.8321E−02 |
| S9 | 8.4564E−02 | −1.0548E−01 | 4.3908E−02 | −6.6391E−03 |
| S10 | −8.9660E−02 | 2.3597E−02 | −3.0437E−03 | 1.2547E−04 |
| S11 | −2.3524E−02 | 5.8682E−03 | −8.0199E−04 | 4.4954E−05 |
| S12 | 3.6954E−03 | −8.2668E−04 | 8.6828E−05 | −3.6619E−06 |
| S13 | −8.5697E−03 | 9.1690E−04 | −5.5441E−05 | 1.4526E−06 |
| S14 | −2.7992E−03 | 2.5432E−04 | −1.2924E−05 | 2.8087E−07 |

TABLE 39

| | parameter | | | | |
|---|---|---|---|---|---|
| | f1 (mm) | f2 (mm) | f3 (mm) | f4 (mm) | f5 (mm) |
| value | 34.23 | 2.83 | −4.45 | −1000.98 | −12.48 |
| | parameter | | | | |
| | f6 (mm) | f7 (mm) | f (mm) | TTL (mm) | ImgH (mm) |
| value | 3.42 | −3.39 | 3.95 | 5.15 | 3.26 |

FIG. 26A illustrates the longitudinal aberration curve of the optical imaging lens assembly according to Embodiment 13, representing deviations of focal points of light of different wavelengths converged after passing through the lens assembly. FIG. 26B illustrates the astigmatic curve of the optical imaging lens assembly according to Embodiment 13, representing a curvature of the tangential image plane and a curvature of the sagittal image plane. FIG. 26C illustrates the distortion curve of the optical imaging lens assembly according to Embodiment 13, representing amounts of distortion at different viewing angles. FIG. 26D illustrates the lateral color curve of the optical imaging lens assembly according to Embodiment 13, representing deviations of different image heights on the image plane after light passes through the lens assembly. It can be seen from FIGS. 26A-26D that the optical imaging lens assembly according to Embodiment 13 can achieve a good imaging quality.

Embodiment 14

An optical imaging lens assembly according to Embodiment 14 of the present disclosure is described below with reference to FIGS. 27-28D. FIG. 27 is a schematic structural diagram illustrating the optical imaging lens assembly according to Embodiment 14 of the present disclosure.

As shown in FIG. 27, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a concave surface, an image-side surface S6 of the third lens is a concave surface, and the object-side surface S5 and the image-side surface S6 of the third lens E3 are both aspheric surfaces.

The fourth lens E4 has a negative refractive power, an object-side surface S7 of the fourth lens is a convex surface, an image-side surface S8 of the fourth lens is a concave surface, and the object-side surface S7 and the image-side surface S8 of the fourth lens E4 are both aspheric surfaces.

The fifth lens E5 has a negative refractive power, an object-side surface S9 of the fifth lens is a convex surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a concave surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include a diaphragm STO disposed between the object side and the first lens E1, for improving the imaging quality of the lens assembly.

Table 40 shows the surface type, the radius of curvature, the thickness, the material and the conic coefficient of each lens of the optical imaging lens assembly in Embodiment 14. The radius of curvature and the thickness are shown in millimeters (mm). Table 41 shows the high-order coefficients of the aspheric surfaces in Embodiment 14. Here, the surface types of the aspheric surfaces may be defined by the formula (1) given in the above Embodiment 1. Table 42 shows the effective focal lengths f1-f7 of the lenses in Embodiment 14, the total effective focal length f, the total track length TTL and the half of the diagonal length ImgH of the effective pixel area on the image plane S17 of the optical imaging lens assembly.

TABLE 40

| | | | | material | | |
|---|---|---|---|---|---|---|
| surface number | surface type | radius of curvature | thickness | refractive index | abbe number | conic coefficient |
| OBJ | spherical | infinite | infinite | | | |
| STO | spherical | infinite | −0.1444 | | | |
| S1 | aspheric | 2.3774 | 0.3584 | 1.54 | 55.7 | −7.6805 |
| S2 | aspheric | 2.4191 | 0.1719 | | | −16.9767 |
| S3 | aspheric | 1.9880 | 0.7765 | 1.55 | 56.1 | −9.8880 |
| S4 | aspheric | −4.9026 | 0.0566 | | | −98.6288 |
| S5 | aspheric | −492.3756 | 0.2200 | 1.67 | 20.4 | 0.4351 |
| S6 | aspheric | 2.8847 | 0.3562 | | | 0.1778 |
| S7 | aspheric | 43.7240 | 0.3094 | 1.55 | 56.1 | 0.0000 |
| S8 | aspheric | 40.3836 | 0.1507 | | | −8.0448 |
| S9 | aspheric | 22.5300 | 0.3814 | 1.67 | 20.4 | −85.1287 |
| S10 | aspheric | 5.9345 | 0.1927 | | | 11.3809 |
| S11 | aspheric | 1.6359 | 0.5261 | 1.55 | 56.1 | −5.8208 |
| S12 | aspheric | 17.5853 | 0.7492 | | | 0.0000 |
| S13 | aspheric | −1.8877 | 0.3000 | 1.54 | 55.7 | −0.7459 |
| S14 | aspheric | 28.6908 | 0.2560 | | | 0.0000 |
| S15 | spherical | infinite | 0.2110 | 1.52 | 64.2 | |
| S16 | spherical | infinite | 0.1130 | | | |
| S17 | spherical | infinite | | | | |

TABLE 41

| surface number | A4 | A6 | A8 | A10 | A12 |
|---|---|---|---|---|---|
| S1 | 1.3859E−02 | −3.2042E−02 | −3.3835E−03 | 3.2495E−02 | −5.9820E−02 |
| S2 | 1.9809E−03 | −1.5364E−01 | 2.3023E−01 | −2.8186E−01 | 2.9178E−01 |
| S3 | 6.6840E−02 | −1.5340E−01 | 2.0422E−01 | −2.5703E−01 | 2.9292E−01 |
| S4 | 2.9128E−02 | −3.3196E−01 | 7.7041E−01 | −1.1103E+00 | 1.0765E+00 |
| S5 | 1.5497E−01 | −5.7363E−01 | 1.3348E+00 | −2.0436E+00 | 2.1299E+00 |
| S6 | 4.6171E−02 | −1.8874E−01 | 5.3140E−01 | −9.2731E−01 | 1.1088E+00 |
| S7 | −4.1615E−02 | −7.4281E−02 | −9.2457E−03 | 4.6326E−01 | −1.0236E+00 |
| S8 | 2.0552E−02 | −3.1383E−01 | 6.2390E−01 | −1.0620E+00 | 1.3672E+00 |
| S9 | 4.1290E−03 | −1.2574E−01 | 2.2620E−01 | −3.5121E−01 | 2.6591E−01 |
| S10 | −1.9582E−01 | 3.8377E−02 | 1.7617E−01 | −3.2930E−01 | 2.8488E−01 |
| S11 | 5.2425E−02 | −1.7899E−01 | 1.8677E−01 | −1.3993E−01 | 7.8801E−02 |
| S12 | 1.7225E−01 | −2.3270E−01 | 1.1075E−01 | −6.8321E−03 | −1.6048E−02 |
| S13 | 2.1281E−01 | −4.6415E−01 | 4.0475E−01 | −1.8932E−01 | 5.3890E−02 |
| S14 | 1.6286E−01 | −2.9755E−01 | 2.1273E−01 | −8.5043E−02 | 2.0865E−02 |

| surface number | A14 | A16 | A18 | A20 |
|---|---|---|---|---|
| S1 | 5.8141E−02 | −2.9968E−02 | 7.8865E−03 | −8.4772E−04 |
| S2 | −2.1132E−01 | 9.7146E−02 | −2.5451E−02 | 2.8794E−03 |
| S3 | −2.1651E−01 | 9.1810E−02 | −2.0214E−02 | 1.7087E−03 |
| S4 | −6.9541E−01 | 2.8468E−01 | −6.6551E−02 | 6.7313E−03 |
| S5 | −1.5124E+00 | 6.9579E−01 | −1.8514E−01 | 2.1544E−02 |
| S6 | −9.3085E−01 | 5.2164E−01 | −1.7251E−01 | 2.5193E−02 |
| S7 | 1.1838E+00 | −7.7023E−01 | 2.6582E−01 | −3.8336E−02 |
| S8 | −1.1605E+00 | 6.2261E−01 | −1.8988E−01 | 2.4651E−02 |
| S9 | −8.1888E−02 | −1.5836E−02 | 1.6986E−02 | −3.2221E−03 |
| S10 | −1.4287E−01 | 4.2463E−02 | −6.8818E−03 | 4.6007E−04 |
| S11 | −3.1893E−02 | 8.1849E−03 | −1.1455E−03 | 6.5731E−05 |
| S12 | 7.5021E−03 | −1.5526E−03 | 1.6081E−04 | −6.8193E−06 |
| S13 | −9.6621E−03 | 1.0700E−03 | −6.7069E−05 | 1.8238E−06 |
| S14 | −3.2152E−03 | 3.0363E−04 | −1.6054E−05 | 3.6369E−07 |

TABLE 42

| parameter | | | | |
|---|---|---|---|---|
| f1 (mm) | f2 (mm) | f3 (mm) | f4 (mm) | f5 (mm) |
| value 64.23 | 2.70 | −4.31 | −1000.98 | −12.21 |

| parameter | | | | |
|---|---|---|---|---|
| f6 (mm) | f7 (mm) | f (mm) | TTL (mm) | ImgH (mm) |
| value 3.27 | −3.29 | 3.88 | 5.42 | 3.22 |

Figure 28A:
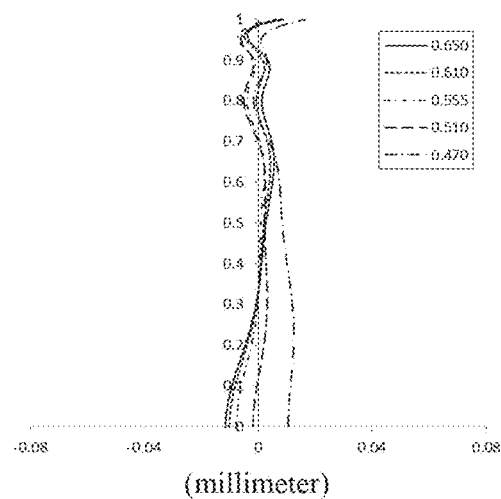
FIGS. 28A-28D respectively illustrate a longitudinal aberration curve, an astigmatic curve, a distortion curve and a lateral color curve of the optical imaging lens assembly according to Embodiment 14.
Figure 28B:
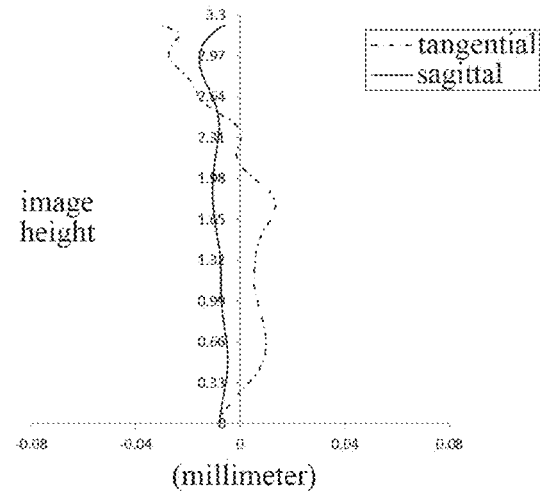
Figure 28C:
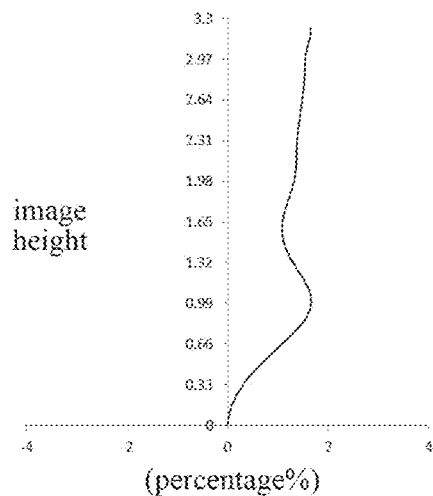
Figure 28D:
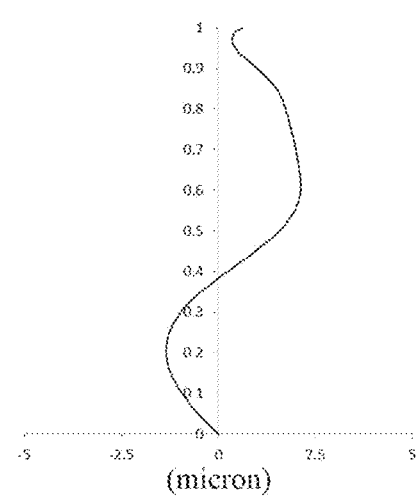

FIG. 28A illustrates the longitudinal aberration curve of the optical imaging lens assembly according to Embodiment 14, representing deviations of focal points of light of different wavelengths converged after passing through the lens assembly. FIG. 28B illustrates the astigmatic curve of the optical imaging lens assembly according to Embodiment 14, representing a curvature of the tangential image plane and a curvature of the sagittal image plane. FIG. 28C illustrates the distortion curve of the optical imaging lens assembly according to Embodiment 14, representing amounts of distortion at different viewing angles. FIG. 28D illustrates the lateral color curve of the optical imaging lens assembly according to Embodiment 14, representing deviations of different image heights on the image plane after light passes through the lens assembly. It can be seen from FIGS. 28A-28D that the optical imaging lens assembly according to Embodiment 14 can achieve a good imaging quality.

Embodiment 15

An optical imaging lens assembly according to Embodiment 15 of the present disclosure is described below with reference to FIGS. 29-30D. FIG. 29 is a schematic structural diagram illustrating the optical imaging lens assembly according to Embodiment 15 of the present disclosure.

As shown in FIG. 29, the optical imaging lens assembly sequentially includes, along the optical axis from the object side to the image side, a first lens E1, a second lens E2, a third lens E3, a fourth lens E4, a fifth lens E5, a sixth lens E6, a seventh lens E7 and an image plane S17.

The first lens E1 has a positive refractive power, an object-side surface S1 of the first lens is a convex surface, an image-side surface S2 of the first lens is a concave surface, and the object-side surface S1 and the image-side surface S2 of the first lens E1 are both aspheric surfaces.

The second lens E2 has a positive refractive power, an object-side surface S3 of the second lens is a convex surface, an image-side surface S4 of the second lens is a convex surface, and the object-side surface S3 and the image-side surface S4 of the second lens E2 are both aspheric surfaces.

The third lens E3 has a negative refractive power, an object-side surface S5 of the third lens is a concave surface, an image-side surface S6 of the third lens is a concave surface, and the object-side surface S5 and the image-side surface S6 of the third lens E3 are both aspheric surfaces.

The fourth lens E4 has a negative refractive power, an object-side surface S7 of the fourth lens is a convex surface, an image-side surface S8 of the fourth lens is a concave surface, and the object-side surface S7 and the image-side surface S8 of the fourth lens E4 are both aspheric surfaces.

The fifth lens E5 has a negative refractive power, an object-side surface S9 of the fifth lens is a convex surface, an image-side surface S10 of the fifth lens is a concave surface, and the object-side surface S9 and the image-side surface S10 of the fifth lens E5 are both aspheric surfaces.

The sixth lens E6 has a positive refractive power, an object-side surface S11 of the sixth lens is a convex surface, an image-side surface S12 of the sixth lens is a concave surface, and the object-side surface S11 and the image-side surface S12 of the sixth lens E6 are both aspheric surfaces.

The seventh lens E7 has a negative refractive power, an object-side surface S13 of the seventh lens is a concave surface, an image-side surface S14 of the seventh lens is a concave surface, and the object-side surface S13 and the image-side surface S14 of the seventh lens E7 are both aspheric surfaces.

Alternatively, the optical imaging lens assembly may further include an optical filter E8 having an object-side surface S15 and an image-side surface S16. Light from an object sequentially passes through the surfaces S1-S16 and finally forms an image on the image plane S17.

Alternatively, the optical imaging lens assembly may further include a diaphragm STO disposed between the object side and the first lens E1, for improving the imaging quality of the lens assembly.

Table 43 shows the surface type, the radius of curvature, the thickness, the material and the conic coefficient of each lens of the optical imaging lens assembly in Embodiment 15. The radius of curvature and the thickness are shown in millimeters (mm). Table 44 shows the high-order coefficients of the aspheric surfaces in Embodiment 15. Here, the surface types of the aspheric surfaces may be defined by the formula (1) given in the above Embodiment 1. Table 45 shows the effective focal lengths f1-f7 of the lenses in Embodiment 15, the total effective focal length f, the total track length TTL and the half of the diagonal length ImgH of the effective pixel area on the image plane S17 of the optical imaging lens assembly.

TABLE 43

| surface number | surface type | radius of curvature | thickness | material refractive index | abbe number | conic coefficient |
|---|---|---|---|---|---|---|
| OBJ | spherical | infinite | infinite | | | |
| STO | spherical | infinite | −0.1911 | | | |
| S1 | aspheric | 2.3466 | 0.3809 | 1.54 | 55.7 | −7.2021 |
| S2 | aspheric | 2.4280 | 0.1769 | | | −16.8998 |
| S3 | aspheric | 2.0208 | 0.7633 | 1.55 | 56.1 | −10.6507 |
| S4 | aspheric | −4.8720 | 0.0530 | | | −99.0000 |
| S5 | aspheric | −492.2532 | 0.2200 | 1.67 | 20.4 | −99.0000 |
| S6 | aspheric | 2.8755 | 0.3652 | | | −0.1796 |
| S7 | aspheric | 33.5934 | 0.2805 | 1.55 | 56.1 | 0.0000 |
| S8 | aspheric | 31.4165 | 0.1340 | | | −8.0448 |
| S9 | aspheric | 17.1014 | 0.3675 | 1.67 | 20.4 | −35.0234 |
| S10 | aspheric | 5.5605 | 0.1958 | | | 10.3237 |
| S11 | aspheric | 1.6512 | 0.5473 | 1.55 | 56.1 | −5.9031 |
| S12 | aspheric | 28.7605 | 0.7260 | | | 0.0000 |
| S13 | aspheric | −1.9581 | 0.3000 | 1.54 | 55.7 | −0.7286 |
| S14 | aspheric | 19.9869 | 0.2584 | | | 0.0000 |
| S15 | spherical | infinite | 0.2108 | 1.52 | 64.2 | |
| S16 | spherical | infinite | 0.1130 | | | |
| S17 | spherical | infinite | | | | |

TABLE 44

| surface number | A4 | A6 | A8 | A10 | A12 |
|---|---|---|---|---|---|
| S1 | 1.3664E−02 | −2.7524E−02 | −1.2444E−02 | 5.1285E−02 | −8.6195E−02 |
| S2 | −9.1177E−04 | −1.4615E−01 | 2.1417E−01 | −2.6084E−01 | 2.7304E−01 |
| S3 | 6.7556E−02 | −1.6496E−01 | 2.2645E−01 | −2.9476E−01 | 3.4146E−01 |
| S4 | 3.3019E−02 | −3.3989E−01 | 7.8711E−01 | −1.1238E+00 | 1.0714E+00 |
| S5 | 1.5748E−01 | −5.8295E−01 | 1.3731E+00 | −2.1401E+00 | 2.2640E+00 |
| S6 | 4.6126E−02 | −1.9764E−01 | 5.8036E−01 | −1.0575E+00 | 1.2869E+00 |
| S7 | −4.5348E−02 | −8.1668E−02 | 6.4515E−03 | 4.4949E−01 | −1.0251E+00 |
| S8 | 1.3462E−02 | −3.0043E−01 | 5.6376E−01 | −9.1354E−01 | 1.1428E+00 |
| S9 | 6.0298E−03 | −1.5264E−01 | 3.1180E−01 | −4.5922E−01 | 3.6312E−01 |
| S10 | −1.9153E−01 | 4.3178E−04 | 2.6276E−01 | −4.2507E−01 | 3.3852E−01 |
| S11 | 5.8702E−02 | −2.0385E−01 | 2.3032E−01 | −1.7990E−01 | 1.0084E−01 |
| S12 | 1.7742E−01 | −2.4110E−01 | 1.2220E−01 | −1.2477E−02 | −1.5626E−02 |
| S13 | 2.0068E−01 | −4.5812E−01 | 4.1061E−01 | −1.9740E−01 | 5.7817E−02 |
| S14 | 1.5228E−01 | −2.9429E−01 | 2.1874E−01 | −9.0754E−02 | 2.3067E−02 |

| surface number | A14 | A16 | A18 | A20 |
|---|---|---|---|---|
| S1 | 7.9607E−02 | −4.0288E−02 | 1.0650E−02 | −1.1655E−03 |
| S2 | −2.0093E−01 | 9.3633E−02 | −2.4737E−02 | 2.8077E−03 |
| S3 | −2.5616E−01 | 1.1133E−01 | −2.5566E−02 | 2.3431E−03 |
| S4 | −6.7703E−01 | 2.7026E−01 | −6.1482E−02 | 6.0440E−03 |
| S5 | −1.6253E+00 | 7.5263E−01 | −2.0062E−01 | 2.3254E−02 |
| S6 | −1.0653E+00 | 5.7321E−01 | −1.7900E−01 | 2.4470E−02 |
| S7 | 1.1975E+00 | −7.7909E−01 | 2.6667E−01 | −3.7817E−02 |
| S8 | −9.4791E−01 | 5.0253E−01 | −1.5323E−01 | 2.0002E−02 |
| S9 | −1.1817E−01 | −1.5560E−02 | 2.0968E−02 | −4.0754E−03 |
| S10 | −1.5392E−01 | 3.9272E−02 | −4.8048E−03 | 1.5752E−04 |
| S11 | −3.9700E−02 | 9.8899E−03 | −1.3458E−03 | 7.4919E−05 |
| S12 | 8.0310E−03 | −1.7478E−03 | 1.8857E−04 | −8.3031E−06 |
| S13 | −1.0667E−02 | 1.2149E−03 | −7.8216E−05 | 2.1813E−06 |
| S14 | −3.6749E−03 | 3.5806E−04 | −1.9491E−05 | 4.5351E−07 |

TABLE 45

| parameter | | | | |
|---|---|---|---|---|
| f1 (mm) | f2 (mm) | f3 (mm) | f4 (mm) | f5 (mm) |
| value 49.51 | 2.72 | −4.29 | −930.34 | −12.54 |

| parameter | | | | |
|---|---|---|---|---|
| f6 (mm) | f7 (mm) | f (mm) | TTL (mm) | ImgH (mm) |
| value 3.19 | −3.31 | 3.82 | 5.09 | 3.16 |

Figure 30C:
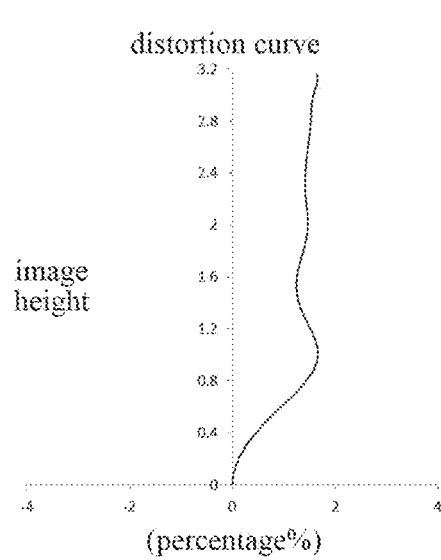
Figure 30D:
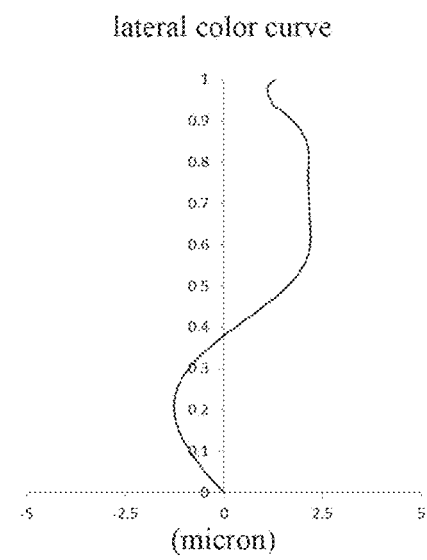

FIG. 30A illustrates the longitudinal aberration curve of the optical imaging lens assembly according to Embodiment 15, representing deviations of focal points of light of different wavelengths converged after passing through the lens assembly. FIG. 30B illustrates the astigmatic curve of the optical imaging lens assembly according to Embodiment 15, representing a curvature of the tangential image plane and a curvature of the sagittal image plane. FIG. 30C illustrates the distortion curve of the optical imaging lens assembly according to Embodiment 15, representing amounts of distortion at different viewing angles. FIG. 30D illustrates the lateral color curve of the optical imaging lens assembly according to Embodiment 15, representing deviations of different image heights on the image plane after light passes through the lens assembly. It can be seen from FIGS. 30A-30D that the optical imaging lens assembly according to Embodiment 15 can achieve a good imaging quality.

To sum up, Embodiments 1-15 respectively satisfy the relationships shown in Table 46 below.

The present disclosure further provides an imaging device, having a photosensitive element which may be a photosensitive charge-coupled device (CCD) or a complementary metal-oxide semiconductor (CMOS) element. The imaging device may be an independent imaging device such as a digital camera, or may be an imaging module integrated in a mobile electronic device such as a mobile phone. The imaging device is equipped with the optical imaging lens assembly described above.

The foregoing is only a description for the preferred embodiments of the present disclosure and the applied technical principles. It should be appreciated by those skilled in the art that the inventive scope of the present disclosure is not limited to the technical solution formed by the particular combinations of the above technical features. The inventive scope should also cover other technical solutions formed by any combinations of the above technical features or equivalent features thereof without departing from the concept of the invention, such as technical solutions formed by replacing the features as disclosed in the present disclosure with (but not limited to) technical features with similar functions.

TABLE 46

| Conditional Expression | Embodiment | | | | | | | | |
|---|---|---|---|---|---|---|---|---|---|
| | 1 | 2 | 3 | 4 | 5 | 6 | 7 | 8 | 9 |
| f/EPD | 1.86 | 1.65 | 1.59 | 1.48 | 1.43 | 1.39 | 1.69 | 1.57 | 1.45 |
| (R1 + R2)/(R1 − R2) | −5.10 | −9.99 | −10.21 | −10.68 | −25.26 | −48.14 | −5.03 | −55.01 | −55.82 |
| \|R9 + R10\|/\|R9 − R10\| | 0.64 | 0.07 | 0.06 | 0.09 | 0.11 | 0.15 | 0.74 | 0.78 | 0.80 |
| f/R13 | −2.65 | −2.73 | −2.71 | −2.73 | −2.47 | −2.42 | −2.49 | −2.02 | −1.78 |
| \|R11 + R12\|/\|R11 − R12\| | 1.82 | 2.22 | 2.19 | 2.02 | 1.26 | 1.21 | 2.20 | 1.92 | 1.82 |
| f5/f1 | −1.18 | −0.56 | −0.55 | −0.50 | −0.20 | −0.14 | −1.05 | −0.24 | −0.19 |
| f3/f6 | −1.40 | −1.51 | −1.54 | −1.70 | −1.90 | −1.93 | −1.44 | −1.53 | −1.55 |
| (R1 + R6)/(R1 − R6) | −3.12 | −3.54 | −3.52 | −4.09 | −6.92 | −7.63 | −3.11 | −3.84 | −4.88 |
| T34/T12 | 1.88 | 2.29 | 2.20 | 2.02 | 1.76 | 1.77 | 1.94 | 3.71 | 3.21 |
| T67/T56 | 4.80 | 4.74 | 4.94 | 4.73 | 3.78 | 3.80 | 5.19 | 5.37 | 6.64 |
| f/f67 | 0.32 | 0.26 | 0.28 | 0.29 | 0.42 | 0.44 | 0.39 | 0.58 | 0.64 |
| f67/f123 | 2.61 | 2.83 | 2.61 | 2.52 | 2.69 | 1.50 | 2.15 | 1.36 | 1.22 |
| \|V2 − V3\| | 35.70 | 35.70 | 35.70 | 35.70 | 35.70 | 35.70 | 35.70 | 35.70 | 35.70 |

| Conditional Expression | Embodiment | | | | | |
|---|---|---|---|---|---|---|
| | 10 | 11 | 12 | 13 | 14 | 15 |
| f/EPD | 1.39 | 1.43 | 1.34 | 1.48 | 1.43 | 1.39 |
| (R1 + R2)/(R1 − R2) | −19.70 | −4.37 | −8.96 | −24.97 | −115.10 | −58.66 |
| \|R9 + R10\|/\|R9 − R10\| | 0.79 | 1.99 | 2.58 | 1.57 | 1.72 | 1.96 |
| f/R13 | −1.77 | −2.62 | −2.06 | −2.18 | −2.06 | −1.95 |
| \|R11 + R12\|/\|R11 − R12\| | 1.78 | 1.99 | 2.19 | 1.37 | 1.21 | 1.12 |
| f5/f1 | −0.28 | −1.71 | −1.06 | −0.36 | −0.19 | −0.25 |
| f3/f6 | −1.51 | −1.30 | −1.19 | −1.30 | −1.32 | −1.35 |
| (R1 + R6)/(R1 − R6) | −5.68 | −3.70 | −4.92 | −8.40 | −10.37 | −9.87 |
| T34/T12 | 2.67 | 1.67 | 1.79 | 2.07 | 3.77 | 2.06 |
| T67/T56 | 6.70 | 3.94 | 3.32 | 3.84 | 3.89 | 3.71 |
| f/f67 | 0.63 | 0.17 | 0.30 | 0.39 | 0.42 | 0.45 |
| f67/f123 | 1.24 | 4.66 | 2.54 | 1.95 | 1.80 | 1.64 |
| \|V2 − V3\| | 35.70 | 35.70 | 35.70 | 35.70 | 35.70 | 35.70 |

What is claimed is:

1. An optical imaging lens assembly comprising, sequentially along an optical axis from an object side to an image side, a first lens, a second lens, a third lens, a fourth lens, a fifth lens, a sixth lens and a seventh lens having refractive powers, wherein, the first lens has a positive refractive power;

an image-side surface of the second lens and an image-side surface of the seventh lens are convex surfaces; and a total effective focal length f of the optical imaging lens assembly and an entrance pupil diameter EPD of the optical imaging lens assembly satisfy: f/EPD≤1.90, wherein a radius of curvature R1 of an object-side surface of the first lens and a radius of curvature R2 of an image-side surface of the first lens satisfy: $-120 \leq (R1+R2)/(R1-R2) \leq 0$.

2. The optical imaging lens assembly according to claim 1, wherein an object-side surface of the seventh lens is a concave surface, a radius of curvature R13 of the object-side surface of the seventh lens and the total effective focal length f of the optical imaging lens assembly satisfy: $-3 \leq f/R13 \leq -1.5$.

3. The optical imaging lens assembly according to claim 1, wherein the radius of curvature R1 of the object-side surface of the first lens and a radius of curvature R6 of an image-side surface of the third lens satisfy: $-11 \leq (R1+R6)/(R1-R6) \leq -2.5$.

4. The optical imaging lens assembly according to claim 1, wherein a radius of curvature R9 of an object-side surface of the fifth lens and a radius of curvature R10 of an image-side surface of the fifth lens satisfy: $|R9+R10|/|R9-R10| \leq 3$.

5. The optical imaging lens assembly according to claim 1, wherein a radius of curvature R11 of an object-side surface of the sixth lens and a radius of curvature R12 of an image-side surface of the sixth lens satisfy: $1 \leq |R11+R12|/|R11-R12| \leq 2.5$.

6. The optical imaging lens assembly according to claim 1, wherein the fifth lens has a negative refractive power, and an effective focal length f5 of the fifth lens and an effective focal length f1 of the first lens satisfy: $-2 \leq f5/f1 \leq 0$.

7. The optical imaging lens assembly according to claim 1, wherein an effective focal length f3 of the third lens and an effective focal length f6 of the sixth lens satisfy: $-2 \leq f3/f6 \leq -1$.

8. An optical imaging lens assembly comprising, sequentially along an optical axis from an object side to an image side, a first lens, a second lens, a third lens, a fourth lens, a fifth lens, a sixth lens and a seventh lens having refractive powers, wherein, the fourth lens has a negative refractive power;

an image-side surface of the second lens is a convex surface;

an image-side surface of the fifth lens and an image-side surface of the sixth lens are concave surfaces; and a total effective focal length f of the optical imaging lens assembly and an entrance pupil diameter EPD of the optical imaging lens assembly satisfy: $f/EPD \leq 1.70$, wherein an effective focal length f3 of the third lens and an effective focal length f6 of the sixth lens satisfy: $-2 \leq f3/f6 \leq -1$.

9. The optical imaging lens assembly according to claim 8, wherein a radius of curvature R1 of an object-side surface of the first lens and a radius of curvature R2 of an image-side surface of the first lens satisfy: $-120 \leq (R1+R2)/(R1-R2) \leq 0$.

10. The optical imaging lens assembly according to claim 8, wherein the fifth lens has a negative refractive power, and an effective focal length f5 of the fifth lens and an effective focal length f1 of the first lens satisfy: $-2 \leq f5/f1 \leq 0$.

11. The optical imaging lens assembly according to claim 8, wherein a radius of curvature R11 of an object-side surface of the sixth lens and a radius of curvature R12 of the image-side surface of the sixth lens satisfy: $1 \leq |R11+R12|/|R11-R12| \leq 2.5$.

12. The optical imaging lens assembly according to claim 8, wherein a radius of curvature R9 of an object-side surface of the fifth lens and a radius of curvature R10 of the image-side surface of the fifth lens satisfy: $|R9+R10|/|R9-R10| \leq 3$.

13. An optical imaging lens assembly comprising, sequentially along an optical axis from an object side to an image side, a first lens, a second lens, a third lens, a fourth lens, a fifth lens, a sixth lens and a seventh lens having refractive powers, wherein, the fourth lens has a negative refractive power;

an image-side surface of the second lens is a convex surface;

an object-side surface of the fifth lens is a concave surface;

an image-side surface of the sixth lens is a concave surface; and a total effective focal length f of the optical imaging lens assembly and an entrance pupil diameter EPD of the optical imaging lens assembly satisfy: $f/EPD \leq 1.50$, wherein an effective focal length f5 of the fifth lens and an effective focal length f1 of the first lens satisfy: $-2 \leq f5/f1 \leq 0$.

14. The optical imaging lens assembly according to claim 13, wherein an effective focal length f3 of the third lens and an effective focal length f6 of the sixth lens satisfy: $-2 \leq f3/f6 \leq -1$.

15. The optical imaging lens assembly according to claim 13, wherein a radius of curvature R1 of an object-side surface of the first lens and a radius of curvature R2 of an image-side surface of the first lens satisfy: $-120 \leq (R1+R2)/(R1-R2) \leq 0$.

16. The optical imaging lens assembly according to claim 13, wherein a radius of curvature R9 of an object-side surface of the fifth lens and a radius of curvature R10 of the image-side surface of the fifth lens satisfy: $|R9+R10|/|R9-R10| \leq 3$.

17. The optical imaging lens assembly according to claim 16, wherein a radius of curvature R11 of an object-side surface of the sixth lens and a radius of curvature R12 of the image-side surface of the sixth lens satisfy: $1 \leq |R11+R12|/|R11-R12| \leq 2.5$.

* * * * *